US012086096B2

(12) United States Patent
Kim et al.

(10) Patent No.: US 12,086,096 B2
(45) Date of Patent: Sep. 10, 2024

(54) TECHNOLOGY FOR CONTROLLING PEAK POWER BY DIVIDING CLOCK

(71) Applicant: DEEPX CO., LTD., Seongnam-si (KR)

(72) Inventors: Lok Won Kim, Seongnam-si (KR); Seong Jin Lee, Seongnam-si (KR); Jin Gun Song, Seongnam-si (KR)

(73) Assignee: DEEPX CO., LTD., Seongnam-si (KR)

(*) Notice: Subject to any disclaimer, the term of this patent is extended or adjusted under 35 U.S.C. 154(b) by 0 days.

(21) Appl. No.: 18/601,598

(22) Filed: Mar. 11, 2024

(65) Prior Publication Data

US 2024/0211431 A1 Jun. 27, 2024

(30) Foreign Application Priority Data

Aug. 24, 2023 (KR) .................. 10-2023-0111208
Feb. 14, 2024 (KR) .................. 10-2024-0021374

(51) Int. Cl.
*G06F 15/80* (2006.01)
*G06F 1/08* (2006.01)

(52) U.S. Cl.
CPC .............. *G06F 15/80* (2013.01); *G06F 1/08* (2013.01)

(58) Field of Classification Search
None
See application file for complete search history.

(56) References Cited

U.S. PATENT DOCUMENTS

| 4,740,997 | A | * | 4/1988 | Heatherington | .... H04L 27/2275 375/376 |
| 5,537,602 | A | | 7/1996 | Kametani | |
| 5,860,108 | A | | 1/1999 | Horikawa | |
| 7,526,666 | B1 | | 4/2009 | Soni | |
| 8,312,301 | B2 | * | 11/2012 | Vorbach | ................ G06F 1/3237 713/340 |
| 11,449,125 | B1 | * | 9/2022 | Verrilli | .................. G06F 1/3228 |
| 11,953,966 | B1 | * | 4/2024 | Wu | ........................ G06F 1/3237 |
| 2004/0098631 | A1 | * | 5/2004 | Terrell, II | ............... G06F 1/324 713/322 |
| 2008/0250415 | A1 | * | 10/2008 | Illikkal | ................. G06F 9/5094 718/103 |
| 2009/0300388 | A1 | * | 12/2009 | Mantor | ..................... G06F 1/10 713/600 |
| 2010/0318767 | A1 | * | 12/2010 | Tabaru | ................ G06F 15/8007 712/E9.002 |
| 2015/0236870 | A1 | | 8/2015 | Lee et al. | |
| 2016/0211833 | A1 | * | 7/2016 | Franch | .................. G06F 1/3237 |

(Continued)

*Primary Examiner* — Eric Coleman
(74) *Attorney, Agent, or Firm* — Bridgeway IP Law Group, PLLC; Jihun Kim

(57) ABSTRACT

A neural processing unit (NPU) is proposed. The NPU may comprise a first circuit configured to perform operations for an artificial neural network (ANN) model, and arranged for a plurality of processing elements (PE) groups including a plurality of PEs, and a second circuit configured to operate as a clock divider configured to generate a plurality of clock signals having different phases, respectively, by dividing a source clock signal and provide the plurality of clock signals to the plurality of PE groups. A first clock signal of the plurality of clock signals may be provided to a first PE group of the plurality of PE groups, and a second clock signal of the plurality of clock signals may be provided to a second PE group of the plurality of PE groups.

17 Claims, 35 Drawing Sheets

(56) References Cited

U.S. PATENT DOCUMENTS

| | | |
|---|---|---|
| 2017/0250695 A1 | 8/2017 | Lee et al. |
| 2019/0026250 A1 | 1/2019 | Das Sarma et al. |
| 2021/0234543 A1* | 7/2021 | Sakato ........... H03K 19/017581 |
| 2022/0004249 A1 | 1/2022 | Han |
| 2023/0065730 A1* | 3/2023 | Jakobsson .............. G06N 3/063 |
| 2023/0145437 A1 | 5/2023 | Costa et al. |
| 2023/0409892 A1* | 12/2023 | Lee ........................ G06N 3/063 |

* cited by examiner

FIG. 6B

| Layer name | Input feature map | | | Kernel | | | | Output feature map | | | | Algorithm | | | 연산량 | Data size (Byte) | | |
|---|---|---|---|---|---|---|---|---|---|---|---|---|---|---|---|---|---|---|
| | Height | Width | Ch # | Height | Width | # | | Height | Width | Ch # | Strides | AVG_pooling | Activation | MAC | Kernel_SIZE | IFMAP_SIZE | OFMAP_SIZE |
| 1 | 224 | 224 | 3 | 3 | 3 | 32 | | 112 | 112 | 32 | 2 | NO | RELU | 10,838,016 | 864 | 150,528 | 401,408 |
| 2 | 112 | 112 | 32 | 3 | 3 | 1 | | 112 | 112 | 32 | 1 | NO | RELU | 3,612,672 | 288 | 401,408 | 401,408 |
| 3 | 112 | 112 | 32 | 1 | 1 | 64 | | 112 | 112 | 64 | 1 | NO | RELU | 25,690,112 | 2,048 | 401,408 | 802,816 |
| 4 | 112 | 112 | 64 | 3 | 3 | 1 | | 56 | 56 | 64 | 2 | NO | RELU | 1,806,336 | 576 | 802,816 | 200,704 |
| 5 | 56 | 56 | 64 | 1 | 1 | 128 | | 56 | 56 | 128 | 1 | NO | RELU | 25,690,112 | 8,192 | 200,704 | 401,408 |
| 6 | 56 | 56 | 128 | 3 | 3 | 1 | | 56 | 56 | 128 | 1 | NO | RELU | 3,612,672 | 1,152 | 401,408 | 401,408 |
| 7 | 56 | 56 | 128 | 1 | 1 | 128 | | 56 | 56 | 128 | 1 | NO | RELU | 51,380,224 | 16,384 | 401,408 | 401,408 |
| 8 | 56 | 56 | 128 | 3 | 3 | 1 | | 28 | 28 | 128 | 2 | NO | RELU | 903,168 | 1,152 | 401,408 | 100,352 |
| 9 | 28 | 28 | 128 | 1 | 1 | 256 | | 28 | 28 | 256 | 1 | NO | RELU | 25,690,112 | 32,768 | 100,352 | 200,704 |
| 10 | 28 | 28 | 256 | 3 | 3 | 1 | | 28 | 28 | 256 | 1 | NO | RELU | 1,806,336 | 2,304 | 200,704 | 200,704 |
| 11 | 28 | 28 | 256 | 1 | 1 | 256 | | 28 | 28 | 256 | 1 | NO | RELU | 51,380,224 | 65,536 | 200,704 | 200,704 |
| 12 | 28 | 28 | 256 | 3 | 3 | 1 | | 14 | 14 | 256 | 2 | NO | RELU | 451,584 | 2,304 | 200,704 | 50,176 |
| 13 | 14 | 14 | 256 | 1 | 1 | 512 | | 14 | 14 | 512 | 1 | NO | RELU | 25,690,112 | 131,072 | 50,176 | 100,352 |
| 14 | 14 | 14 | 512 | 3 | 3 | 1 | | 14 | 14 | 512 | 1 | NO | RELU | 903,168 | 4,608 | 100,352 | 100,352 |
| 15 | 14 | 14 | 512 | 1 | 1 | 512 | | 14 | 14 | 512 | 1 | NO | RELU | 51,380,224 | 262,144 | 100,352 | 100,352 |
| 16 | 14 | 14 | 512 | 3 | 3 | 1 | | 14 | 14 | 512 | 1 | NO | RELU | 903,168 | 4,608 | 100,352 | 100,352 |
| 17 | 14 | 14 | 512 | 1 | 1 | 512 | | 14 | 14 | 512 | 1 | NO | RELU | 51,380,224 | 262,144 | 100,352 | 100,352 |
| 18 | 14 | 14 | 512 | 3 | 3 | 1 | | 14 | 14 | 512 | 1 | NO | RELU | 903,168 | 4,608 | 100,352 | 100,352 |
| 19 | 14 | 14 | 512 | 1 | 1 | 512 | | 14 | 14 | 512 | 1 | NO | RELU | 51,380,224 | 262,144 | 100,352 | 100,352 |
| 20 | 14 | 14 | 512 | 3 | 3 | 1 | | 14 | 14 | 512 | 1 | NO | RELU | 903,168 | 4,608 | 100,352 | 100,352 |
| 21 | 14 | 14 | 512 | 1 | 1 | 512 | | 14 | 14 | 512 | 1 | NO | RELU | 51,380,224 | 262,144 | 100,352 | 100,352 |
| 22 | 14 | 14 | 512 | 3 | 3 | 1 | | 14 | 14 | 512 | 1 | NO | RELU | 903,168 | 4,608 | 100,352 | 100,352 |
| 23 | 14 | 14 | 512 | 1 | 1 | 512 | | 14 | 14 | 512 | 1 | NO | RELU | 51,380,224 | 262,144 | 100,352 | 100,352 |
| 24 | 14 | 14 | 512 | 3 | 3 | 1 | | 7 | 7 | 512 | 2 | NO | RELU | 225,792 | 4,608 | 100,352 | 25,088 |
| 25 | 7 | 7 | 512 | 1 | 1 | 1024 | | 7 | 7 | 1024 | 1 | NO | RELU | 25,690,112 | 524,288 | 25,088 | 50,176 |
| 26 | 7 | 7 | 1024 | 3 | 3 | 1 | | 7 | 7 | 1024 | 1 | NO | RELU | 451,584 | 9,216 | 50,176 | 50,176 |
| 27 | 7 | 7 | 1024 | 1 | 1 | 1024 | | 7 | 7 | 1024 | 1 | YES | RELU | 51,380,224 | 1,048,576 | 50,176 | 1,024 |
| 28 | 1 | 1 | 1024 | 1 | 1 | 1000 | | 1 | 1 | 1000 | 1 | NO | NO | 1,024,000 | 1,024,000 | 1,024 | 1,000 |

TECHNOLOGY FOR CONTROLLING PEAK POWER BY DIVIDING CLOCK

CROSS-REFERENCE TO RELATED APPLICATIONS

This application claims the priority of Korean Patent Applications No. 10-2023-0111208 filed on Aug. 24, 2023, and No. 10-2024-0021374 filed on Feb. 14, 2024, in the Korean Intellectual Property Office, the disclosure of which is incorporated herein by reference in its entirety.

BACKGROUND OF THE DISCLOSURE

Technical Field

The present disclosure relates to a technique for distributing the peak power of a neural processing unit.

Background Art

Artificial intelligence (AI) is rapidly advancing. AI refers to artificially imitating human intelligence, that is, intelligence capable of recognition, classification, inference, prediction, control/decision making, and the like.

In recent times, to enhance the computational speed for artificial intelligence (AI), a neural processing unit (NPU) has been developed.

Depending on the specific AI service requirements, different types of artificial neural network (ANN) models may exist. For instance, when processing an image or video, a CNN type artificial neural network model can be employed for tasks like object classification, object detection, object tracking, and the like.

Generally, each layer of an artificial neural network model involves varying levels of computation.

In particular, when a specific layer requires a significant increase in computational operations, it can lead to an instantaneous surge in power consumption of a neural processing unit.

SUMMARY OF THE DISCLOSURE

Artificial neural network operation has a data-intensive characteristic. In particular, artificial neural network calculations require parallel processing calculations. In other words, the artificial neural network operation has a characteristic in that the processing speed is lowered if a large amount of data cannot be processed in parallel at a high speed at the same time.

Accordingly, the inventors of the present disclosure developed a neural processing unit specialized for artificial neural network calculation. The inventors of the present disclosure have attempted to improve the parallel processing performance of the neural processing unit by increasing the number of a plurality of processing elements of the neural processing unit. In addition, the inventors of the present disclosure have attempted to develop a neural processing unit capable of low-power operation.

Meanwhile, a power supply unit of a neural processing unit specialized for low-power operation installed in an edge device may have relatively low power supply capability compared to a power supply unit of a graphic processing unit (GPU) operating in a server or personal computer (PC). In addition, capacitance of a power supply unit of a neural processing unit specialized for low-power operation installed in an edge device may be insufficient to handle peak power supply.

However, the inventors of the present disclosure have recognized that as the number of processing elements of the neural processing unit specialized for low-power operation increases, the degree of instantaneously fluctuating supply voltage may increase. In other words, the required amount of instantaneous power supply of the neural processing unit may be proportional to the number of operating processing elements.

In addition, the amount of computation of the artificial neural network model varies considerably for each layer. Therefore, the number of processing elements operating in parallel may be different according to the amount of computation of the layer of the artificial neural network model. That is, when many processing elements operate at the same time, the voltage of the power supply unit of the neural processing unit may fluctuate or drop instantaneously.

Furthermore, the computation of certain layers of the artificial neural network model may be very small. In such cases, it has been recognized by the inventors of the present disclosure that the stability of the supply voltage of the neural processing unit can be ensured even if the driving frequency of the neural processing unit is increased.

In addition, when the supply voltage fluctuates or drops instantaneously, there may be a case in which the supply voltage VDD needs to be raised for system stability. Therefore, if system safety is not secured, a problem in which the supply voltage is unnecessarily increased may occur. When the supply voltage increases, power consumption of the neural processing unit may rapidly increase. Also, the increased power consumption can cause the neural processing unit to heat up. In such cases, the inventors of the present disclosure have recognized that the voltage of the supply power unit of the neural processing unit can be stabilized by reducing the driving frequency of the neural processing unit.

Conversely, as the supply voltage becomes more stable, a level of the supply voltage VDD can be reduced. Therefore, if the stability of the supply voltage of the neural processing unit is ensured, the supply voltage can be reduced, and consequently, the power consumption of the neural processing unit can be reduced.

Accordingly, the inventors of the present disclosure recognized that it is necessary to improve the stability of a supply voltage of a neural processing unit specialized in artificial neural network operation even when peak power is increased as the number of processing elements increases.

Accordingly, the disclosures in the present disclosure are aimed at disclosing technical solutions for stabilizing the fluctuation of the supply voltage of the supply power unit due to excessive power at a certain operation step.

According to an example of the present disclosure, neural processing unit (NPU) may be provided. The NPU may comprise a first circuit configured to perform operations for an artificial neural network (ANN) model, and arranged for a plurality of processing elements (PE) groups including a plurality of processing elements, and a second circuit configured to operate as a clock divider which is configured to generate a plurality of clock signals having different phases, respectively, by dividing a source clock signal and provide the plurality of clock signals to the plurality of PE groups. The second circuit may be configured to provide a first clock signal of the plurality of clock signals to a first PE group of the plurality of PE groups, and to provide a second clock signal of the plurality of clock signals to a second PE group of the plurality of PE groups.

At least one of the plurality of clock signals may be supplied to one of the plurality of PE groups after passing through at least one clock buffer arranged for peak power reduction.

The plurality of clock signals may have a lower frequency than the source clock signal.

A frequency of the plurality of clock signals may be determined based on a number of the plurality of PE groups.

A frequency of the plurality of clock signals may be determined as a frequency of the source clock signal divided by a number of the plurality of PE groups.

The second clock signal may be delayed in phase with respect to the first clock signal.

The second circuit arranged for the clock divider may include a plurality of flip-flops for delaying the source clock signal, a multiplexer connected in parallel with the plurality of flip-flops, and a divider for dividing a frequency of an output signal from the multiplexer.

The second circuit arranged for the clock divider may include a plurality of delay cells and a multiplexer connected in parallel with the plurality of delay cells.

The second circuit arranged for the clock divider may include a divider coupled to the source clock signal to divide a frequency of the source clock signal, a first D-type flip-flop coupled to an output of the divider. Each of the divider and the first D-type flip-flop may be configured to be operated by receiving a frequency of the source clock.

According to an example of the present disclosure, a system-on-chip (SoC) may be provided. The SoC may comprise semi-conductor substrate, a first circuit, arranged on the semi-conductor substrate, configured to perform operations for an artificial neural network (ANN) model, and arranged for a plurality of neural processing units (NPUs) including a plurality of processing elements (PE) groups including a plurality of processing elements, and a second circuit, arranged on the semi-conductor substrate, configured to operate as a clock divider which is configured to generate a plurality of clock signals having different phases, respectively, by dividing a source clock signal and provide the plurality of clock signals to the plurality of NPUs. The second circuit may be configured to provide a first clock signal of the plurality of clock signals to a first NPU of the plurality of NPUs, and to provide a second clock signal of the plurality of clock signals to a second NPU of the plurality of NPUs.

At least one of the plurality of clock signals may be supplied to one of the plurality of NPUs after passing through at least one clock buffer arranged for peak power reduction.

The plurality of clock signals may have a lower frequency than the source clock signal.

A frequency of the plurality of clock signals may be determined based on a number of the plurality of NPUs.

A frequency of the plurality of clock signals may be determined as a frequency of the source clock signal divided by a number of the plurality of NPUs.

The second clock signal may be delayed in phase with respect to the first clock signal.

According to an example of the present disclosure, an electronic device may be provided. The electronic device may comprise a princed circuit board, a first circuit, arranged on the princed circuit board, configured to perform operations for an artificial neural network (ANN) model, and arranged for a plurality of neural processing units (NPUs) including a plurality of processing elements (PE) groups including a plurality of processing elements, and a second circuit, arranged on the princed circuit board, configured to operate as a clock divider which is configured to generate a plurality of clock signals having different phases, respectively, by dividing a source clock signal and provide the plurality of clock signals to the plurality of NPUs. The second circuit may be configured to provide a first clock signal of the plurality of clock signals to a first NPU of the plurality of NPUs, and to provide a second clock signal of the plurality of clock signals to a second NPU of the plurality of NPUs.

At least one of the plurality of clock signals may be supplied to one of the plurality of NPUs after passing through at least one clock buffer arranged for peak power reduction.

The plurality of clock signals may have a lower frequency than the source clock signal.

A frequency of the plurality of clock signals may be determined as a frequency of the source clock signal divided by a number of the plurality of NPUs.

The second clock signal may be delayed in phase with respect to the first clock signal.

According to examples of the present disclosure, an artificial neural network operation is performed in a distributed manner according to a plurality of clock signals, thereby reducing peak power at a certain operation step.

According to examples of the present disclosure, an artificial neural network operation is performed in a distributed manner according to a plurality of clock signals, thereby improving the stability of a supply voltage supplied to a neural processing unit.

According to the examples of the present disclosure, even if the computation of the artificial neural network is the same, the instantaneous peak power can be reduced, thereby providing a relatively lower peak power for the same amount of computation.

BRIEF DESCRIPTION OF THE DRAWINGS

FIG. 6B is an exemplary table illustrating the size of data for each layer in the exemplary artificial neural network model shown in FIG. 6A.

DETAILED DESCRIPTION OF THE EMBODIMENT

Figure 1:
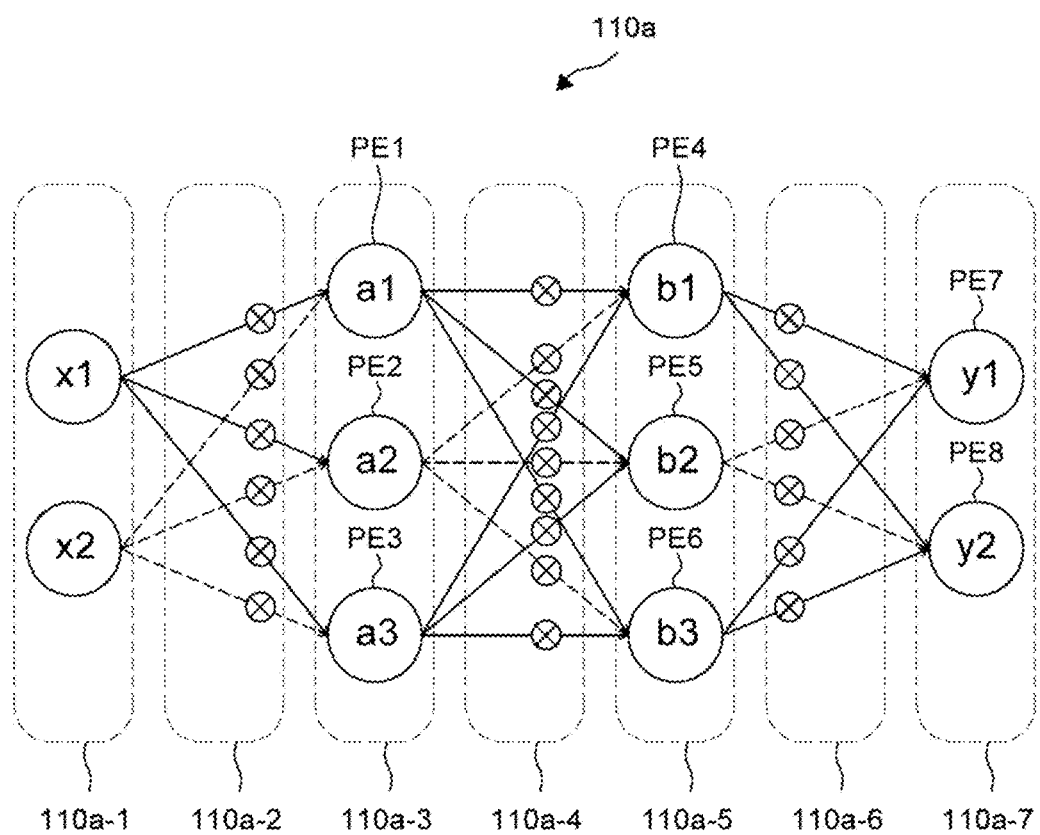
FIG. 1 is a schematic conceptual diagram illustrating an exemplary artificial neural network model.

Specific structural or step-by-step descriptions for the embodiments according to the concept of the present disclosure disclosed in the present disclosure or application are merely illustrative for the purpose of describing the embodiments according to the concept of the present disclosure. The examples according to the concept of the present disclosure may be carried out in various forms and are not interpreted as that the present disclosure is limited to the examples described in the present disclosure or application.

Various modifications and changes may be applied to the examples in accordance with the concept of the present disclosure and the examples may have various forms so that the examples will be described in detail in the specification or the application with reference to the drawings. However, it should be understood that the examples according to the concept of the present disclosure is not limited to the specific examples, but includes all changes, equivalents, or alternatives which are in line with the spirit and technical scope of the present disclosure.

Terminologies such as first and/or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between," "adjacent to," and "directly adjacent to" should be interpreted in the same manner.

Terminologies used in the present disclosure are used only to describe specific examples, and are not intended to limit the present disclosure. A singular form may include a plural form if there is no clearly opposite meaning in the context. In the present disclosure, it should be understood that terms "include" or "have" indicate that a feature, a number, a step, an operation, a component, a part, or a combination thereof described in the present disclosure is present, but do not exclude a possibility of presence or addition of one or more other features, numbers, steps, operations, components, parts, or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in the present disclosure.

In describing examples, descriptions of technical contents that are well known in the art to which the present disclosure pertains and are not directly related to the present disclosure will be omitted. The omission is to convey the gist of the present disclosure more clearly without the obscuration of the unnecessary description of well-known technical details.

Definitions of Terms

Here, in order to help the understanding of the examples proposed in the present disclosure, terminologies used in the present disclosure will be defined in brief.

NPU is an abbreviation for a neural processing unit and refers to a processor specialized for an operation of an artificial neural network model separately from the central processor (CPU).

ANN is an abbreviation for an artificial neural network and refers to a network which connects nodes in a layered structure by imitating the connection of the neurons in the human brain through a synapse to imitate the human intelligence.

DNN is an abbreviation for a deep neural network and may mean that the number of hidden layers of the artificial neural network is increased to implement higher artificial intelligence.

CNN is an abbreviation for a convolutional neural network and is a neural network which functions similar to the image processing performed in a visual cortex of the human brain. The convolutional neural network is known to be appropriate for image processing and is known to be easy to extract features of input data and identify the pattern of the features.

Hereinafter, the present disclosure will be described in detail by explaining examples of the present disclosure with reference to the accompanying drawings.

Artificial Intelligence

Humans are equipped with intelligence capable of recognition, classification, inference, prediction, control/decision making, and the like. Artificial intelligence (AI) refers to the artificial imitation of human intelligence.

The human brain consists of numerous nerve cells called neurons. Each neuron is connected to hundreds to thousands of other neurons through connections called synapses. In order to imitate human intelligence, modeling the operating principle of biological neurons and the connection between neurons is called an artificial neural network model. In other words, an artificial neural network is a system in which nodes that imitate neurons are connected in a layer structure.

These artificial neural network models are divided into 'single-layer neural networks' and 'multi-layer neural network' according to the number of layers. A typical multi-layer neural network consists of an input layer, a hidden layer, and an output layer. (1) The input layer is a layer that receives external data, and the number of neurons in the input layer is the same as the number of input variables. (2) The hidden layer is located between the input layer and the output layer, receives signals from the input layer, extracts characteristics, and transfers them to the output layer. (3) The output layer receives signals from the hidden layer and outputs the result. The input signal between neurons is multiplied by each connection weight having a value between 0 and 1 and summed. If this sum is greater than the neuron's threshold, the neuron is activated and implemented as an output value through an activation function.

Meanwhile, in order to implement higher artificial intelligence, an artificial neural network in which the number of hidden layers is increased is called a deep neural network (DNN).

DNNs are being developed in various structures. For example, a convolutional neural network (CNN), which is an example of DNN, is known to be easy to extract features of an input value (video or image) and identify a pattern of the extracted output value. A CNN may be configured in a form in which a convolution operation, an activation function operation, a pooling operation, and the like are processed in a specific order.

For example, in each layer of the DNN, parameters (i.e., input values, output values, weights or kernels, and the like) may be a matrix composed of a plurality of channels. Parameters can be processed in the NPU by convolution or matrix multiplication. In each layer, an output value that has been processed is generated.

For example, a transformer is a DNN based on attention technology. Transformers utilize a number of matrix multiplication operations. The transformer may obtain an output value of attention (Q, K, V) by using parameters such as an input value and a query (Q), a key (K), and a value (V). The transformer can process various inference operations based on the output value (i.e., attention (Q, K, V)). Transformers tend to show better inference performance than CNNs.

FIG. 1 illustrates an exemplary artificial neural network model.

Hereinafter, an operation of an exemplary artificial neural network model 110a which may operate in the neural processing unit 100 will be explained.

The exemplary artificial neural network model 110a of FIG. 1 may be an artificial neural network trained to perform various inference functions such as object detection or voice recognition.

The artificial neural network model 110a may be a deep neural network (DNN).

However, the artificial neural network model 110a according to the examples of the present disclosure is not limited to the deep neural network.

For example, the artificial neural network model can be a model such as LLM, Generative Adversarial Networks (GAN), Florence, ViT, DaViT, MobileViT, Swin-Transformer, Transformer, YOLO (You Only Look Once), CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and the like. However, the artificial neural network model 110a may be an ensemble model based on at least two different models.

Hereinafter, an inference process by the exemplary artificial neural network model 110a will be described.

The artificial neural network model 110a may be an exemplary deep neural network model including an input layer 110a-1, a first connection network 110a-2, a first hidden layer 110a-3, a second connection network 110a-4, a second hidden layer 110a-5, a third connection network 110a-6, and an output layer 110a-7. However, the present disclosure is not limited only to the artificial neural network model illustrated in FIG. 1. The first hidden layer 110a-3 and the second hidden layer 110a-5 may also be referred to as a plurality of hidden layers.

The input layer 110a-1 may exemplarily include input nodes x1 and x2. That is, the input layer 110a-1 may include information about two input values.

For example, the first connection network 110a-2 may include information about six weight values for connecting nodes of the input layer 110a-1 to nodes of the first hidden layer 110a-3, respectively. Each weight value is multiplied with the input node value, and an accumulated value of the multiplied values is stored in the first hidden layer 110a-3. Here, the nodes and weights may be referred to as parameters.

For example, the first hidden layer 110a-3 may include nodes a1, a2, and a3. That is, the first hidden layer 110a-3 may include information about three node values.

The first processing element PE1 of FIG. 1 may perform the MAC operation of the a1 node.

The second processing element PE2 of FIG. 1 may perform the MAC operation of the a2 node.

The third processing element PE3 of FIG. 1 may perform the MAC operation of the a3 node.

For example, the second connection network 110a-4 may include information about nine weight values for connecting nodes of the first hidden layer 110a-3 to nodes of the second hidden layer 110a-5, respectively. The weight value of the second connection network 110a-4 is multiplied with the node value input from the corresponding first hidden layer 110a-3 and the accumulated value of the multiplied values is stored in the second hidden layer 110a-5.

For example, the second hidden layer 110a-5 may include nodes b1, b2, and b3. That is, the second hidden layer 110a-5 may include information about three node values.

The fourth processing element PE4 of FIG. 1 may process the operation of the b1 node.

The fifth processing element PE5 of FIG. 1 may process the operation of node b2.

The sixth processing element PE6 of FIG. 1 may process the operation of node b3.

For example, the third connection network 110a-6 may include information about six weight values which connect nodes of the second hidden layer 110a-5 and nodes of the output layer 110a-7, respectively. The weight value of the third connection network 110a-6 is multiplied with the node value input from the second hidden layer 110a-5, and the accumulated value of the multiplied values is stored in the output layer 110a-7.

For example, the output layer 110a-7 may include nodes y1 and y2. That is, the output layer 110a-7 may include information about two node values.

The seventh processing element PE7 of FIG. 1 may process the operation of node y1.

The eighth processing element PE8 of FIG. 1 may process the operation of node y2.

Each node may correspond to a feature value, and the feature value may correspond to a feature map.

Figure 2A:
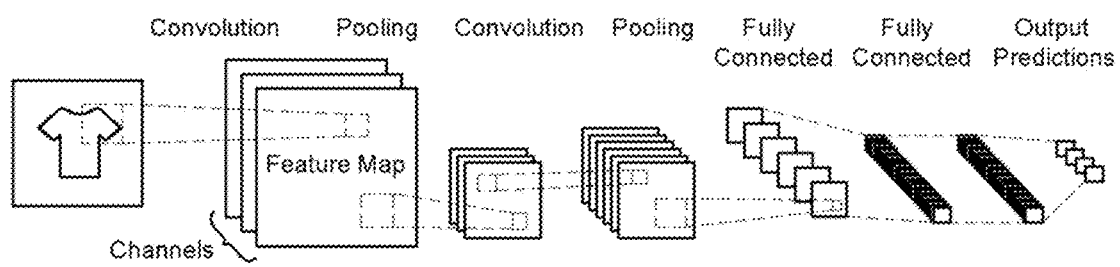
FIG. 2A is a diagram for explaining the basic structure of a convolutional neural network (CNN).

FIG. 2A is a diagram for explaining the basic structure of a convolutional neural network (CNN).

Referring to FIG. 2A, an input image may be displayed as a two-dimensional matrix composed of rows of a specific size and columns of a specific size. An input image may have a plurality of channels, where the channels may represent the number of color components of the input data image.

The convolution process means performing a convolution operation with a kernel while traversing the input image at specified intervals.

A convolutional neural network may have a structure in which an output value (convolution or matrix multiplication) of a current layer is transferred as an input value of a next layer.

For example, convolution is defined by two main parameters (input feature map and kernel). Parameters may include input feature maps, output feature maps, activation maps, weights, kernels, attention (Q, K, V) values, and the like.

Convolution slides the kernel window over the input feature map. The step size by which the kernel slides over the input feature map is called the stride.

After convolution, pooling may be applied. In addition, a fully-connected (FC) layer may be disposed at an end of the convolutional neural network.

Figure 2B:
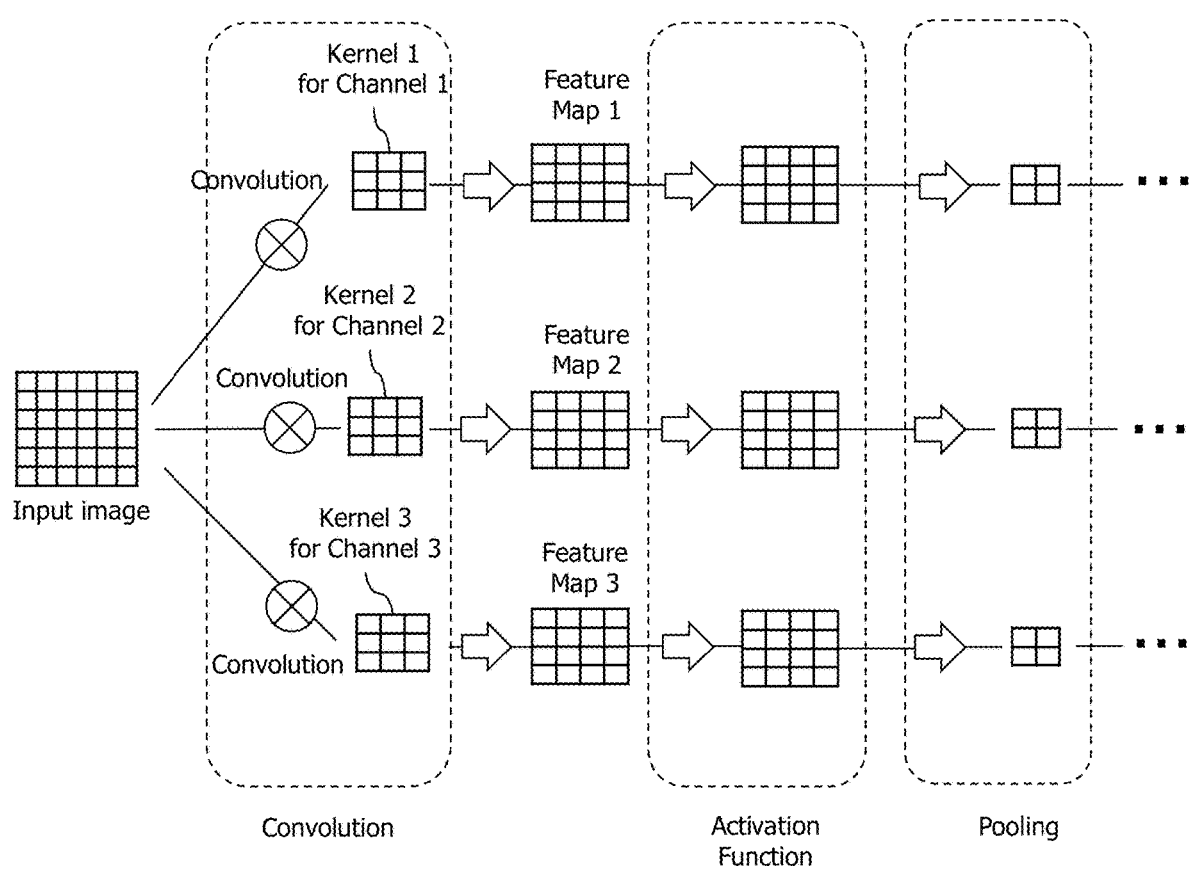
FIG. 2B is a comprehensive diagram illustrating the operation of a convolutional neural network.

FIG. 2B is a comprehensive diagram illustrating the operation of a convolutional neural network.

Referring to FIG. 2B, an input image is exemplarily represented as a two-dimensional matrix having a size of 6×6. In addition, FIG. 2B exemplarily illustrates three nodes, channel 1, channel 2, and channel 3.

First, the convolution operation will be described.

The input image (shown as an example of size 6×6 in FIG. 2B) is convolved with a kernel 1 (shown as an example of size 3×3 in FIG. 2B) for channel 1 at the first node, resulting in the output feature map 1 (shown as an example of size 4×4 in FIG. 2B). Similarly, the input image (shown as an example of size 6×6 in FIG. 2B) is convolved with a kernel 2 (shown as an example of size 3×3 in FIG. 2B) for channel 2 at the second node, resulting in the output feature map 2 (shown as an example of size 4×4 in FIG. 2B). Additionally, the input image is convolved with a kernel 3 (shown as an example of size 3×3 in FIG. 2B) for channel 3 at the third node, resulting in the output feature map 3 (shown as an example of size 4×4 in FIG. 2B).

To process each convolution, the processing elements PE1 to PE12 of the neural processing unit 100 are configured to perform a MAC operation.

Next, the operation of the activation function will be described.

The feature map 1, the feature map 2, and the feature map 3 (which are represented as 4×4 examples in FIG. 2B) generated from convolutional operations can be subjected to activation functions. The output after the activation function is applied may have a size of 4×4, for example.

Next, a pooling operation will be described.

Feature map 1, feature map 2, and feature map 3 output from the activation function (each size is exemplarily represented as 4×4 in FIG. 2B) are input to three nodes. Pooling may be performed by receiving feature maps output from the activation function as inputs. The pooling may reduce the size or emphasize a specific value in the matrix. Pooling methods include maximum pooling, average pooling, and minimum pooling. Maximum pooling is used to collect the maximum values in a specific region of the matrix, and average pooling can be used to find the average within a specific region.

In the example of FIG. 2B, it is shown that a feature map having a size of 4×4 is reduced to a size of 2×2 by pooling.

Specifically, the first node receives feature map 1 for channel 1 as an input, performs pooling, and outputs, for example, a 2×2 matrix. The second node receives feature map 2 for channel 2 as an input, performs pooling, and outputs, for example, a 2×2 matrix. The third node receives feature map 3 for channel 3 as an input, performs pooling, and outputs, for example, a 2×2 matrix.

The aforementioned convolution, activation function, and pooling are repeated, and finally, it can be output as fully connected. The corresponding output may be input again to an artificial neural network for image recognition. However, the present disclosure is not limited to the sizes of feature maps and kernels.

The CNN described so far is the most used method in the field of computer vision among various deep neural network (DNN) methods. In particular, CNNs have shown remarkable performance in various research areas performing various tasks such as image classification and object detection.

Required Hardware Resources for ANN

Figure 3:
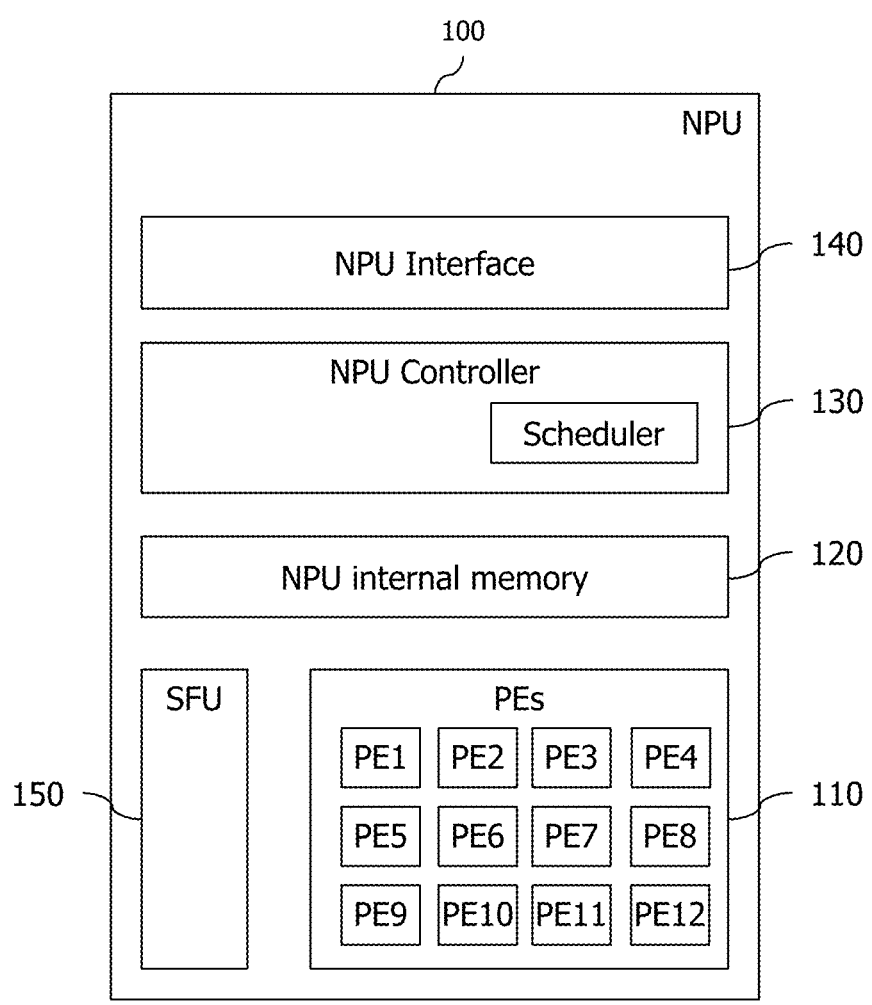
FIG. 3 is a schematic conceptual diagram illustrating a neural processing unit according to an example of the present disclosure.

FIG. 3 is a schematic conceptual diagram illustrating a neural processing unit according to the present disclosure.

Referring to FIG. 3, a neural processing unit (NPU) 100 is a processor specialized to perform an operation for an artificial neural network.

The artificial neural network refers to a network that consists of artificial neurons which, when receiving various inputs or entry stimulations, multiply a weight by the inputs or stimulations, add the multiplied values, and convert a value obtained by additionally adding a deviation using an active function to transmit. The artificial neural network trained as described above may be used to output an inference result from input data.

The neural processing unit 100 may be a semiconductor device implemented by an electric/electronic circuit. The electric/electronic circuit may refer to a circuit including a large number of electronic elements (transistors, capacitors, and the like).

In the case of a transformer and/or CNN-based artificial neural network model, the neural processing unit 100 may select and process matrix multiplication operations, convolution operations, and the like according to the architecture of the artificial neural network.

For example, in each layer of a convolutional neural network (CNN), an input feature map corresponding to input data and a kernel corresponding to weights may be a tensor or matrix composed of a plurality of channels. A convolution operation between the input feature map and the kernel is performed, and a convolution operation and a pooled output feature map are generated in each channel. An activation map of a corresponding channel is generated by applying an activation function to the output feature map. After that, pooling for the activation map may be applied. Here, the activation map may be collectively referred to as an output feature map. For convenience of explanation, the activation map may be referred to as an output feature map.

However, examples of the present disclosure are not limited thereto, and the output feature map means that a matrix multiplication operation or a convolution operation is applied.

To elaborate, the output feature map according to the examples of the present disclosure should be interpreted in a comprehensive sense. For example, the output feature map may be a result of a matrix multiplication operation or a convolution operation. Accordingly, the plurality of processing elements 110 may be modified to further include processing circuitry for processing additional algorithms. That is, some circuit units of the SFU 150 to be described later may be configured to be included in the plurality of processing elements 110.

The neural processing unit 100 may be configured to include a plurality of processing elements 110 for processing convolution and matrix multiplication necessary for the above-described artificial neural network operation.

The neural processing unit 100 may be configured to include each processing circuit optimized for matrix-multiplication operation, convolution operation, activation function operation, pooling operation, stride operation, batch-normalization operation, skip-connection operation, concatenation operation, quantization operation, clipping operation, padding operation, and the like required for the above-described artificial neural network operation.

For example, the neural processing unit 100 may be configured to include the SFU 150 for processing at least one of activation function operation, pooling operation, stride operation, batch-normalization operation, skip-connection operation, concatenation operation, quantization operation, clipping operation, and padding operation for the above-described algorithms.

The neural processing unit 100 may include a plurality of processing elements (PE) 110, an NPU internal memory 120, an NPU controller 130, and an NPU interface 140. Each of the plurality of processing elements 110, the NPU internal memory 120, the NPU controller 130, and the NPU interface 140 may be a semiconductor circuit to which a large number of the electronic elements are connected. Therefore, some of electronic elements may be difficult to identify or be distinguished with the naked eye, but may be identified only by a circuitry operation.

For example, an arbitrary circuit may operate as a plurality of the processing elements 110, or may operate as an NPU controller 130. The NPU controller 130 may be configured to perform the function of the control unit that is configured to control the artificial neural network inference operation of the neural processing unit 100.

The neural processing unit 100 may include a NPU controller 130 including an NPU internal memory 120 configured to store parameters of an artificial neural network model that can be inferred from the plurality of processing elements 110 and the SFU 150 and a scheduler configured to control operation schedules of the plurality of processing elements 110, the SFU 150, and the NPU internal memory 120.

The neural processing unit 100 may be configured to process the feature map corresponding to the encoding and decoding method using scalable video coding (SVC) or scalable feature-map coding (SFC). The above schemes are technologies that variably vary the data transmission rate according to the effective bandwidth and signal to noise ratio (SNR) of a communication channel or communication bus. That is, the neural processing unit 100 may be configured to further include an encoder and a decoder.

The plurality of processing elements 110 may perform a portion of the operations for an artificial neural network.

SFU 150 may perform another portion of the operation for the artificial neural network.

The neural processing unit 100 may be configured to hardware-accelerate the computation of the artificial neural network model using the plurality of processing elements 110 and the SFU 150.

The NPU interface 140 may communicate with various components connected to the neural processing unit 100, for example, memories, via a system bus.

The NPU controller 130 may include a scheduler configured to control the operation of multiple processing elements 110 for inference operations of a neural processing unit 100, as well as operations of the SFU 150 and reading and writing order of the internal memory 120 of the NPU.

The scheduler in the NPU controller 130 may be configured to control the plurality of processing elements 110, the SFU 150, and the NPU internal memory 120 based on data locality information or structure information of the artificial neural network model.

The schedular in the NPU controller 130 may analyze or receive analyzed information on a structure of an artificial neural network model which may operate in the plurality of processing elements 110. The analyzed information may be information generated by a compiler. For example, data of the artificial neural network, which may be included in the artificial neural network model may include node data (i.e., feature map) of each layer, data on a layout of layers, locality information of layers or information about the structure, and at least a portion of weight data (i.e., weight kernel) of each of connection networks connecting the nodes of the layers. The data of the artificial neural network may be stored in a memory provided in the NPU controller 130 or the NPU internal memory 120. However, it is not limited thereto, and the data of the artificial neural network may be stored in a separate cache memory or register file provided in the NPU or SoC including the NPU.

The scheduler in the NPU controller 130 may receive scheduling information of an operation sequence of the artificial neural network model to be performed by the neural processing unit 100 based on data locality information or structure information of the compiled artificial neural network model. For example, the scheduling information may be information generated by a compiler. Scheduling information generated by the compiler may be referred to as machine code or binary code.

That is, the scheduling information utilized by the NPU controller 130 may be information generated by a compiler based on data locality information or structure of an artificial neural network model.

In other words, the compiler can efficiently schedule NPUs depending on how well the compiler understands and reconstructs the locality of artificial neural network data, which is a unique characteristic of artificial neural network models.

In other words, the compiler can efficiently schedule the NPU according to how well the compiler understands the hardware structure and performance of the neural processing unit 100.

In other words, when the artificial neural network model is compiled to be executed in the neural processing unit 100 by the compiler, the artificial neural network data locality may be reconstructed. The artificial neural network data locality can be reconstructed according to the algorithms applied to the artificial neural network model and the operating characteristics of the processor.

To elaborate, the artificial neural network data locality can be reconstructed according to a method in which the neural processing unit 100 processes the corresponding artificial neural network model, for example, feature map tiling or a stationary method of processing elements.

To elaborate, artificial neural network data locality can be reconstructed according to the number of processing elements of the neural processing unit 100 and the capacity of the internal memory.

To elaborate, the artificial neural network data locality can be reconstructed according to the bandwidth of the memory communicating with the neural processing unit 100.

This is because the neural processing unit 100 may differently determine the order of necessary data at each moment in each clock cycle even though the same artificial neural network model is operated and processed by each of the factors described above.

Based on the order of data required for the operation of the artificial neural network model, the compiler may determine data locality and generate compiled machine code based on the order of operation of the layers, convolutions and/or matrix multiplications of the artificial neural network.

The scheduler may be configured to utilize scheduling information contained in machine code. The scheduler in the NPU controller 130 may obtain a memory address value in which the feature map and weight data of the layer of the artificial neural network model are stored based on the scheduling information.

For example, the scheduler in the NPU controller 130 may acquire the memory address value of the feature map of the layer of the artificial neural network model and the weight data which are stored in the memory. Accordingly, the scheduler in the NPU controller 130 may acquire feature map of a layer and weight data of an artificial neural network model to be driven from the main memory, to store the acquired data in the NPU internal memory 120.

Feature map of each layer may have a corresponding memory address value.

Each of the weight data may have a corresponding memory address value.

The scheduler in the NPU controller 130 may be provided with scheduling information about the order of operations of the plurality of processing elements 110 based on information about data locality or structure of the artificial neural network model, such as layout information, locality information, or structure of layers of the artificial neural network of the artificial neural network model. The scheduling information may be generated in a compilation step.

The scheduler in the NPU controller 130 may operate differently from conventional CPU scheduling concepts because it operates based on scheduled information based on information about data locality or structure in the artificial neural network model. The scheduling of the normal CPU operates to provide the highest efficiency in consideration of fairness, efficiency, stability, and reaction time. That is, the normal CPU schedules to perform the most processing during the same time in consideration of a priority and an operation time.

A conventional CPU uses an algorithm which schedules a task in consideration of data such as a priority or an operation processing time of each processing.

In contrast, the scheduler in the NPU controller 130 may control the neural processing unit 100 according to a determined processing order of the neural processing unit 100 based on the data locality information or the information about the structure of the artificial neural network model.

Moreover, the scheduler in the NPU controller 130 may operate the neural processing unit 100 according to the determined the processing order based on the data locality information or the information about the structure of the artificial neural network model and/or data locality information or information about a structure of the neural processing unit 100 to be used.

However, the present disclosure is not limited to the data locality information or the information about the structure of the neural processing unit 100.

The scheduler in the NPU controller 130 may be configured to store the data locality information or the information about the structure of the artificial neural network.

That is, even though only the data locality information or the information about the structure of the artificial neural network of the artificial neural network model is utilized, the scheduler in the NPU controller 130 may determine a processing sequence.

Moreover, the scheduler in NPU controller 130 may determine the processing order of the neural processing unit 100 by considering the data locality information or the information about the structure of the artificial neural network model and data locality information or information about a structure of the neural processing unit 100. Furthermore, it is possible to optimize the processing according to the determined processing order.

That is, the NPU controller 130 may be configured to operate based on machine code compiled by a compiler, but in another example, the NPU controller 130 may be configured to embed an embedded compiler. According to the above-described configuration, the neural processing unit 100 may be configured to receive a file in the form of a framework of various AI software and generate machine code. For example, AI software frameworks may include TensorFlow, PyTorch, Keras, XGBoost, mxnet, DARKNET, ONNX, and the like.

The plurality of processing elements 110 refers to a configuration in which a plurality of processing elements PE1 to PE12 that is configured to operate feature map and weight data of the artificial neural network is deployed. Each processing element may include a multiply and accumulate (MAC) operator and/or an arithmetic logic unit (ALU) operator, but the examples according to the present disclosure are not limited thereto.

Each processing element may further include an additional special function unit for processing the additional special functions.

For example, it is also possible for the processing element PE to be modified and implemented to further include a batch-normalization unit, an activation function unit, an interpolation unit, and the like.

The SFU 150 may include each processing circuit configured to select and process activation function operation, pooling operation, stride operation, batch-normalization operation, skip-connection operation, concatenation operation, quantization operation, clipping operation, padding operation, and the like according to the architecture of the artificial neural network. That is, the SFU 150 may include a plurality of special function arithmetic processing circuit units.

Even though FIG. 3 illustrates a plurality of processing elements as an example, operators implemented by a plurality of multiplier and adder trees may also be configured to be deployed in parallel in one processing element, instead of the MAC. In this case, the plurality of processing elements 110 may also be referred to as at least one processing element including a plurality of operators.

The plurality of processing elements 110 is configured to include a plurality of processing elements PE1 to PE12. The plurality of processing elements PE1 to PE12 of FIG. 3 is merely an example for the convenience of description and the number of the plurality of processing elements PE1 to PE12 is not limited to 12 or any other integer numbers. A size or the number of processing element arrays 110 may be determined by the number of the plurality of processing elements PE1 to PE12. The size of the plurality of processing elements 110 may be implemented by an N×M matrix. Here, N and M are integers greater than zero. The plurality of processing elements 110 may include N×M processing elements. That is, one or more processing elements may be provided.

A number of the plurality of processing elements 110 may be designed in consideration of the characteristic of the artificial neural network model in which the neural processing unit 100 operates.

The plurality of processing elements 110 is configured to perform a function such as addition, multiplication, and accumulation required for the artificial neural network operation. In other words, the plurality of processing elements 110 may be configured to perform a multiplication and accumulation (MAC) operation.

Hereinafter, a first processing element PE1 among the plurality of processing elements 110 will be explained with an example.

Figure 4A:
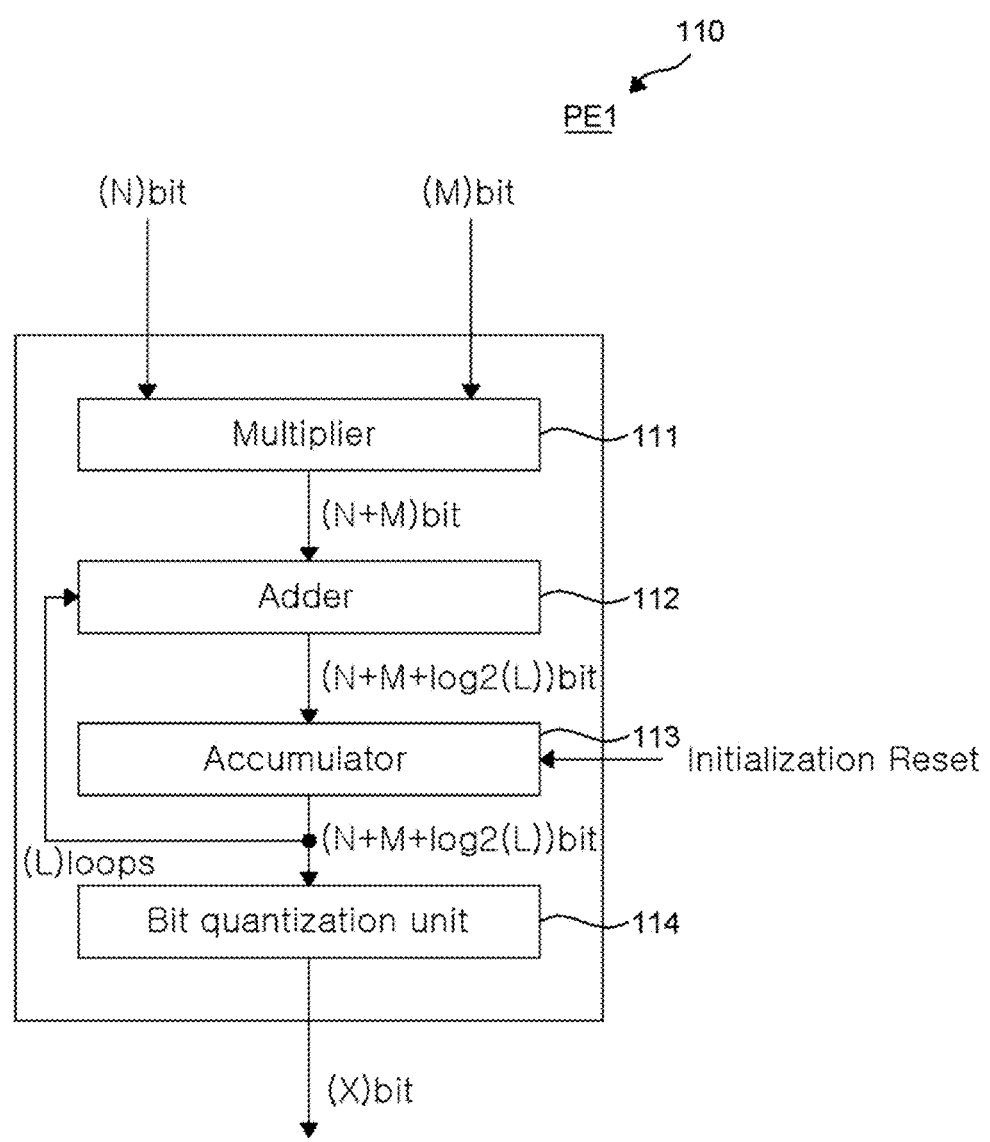
FIG. 4A is a schematic conceptual diagram illustrating one processing element among a plurality of processing elements that may be applied to an example of the present disclosure.

FIG. 4A illustrates one processing element among a plurality of processing elements that may be applied to an example of the present disclosure.

As illustrated in FIG. 3, the neural processing unit 100 according to the examples of the present disclosure may include the plurality of processing elements 110, the NPU internal memory 120 configured to store an artificial neural network model inferred from the plurality of processing elements 110, and the NPU controller 130 configured to control the plurality of processing elements 110 and the NPU internal memory 120 based on data locality information or information about a structure of the artificial neural network model. The plurality of processing elements 110 is configured to perform the MAC operation and the plurality of processing elements 110 is configured to quantize and output the MAC operation result, but the examples of the present disclosure are not limited thereto.

The NPU internal memory 120 may store all or a part of the artificial neural network model in accordance with the memory size and the data size of the artificial neural network model.

As illustrated in FIG. 4A, the first processing element PE1 may include a multiplier 111, an adder 112, an accumulator 113, and a bit quantizer 114. However, the examples according to the present disclosure are not limited thereto and the plurality of processing elements 110 may be modified in consideration of the operation characteristic of the artificial neural network.

The multiplier 111 multiplies input (N) bit data and (M) bit data. The operation value of the multiplier 111 is output as (N+M) bit data.

The multiplier 111 may be configured to receive one variable and one constant.

The accumulator 113 accumulates an operation value of the multiplier 111 and an operation value of the accumulator 113 using the adder 112 as many times as the number of (L) loops. Therefore, a bit width of data of an output unit and an input unit of the accumulator 113 may be output to (N+M+log2(L)) bits. Here, L is an integer greater than zero.

When the accumulation is completed, the accumulator 113 is applied with an initialization reset to initialize the data stored in the accumulator 113 to zero, but the examples according to the present disclosure are not limited thereto.

The bit quantizer 114 may reduce the bit width of the data output from the accumulator 113. The bit quantizer 114 may be controlled by the NPU controller 130. The bit width of the quantized data may be output to (X) bits. Here, X is an integer greater than zero. According to the above-described configuration, the plurality of processing elements 110 is configured to perform the MAC operation and the plurality of processing elements 110 may quantize the MAC operation result to output the result. The quantization may have an effect that the larger the (L) loops, the smaller the power consumption. Further, when the power consumption is reduced, the heat generation may also be reduced. Additionally, when the heat generation is reduced, the possibility of the erroneous operation of the neural processing unit 100 due to the high temperature may be reduced.

Output data (X) bits of the bit quantizer 114 may serve as node data of a subsequent layer or input data of a convolution. When the artificial neural network model is quantized, the bit quantizer 114 may be configured to be supplied with quantized information from the artificial neural network model. However, it is not limited thereto and the NPU controller 130 may also be configured to extract quantized information by analyzing the artificial neural network model. Accordingly, the output data (X) bit is converted to a quantized bit width to be output so as to correspond to the quantized data size. The output data (X) bit of the bit quantizer 114 may be stored in the NPU internal memory 120 with a quantized bit width.

The plurality of processing elements 110 of the neural processing unit 100 according to an example of the present disclosure may include a multiplier 111, an adder 112, and an accumulator 113. The bit quantizer 114 may be selected according to whether quantization is applied or not. In another example, the bit quantization unit may also be configured to be included in the SFU 150.

Figure 4B:
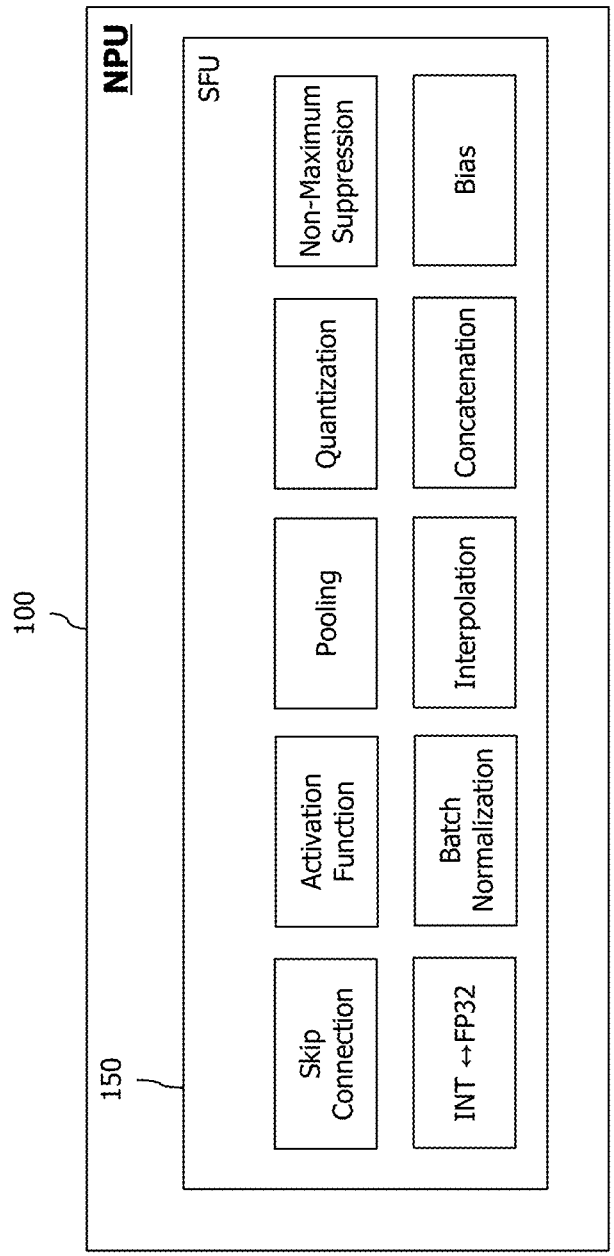
FIG. 4B is a schematic conceptual diagram illustrating an SFU that can be applied to an example of the present disclosure.

FIG. 4B is a schematic conceptual diagram illustrating an SFU that can be applied to an example of the present disclosure.

Referring to FIG. 4B, the SFU 150 may include several functional units. Each functional unit can be operated selectively. Each functional unit can be selectively turned on or turned off. That is, each functional unit can be set.

In other words, the SFU 150 may include various circuit units required for an artificial neural network inference operation.

For example, the circuit units of the SFU 150 may include a functional unit for skip-connection operation, a functional unit for activation function operation, a functional unit for pooling operation, a functional unit for quantization operation, a functional unit for non-maximum suppression (NMS) operation, a functional unit for integer to floating point conversion (INT to FP32) operation, a functional unit for a batch-normalization operation, a functional unit for an interpolation operation, a functional unit for a concatenation operation, a functional unit for a bias operation, and the like.

Functional units of the SFU 150 may be selectively turned on or off according to the data locality information of the artificial neural network model. Data locality information of an artificial neural network model may include turn-off of a corresponding functional unit or control information related to turn-off when an operation for a specific layer is performed.

An activated unit among functional units of the SFU 150 may be turned on. In this way, when some functional units of the SFU 150 are selectively turned off, power consumption of the neural processing unit 100 can be reduced. Meanwhile, in order to turn off some functional units, power gating may be used. Alternatively, clock gating may be performed to turn off some functional units.

Figure 5:
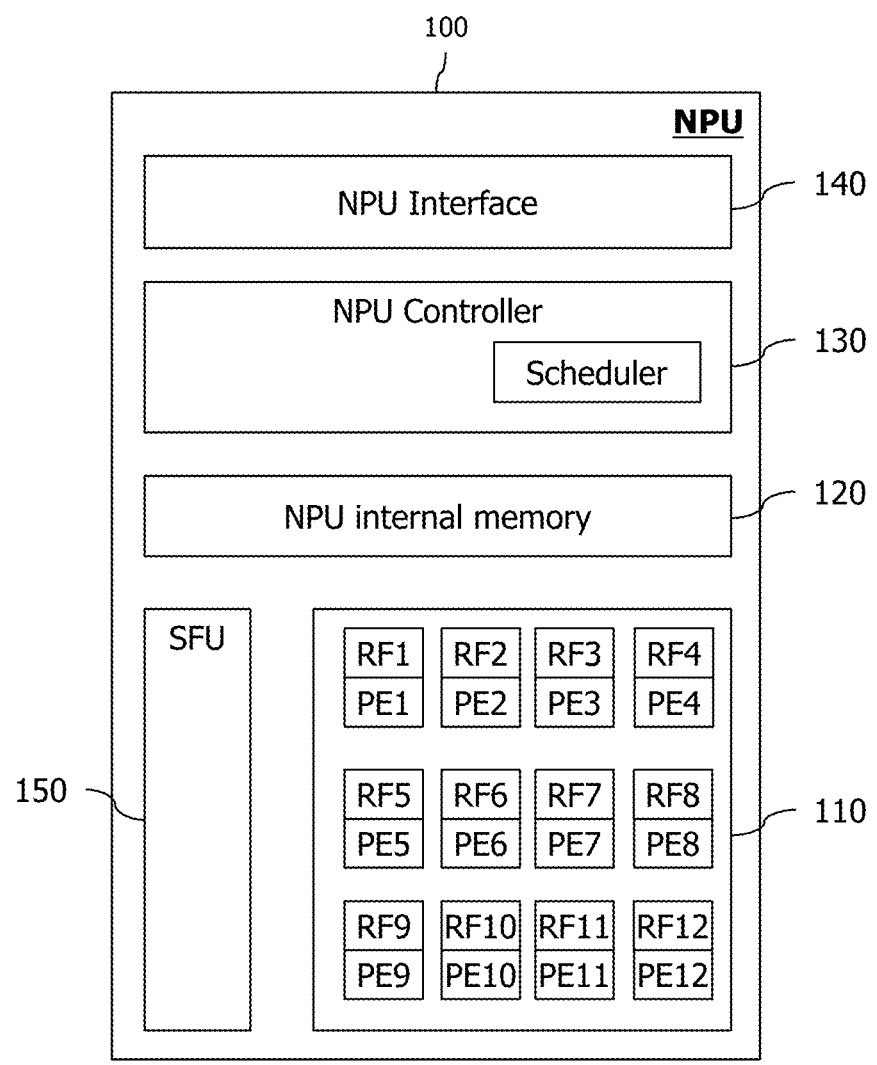
FIG. 5 is an exemplary diagram illustrating a modified example of the neural processing unit 100 shown in FIG. 3.

FIG. 5 illustrates a modified example of the neural processing unit 100 of FIG. 3.

The neural processing unit 100 of FIG. 5 is substantially the same as the neural processing unit 100 exemplarily illustrated in FIG. 3, except for the shown addition of the plurality of processing elements 110. Thus, redundant description will be omitted for the brevity.

The plurality of processing elements 110 exemplarily illustrated in FIG. 5 may further include register files RF1 to RF12, each of which corresponds to processing elements PE1 to PE12 respectively, in addition to a plurality of processing elements PE1 to PE12.

The plurality of processing elements PE1 to PE12 and the plurality of register files RF1 to RF12 of FIG. 5 are merely an example for the convenience of description and the number of the plurality of processing elements PE1 to PE12 and the plurality of register files RF1 to RF12 is not limited to 12 or any other integer number.

A size of, or the number of, processing element arrays 110 may be determined by the number of the plurality of processing elements PE1 to PE12 and the plurality of register files RF1 to RF12. The size of the plurality of processing elements 110 and the plurality of register files RF1 to RF12 may be implemented by an N×M matrix. Here, N and M are integers greater than zero.

An array size of the plurality of processing elements 110 may be designed in consideration of the characteristic of the artificial neural network model in which the neural processing unit 100 operates. For additional explanation, the memory size of the register file may be determined in consideration of a data size, a required operating speed, and a required power consumption of the artificial neural network model to operate.

The register files RF1 to RF12 of the neural processing unit 100 are static memory units which are directly connected to the processing elements PE1 to PE12. For example, the register files RF1 to RF12 may be configured by flip-flops and/or latches. The register files RF1 to RF12 may be configured to store the MAC operation value of the corresponding processing elements PE1 to PE12. The register files RF1 to RF12 may be configured to provide or be provided with the weight data and/or node data to or from the NPU internal memory 120.

It is also possible that the register files RF1 to RF12 are configured to perform a function of a temporary memory of the accumulator during MAC operation.

Technical Difficulties Found by the Inventors of the Present Disclosure

Depending on the purpose of the artificial intelligence service, several types of artificial neural network (ANN) models may exist. For example, when input data is an image or video, a CNN type artificial neural network model for object classification, object detection, object tracking, and the like in an image/video may be used for artificial intelligence service.

In general, an artificial neural network model may have a different amount of computation for each layer. This will be described with reference to FIGS. 6A and 6B.

Figure 6A:
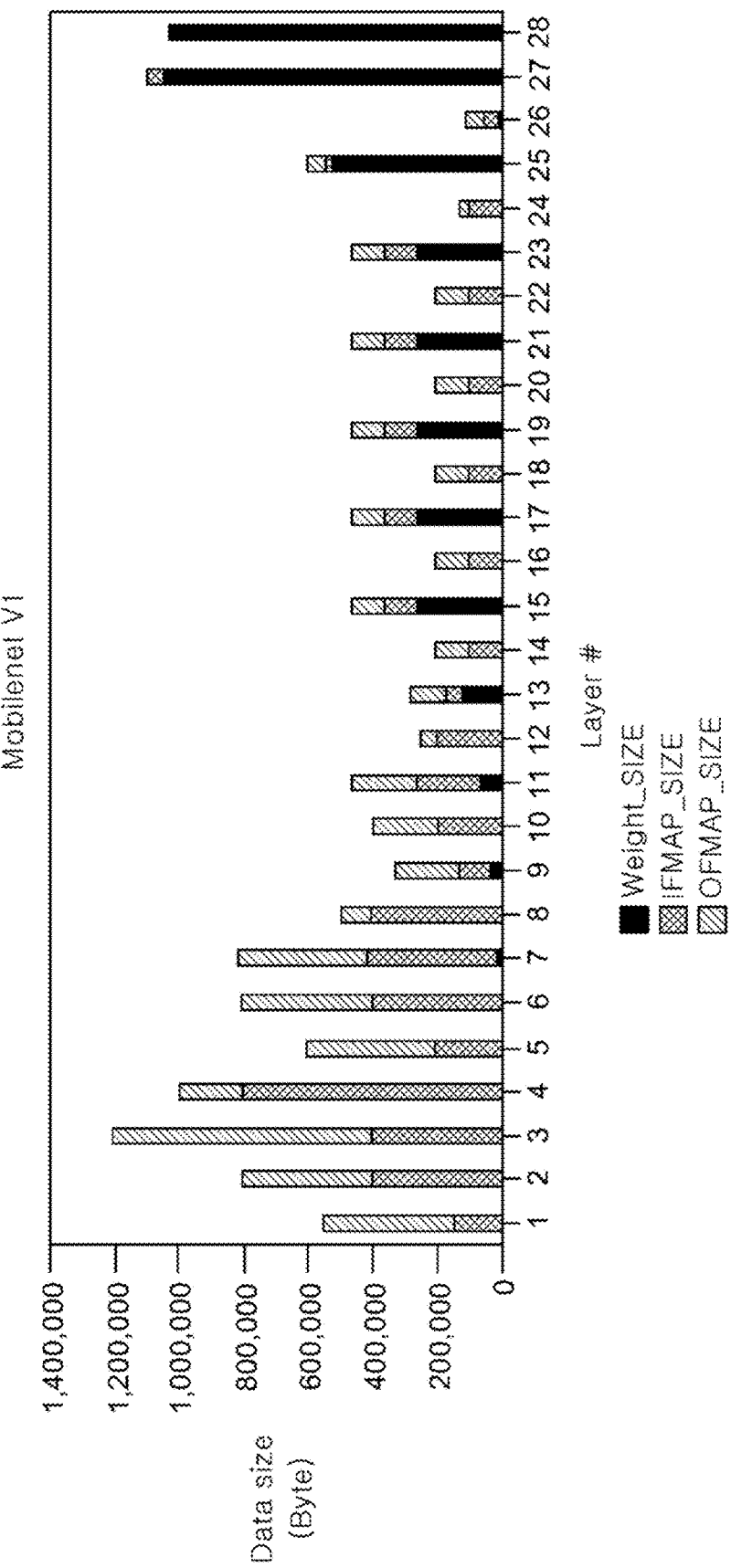
FIG. 6A is an exemplary view illustrating the size of data for each layer in the exemplary artificial neural network model.

FIG. 6A is an exemplary view illustrating the size of data for each layer in the exemplary artificial neural network model, and FIG. 6B is an exemplary table illustrating the size of data for each layer in the exemplary artificial neural network model shown in FIG. 6A.

The exemplary artificial neural network model shown in FIG. 6A may be Mobilenet V1. The horizontal axis shown in FIG. 6A represents layers sequentially in the exemplary artificial neural network model, and the vertical axis represents the size of data.

Referring to layer 1 shown in FIG. 6A, it can be seen that the size of the output feature map OFMAP_SIZE is greater than the size of the input feature map IFMAP_SIZE.

The output feature map of the first layer is transferred to the second layer and becomes the input feature map of the second layer. When the calculation of the second layer is completed, an output feature map is output. The output feature map of the second layer is transferred to the third layer again, and becomes the input feature map of the third layer.

As such, the size of input data input to each layer and the size of an output feature map output from each layer may be different. Accordingly, the amount of calculation may be small in a certain layer, but the amount of calculation may be very large in another layer. In this way, as the amount of computation per layer is greatly fluctuated, a problem of managing power stability may occur.

Each layer may be divided into a plurality of computational steps and processed according to the number of processing elements in the neural processing unit and the capacity limitations of the NPU internal memory 120. Accordingly, the neural processing unit 100 may divide each layer into a plurality of tiles and schedule the plurality of computation steps to be processed. The scheduling may be performed by the compiler. For example, a layer may be divided into four tiles. Each tile may be processed sequentially by a neural processing unit. The compiled artificial neural network model can store the computation order information determined when it is compiled in the scheduler. At this time, PE utilization information may be provided for each computation step.

The amount of computation of each layer can be known by MAC. It can be seen that the amount of computation for each layer differs by a maximum of 227 times.

The neural network processing unit 100 may determine the number of operating processing elements among the plurality of processing elements 110 in proportion to the MAC operation amount for each operation step of layers. In addition, power consumption may increase in proportion to the number of operating processing elements.

Here, knowing the number of processing elements utilized and the total number of processing elements, the utilization rate (%) of the neural processing unit 100 can be calculated.

Thus, the PE utilization rate may be calculated for each computation step of each layer of the artificial neural network model processed by the neural processing unit 100. Furthermore, unless the structure of the AI model processed by the neural processing unit 100 changes, the PE utilization rate for each computation step may be accurately predicted repeatedly. That is, the neural processing unit 100 may repeatedly infer a particular AI model. In such a case, the inventors of the present disclosure recognize that the neural processing unit 100 may repeatedly use the same weight parameters and the same network layer structure.

Also, the greater the difference in MAC computation between adjacent layers, the greater the variation in peak power between adjacent layers. The greater the difference in peak power between neighboring layers, the more the supply voltage VDD may fluctuate. At this time, the inventors of the present disclosure have recognized that the driving frequency can be varied in consideration of the stability of the supply voltage VDD.

In particular, the inventors of the present disclosure recognized that a significant increase in the amount of computation in a particular layer's computational step can result in an increase in instantaneous power consumption, thereby deteriorating system stability.

For example, many processing elements may be operated at the same time for the operation of a certain computational step of a specific layer. A certain amount of power is required to drive each processing element, and when a considerable number of processing elements are simultaneously driven, the required power may rapidly increase. If the neural processing unit is designed specifically for low-power operation, the power supply capability may be relatively less than that of the neural processing unit for a server. Accordingly, such a neural processing unit for an edge device may be relatively more vulnerable to an instantaneous power supply issue, and a supply voltage VDD may fluctuate when the power supply amount increases exponentially. Thus, data stored in the transistor may be lost, especially if the supply voltage VDD drops below the threshold voltage of the transistor. In other words, when the supply voltage VDD is lowered, setup/hold violation problems may occur in the neural processing unit, resulting in malfunction. This can be especially true as the semiconductor foundry's processes go lower, such as 3 nm, 4 nm, 5 nm, and 7 nm.

For another example, the inventors of the present disclosure have recognized that since the plurality of PEs 110 that perform operations for an artificial neural network, for example, add, multiply, and accumulate instantaneously consume a lot of power, sufficient power may not be supplied to other components in the neural processing unit, for example, the internal memory 120. Specifically, the inventors of the present disclosure have recognized that there may be a problem that cannot be ruled out that, if sufficient power is not supplied to the internal memory 120, the possibility of compromising stored data bits may occur.

Furthermore, the inventors of the present disclosure have recognized that when the utilization of PEs is low in a particular computational step, the voltage stability of the neural processing unit can be ensured even if the driving frequency of the neural processing unit is increased.

Disclosures of the Present Disclosure

The inventors of the present disclosure have recognized that the above-mentioned problem may be occurred due to a clock signal supplied to a hardware for performing calculations of the artificial neural network model.

Thus, the inventors of the present disclosure invented a technique for lowering peak power by dividing the plurality of PEs in the NPU into PEs of a first group and PEs of a second group and operating them according to different clock signals.

The examples in which the techniques disclosed by the inventors of the present disclosure will be described with reference to the drawings.

Figure 7A:
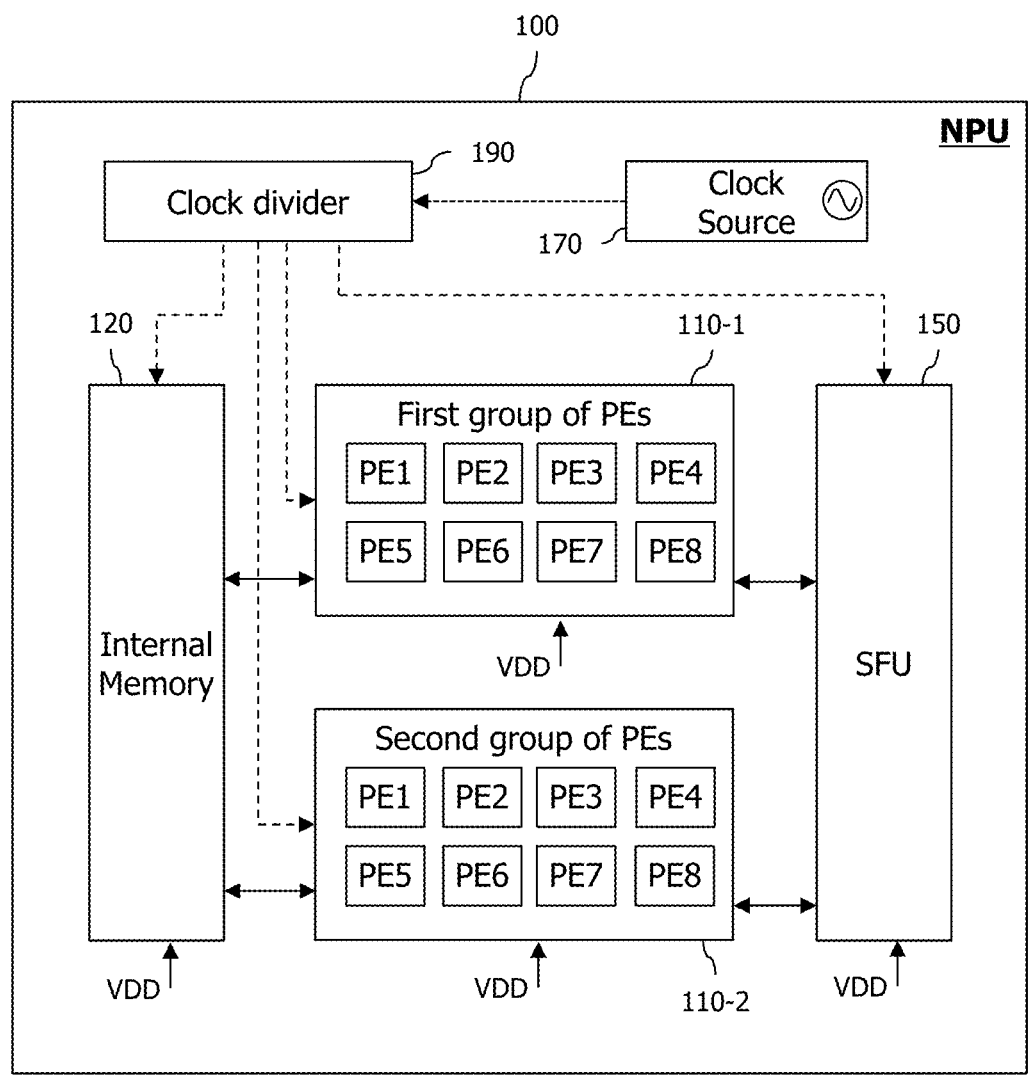
FIG. 7A is an exemplary diagram illustrating the structure of an NPU according to a first example of the present disclosure.

FIG. 7A is an exemplary diagram illustrating the structure of an NPU according to a first example of the present disclosure.

In FIG. 7A, the NPU 100 may include a first group of PEs 110-1, a second group of PEs 110-2, internal memory 120, SFU 150, a clock source 170, and clock dividers 190.

In some examples, the NPU 100 may further include an NPU controller 130 and an NPU interface 140, as shown in FIG. 3 or FIG. 5.

The first group of PEs 110-1 and the second group of PEs 110-2 shown in FIG. 7A can be understood to be a division of the plurality of PEs 110 shown in FIG. 3 or FIG. 5. While the number of PEs in each group is exemplarily shown as eight in FIG. 7A, it will be appreciated that the number of PEs in each group may vary. Furthermore, the number of PEs in each group may be semi-fixed or may change dynamically. For example, the PEs 110-1 in the first group may be set to include ten PEs, and the PEs 110-2 in the second group may be set to include six PEs. These changes may be made under the control of the NPU controller 130.

Each PE or each group of PEs may also be referred to as an NPU core, an NPU engine, an NPU thread, and the like. The NPU core, NPU engine, NPU thread, and the like may be a semiconductor circuit with a number of transistors connected thereto.

Each of the PEs 110-1 of the first group, the PEs 110-02 of the second group, the internal memory 120, the NPU controller 130, the NPU interface 140, the SFU 150, the clock source 170, and the clock divider 190 may be semiconductor circuits with numerous transistors connected thereto. As such, some of them may be difficult to identify and distinguish with the naked eye, and may be identified only by operation thereof.

For example, the PEs 110-1 of the first group and the PEs 110-2 of the second group may be referred to as the first circuit.

For example, the internal memory 120 may be referred to as the second circuit.

For example, the SFU 150 may be referred to as the third circuit.

For example, the clock source 170 may be referred to as a fourth circuit configured to output at least one clock signal.

For example, the clock divider 190 may be referred to as a fifth circuit configured to convert the at least one clock signal and output a plurality of clock signals. The clock divider 190 may calibrate or adjust the phase of the one clock signal output by the clock source 170 to output the plurality of clock signals.

However, the examples of the present disclosure are not limited to this, and a particular circuit may operate as a plurality of PEs 110 or as an NPU controller 130.

When the clock source 170 generates and outputs an original clock signal, the clock divider 190 may bypass the original clock signal or may delay or shift the phase of the original clock signal.

For example, the clock divider 190 may bypass the original clock signal from the clock source 170 and transmit it to the PEs 110-1 of the first group. Alternatively, the clock divider 190 may transmit to the first group of PEs 110-1 a first delayed clock signal that delays or shifts the phase of the original clock signal from the clock source 170. Further, the clock divider 190 may transmit a second delayed clock signal that delays or shifts the phase of the original clock signal from the clock source 170 to the second group of PEs 110-2. The internal memory 120 may also be configured to receive the original clock signal from the clock divider 190 as a bypass.

While not shown in FIG. 7A, the SFU 150 may be directly connected to the NPU internal memory 120.

On the one hand, the internal memory 120 and the SFU 150 shown in FIG. 7A may also operate according to a clock signal (e.g., an original clock signal or a phase-delayed clock signal) output from the clock divider 190.

On the other hand, when the PEs 110-1 of the first group and the PEs 110-2 of the second group illustrated in FIG. 7A have completed performing operations on a particular layer of the artificial neural network model, the PEs 110-1 of the first group and the PEs 110-2 of the second group may output an output feature map, respectively, according to the clock signal provided by the clock divider 190. Specifically, the PEs 110-1 of the first group may output the first output feature map according to a particular the clock signal provided from the clock divider 190 (e.g., the original clock signal or the first delayed clock signal). Similarly, the PEs 110-2 of the second group may output the second output feature map according to a particular clock signal (e.g., the second delayed clock signal) provided by the clock divider 190.

If the first output feature map output by the first group of PEs 110-1 and the second output feature map output by the second group of PEs 110-2 are independent of each other or not dependent on each other, the SFU 150 may process the output feature map received first in a first input first output (FIFO) manner.

On the other hand, when the PEs 110-1 of the first group and the PEs 110-2 of the second group shown in FIG. 7A have finished performing the operation on a particular layer of the artificial neural network model, the PEs 110-1 of the first group and the PEs 110-2 of the second group may output the result of the operation, i.e., the output feature map, in accordance with any one of the first portion and the second portion of the clock signal. To this end, at least one of the first group of PEs 110-1 and the second group of PEs 110-2 may further comprise a delay buffer (e.g., a shift register). The delay buffer (e.g., shift register) may perform a time delay, such that the output is adjusted in time with the temporally later of the first portion and the second portion of the clock signal.

For example, the output of the second group of PEs 110-2 may be connected to a delay buffer (e.g., shift register).

Alternatively, the first group of PEs 110-1 illustrated in FIG. 7A may output a first output feature map adjusted to a first portion of a particular clock, and the second group of PEs 110-2 may output a second output feature map adjusted to a second portion of the particular clock signal. In this case, the SFU 150 may include a delay buffer (e.g., a shift register). The SFU 150 may time-delay the output feature map received in response to the temporally earlier of the first and second portions of the particular clock so that it is time-synchronized with the output feature map to be received in response to the temporally later of the first and second portions of the particular clock signal.

Alternatively, if the first output feature map output by the first group of PEs 110-1 and the second output feature map output by the second group of PEs 110-2 are independent of each other or not dependent on each other, the SFU 150 may process the output feature map received in time with the temporally earlier of the first and second portions of the clock first.

That is, the first output from the first group of PEs 110-1 and the second output from the second group of PEs 110-2 may be transmitted based on the first portion of the particular clock signal.

The reference phase for the second group of PEs 110-2 may be converted from the second portion of the clock to the first portion of the clock signal.

Each element within the NPU 100 illustrated in FIG. 7A may have a supply voltage VDD input.

While a common supply voltage VDD is shown as being input in FIG. 7A, examples of the present disclosure are not limited thereto.

In some examples, each element of the NPU 100 may be configured to have an independent or separate supply voltage VDD input.

In some examples, each element within the NPU 100 may be configured to have an independent or separate supply voltage VDD input.

In some examples, certain elements within the NPU 100 may be configured to have a second supply voltage input that is different from the first supply voltage.

As described above, an example of the present disclosure may divide the plurality of PEs 110 shown in FIG. 3 or FIG. 5 into a first group of PEs 110-1 and a second group of PEs 110-2 as shown in FIG. 7A, and then cause the PEs 110-1 of the first group and the PEs 110-2 of the second group to operate distributedly according to different clock signals, thereby reducing the peak power of the plurality of PE groups 110-1 and 110-2.

Further, an example of the present disclosure may lower manufacturing cost by simply adding a phase converter 175 to provide a plurality of clock signals with different phases, rather than requiring multiple clock sources 170.

Figure 7B:
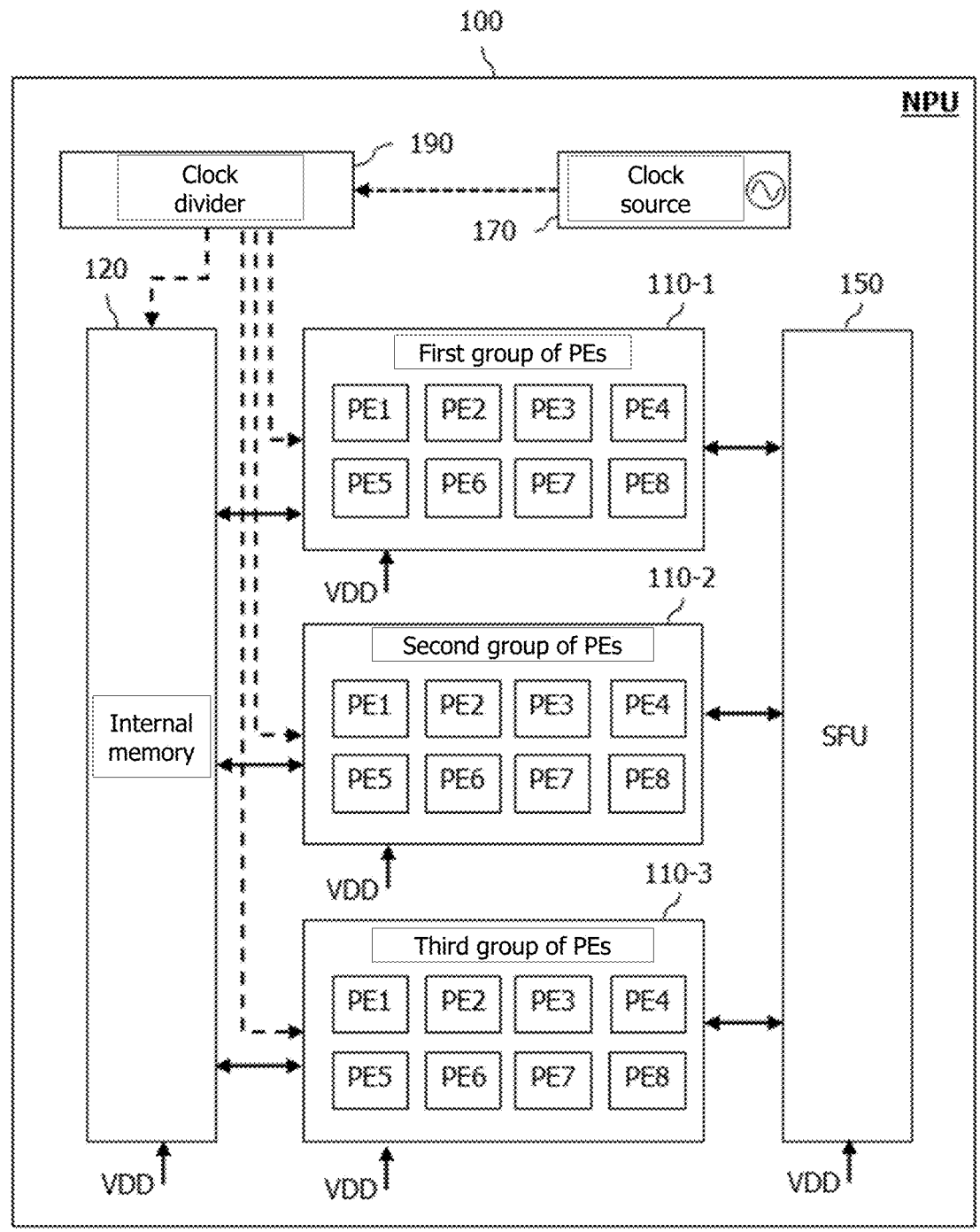
FIG. 7B is an exemplary diagram illustrating the structure of an NPU according to a first variant of the first example of the present disclosure.

FIG. 7B is an exemplary diagram illustrating the structure of an NPU according to a first variant of the first example of the present disclosure.

In FIG. 7B, the NPU 100 may include a first group of PEs 110-1, a second group of PEs 110-2, a third group of PEs 110-3, an internal memory 120, an SFU 150, a clock source 170, and a clock divider 190.

In some examples, the NPU 100 may further include an NPU controller 130 and an NPU interface 140, as shown in FIG. 3 or 5.

The PEs 110-1 of the first group, the PEs 110-2 of the second group, and the PEs 110-3 of the third group shown in FIG. 7B can be understood as a division of the plurality of PEs 110 shown in FIG. 3 or FIG. 5. The number of PEs in each group is exemplarily shown as eight in FIG. 7B, but it will be appreciated that the number of PEs in each group may vary. Further, the number of PEs in each group may be semi-fixed or may change dynamically. For example, the PEs 110-1 of the first group may be set to include ten PEs, the PEs 110-2 of the second group may be set to include eight PEs, and the PEs 110-3 of the third group may be set to include six PEs. These changes may be made under the control of the NPU controller 130.

Each PE or each group of PEs may also be referred to as an NPU core, an NPU engine, an NPU thread, and the like. The NPU core, NPU engine, NPU thread, and the like may be a semiconductor circuit with a number of transistors connected thereto.

Each of the PEs 110-1 of the first group, the PEs 110-02 of the second group, the PEs 110-3 of the third group, the internal memory 120, the NPU controller 130, the NPU interface 140, the SFU 150, the clock source 170, and the clock divider 190 may be semiconductor circuits with numerous transistors connected thereto. As such, some of them may be difficult to identify and distinguish with the naked eye, and may be identified only by operation thereof.

For example, the PEs 110-1 of the first group, the PEs 110-2 of the second group, and the PEs 110-3 of the third group may be referred to as the first circuit.

For example, the internal memory 120 may be referred to as the second circuit.

For example, the SFU 150 may be referred to as the third circuit.

For example, the clock source 170 may be referred to as a fourth circuit configured to output at least one clock signal.

For example, the clock divider 190 may be referred to as a fifth circuit configured to convert the at least one clock signal and output a plurality of clock signals. The clock divider 190 may calibrate or adjust the phase of the one clock signal output by the clock source 170 to output the plurality of clock signals.

However, the examples of the present disclosure are not limited to this, and a particular circuit may operate as a plurality of PEs 110 or as an NPU controller 130.

When the clock source 170 generates and outputs an original clock signal, the clock divider 190 may bypass the original clock signal or may delay or shift the phase of the original clock signal.

For example, the clock divider 190 may bypass the original clock signal from the clock source 170 and transmit it to the PEs 110-1 of the first group. Alternatively, the clock divider 190 may transmit to the first group of PEs 110-1 a first delayed clock signal that delays or shifts the phase of the original clock signal from the clock source 170. Further, the clock divider 190 may transmit a second delayed clock signal that delays or shifts the phase of the original clock signal from the clock source 170 to the second group of PEs 110-2. Further, the clock divider 190 may transmit a third delayed clock signal that delays or shifts the phase of the original clock signal from the clock source 170 to the PEs 110-3 of the third group. The internal memory 120 may also be configured to receive the original clock signal from the clock divider 190 as a bypass.

While not shown in FIG. 7B, the SFU 150 may be directly connected to the NPU internal memory 120.

On the one hand, the internal memory 120 and the SFU 150 shown in FIG. 7B may also operate according to a clock signal (e.g., an original clock signal or a phase-delayed clock signal) output from the clock divider 190.

On the other hand, when the PEs 110-1 of the first group, the PEs 110-2 of the second group, and the PEs 110-3 of the third group illustrated in FIG. 7B have completed performing operations on a particular layer of the artificial neural network model, the PEs 110-1 of the first group, the PEs 110-2 of the second group, and the PEs 110-3 of the third group may output an output feature map, respectively, according to the clock signal provided by the clock divider 190. Specifically, the PEs 110-1 of the first group may output the first output feature map according to a particular clock signal provided from the clock divider 190 (e.g., the original clock signal or the first delayed clock signal). Similarly, the PEs 110-2 of the second group may output the second output feature map according to a particular clock signal (e.g., the second delayed clock signal) provided by the clock divider 190. Further, the PEs 110-3 of the third group may output the third output feature map according to a particular clock signal (e.g., the third delayed clock signal) provided by the clock divider 190.

If the first output feature map output by the first group of PEs 110-1, the second output feature map output by the second group of PEs 110-2, and the third output feature map output by the third group of PEs 110-3 are independent of each other or not dependent on each other, the SFU 150 may process the output feature map received first in a first input first output (FIFO) manner.

On the other hand, when the PEs 110-1 of the first group, the PEs 110-2 of the second group, and the PEs 110-3 of the third group illustrated in FIG. 7B have finished performing the operation on a particular layer of the artificial neural network model, the PEs 110-1 of the first group, the PEs 110-2 of the second group, and the PEs 110-3 of the third group may output the result of the operation, i.e., the output feature map, according to any one of the first portion, the second portion, and the third portion of the clock signal. For this purpose, at least one of the first group of PEs 110-1, the second group of PEs 110-2 and the third group of PEs 110-3 may further comprise a delay buffer (e.g., a shift register). The delay buffer (e.g., shift register) may perform a time delay, such that the output is adjusted in time with the later of the first, second, and third portions of the clock signal.

For example, the output of the PEs 110-2 of the second group may be connected to a delay buffer (e.g., a shift register). Similarly, the output of the PEs 110-3 of the third group may be connected to a delay buffer (e.g., a shift register).

Alternatively, the PEs 110-1 of the first group illustrated in FIG. 7B may output a first output feature map corresponding to a first portion of a particular clock, and the PEs 110-2 of the second group may output a second output feature map corresponding to a second portion of the particular clock signal. Furthermore, the PEs 110-3 of the third group may output the third output feature map corresponding to the third portion of the particular clock signal. In this case, the SFU 150 may include a delay buffer (e.g., a shift register). The SFU 150 may time-delay the output feature map received in response to the temporally earlier of the first, second, and third portions of the particular clock so that it is time-synchronized with the output feature map to be received in response to the temporally later of the first, second, and third portions of the particular clock signal.

Alternatively, if the first output feature map output by the PEs 110-1 of the first group, the second output feature map output by the PEs 110-2 of the second group, and the third output feature map output by the PEs 110-3 of the third group are independent or not dependent on each other, the SFU 150 may process the output feature map received in time with the temporally earlier of the first, second, and third portions of the clock first.

That is, the first output from the PEs 110-1 of the first group, the second output from the PEs 110-2 of the second group, and the third output from the PEs 110-3 of the third group may be transmitted based on the first portion of the particular clock signal.

The reference phase for the PEs 110-2 of the second group may be converted from the second portion of the clock to the first portion of the clock signal. Similarly, the reference phase for the PEs 110-3 of the third group may be converted from the third portion of the clock to the first portion of the clock signal.

Each element within the NPU 100 illustrated in FIG. 7B may have a supply voltage VDD input.

While a common supply voltage VDD is shown as being input in FIG. 7B, examples of the present disclosure are not limited thereto.

In some examples, each element of the NPU 100 may be configured to have an independent or separate supply voltage VDD input.

In some examples, each element within the NPU 100 may be configured to have an independent or isolated supply voltage VDD input.

In some examples, certain elements within the NPU 100 may be configured to have a second supply voltage input that is different from the first supply voltage.

As described above, an example of the present disclosure may divide the plurality of PEs 110 shown in FIG. 3 or 5 into a first group of PEs 110-1, a second group of PEs 110-2, and a third group of PEs 110-3, as shown in FIG. 7B, and allow the groups to operate distributedly according to different clock signals, thereby reducing peak power.

Furthermore, an example of the present disclosure may lower manufacturing cost by simply adding a clock divider 190, rather than multiple clock sources, to provide multiple clock signals with different phases.

Figure 7C:
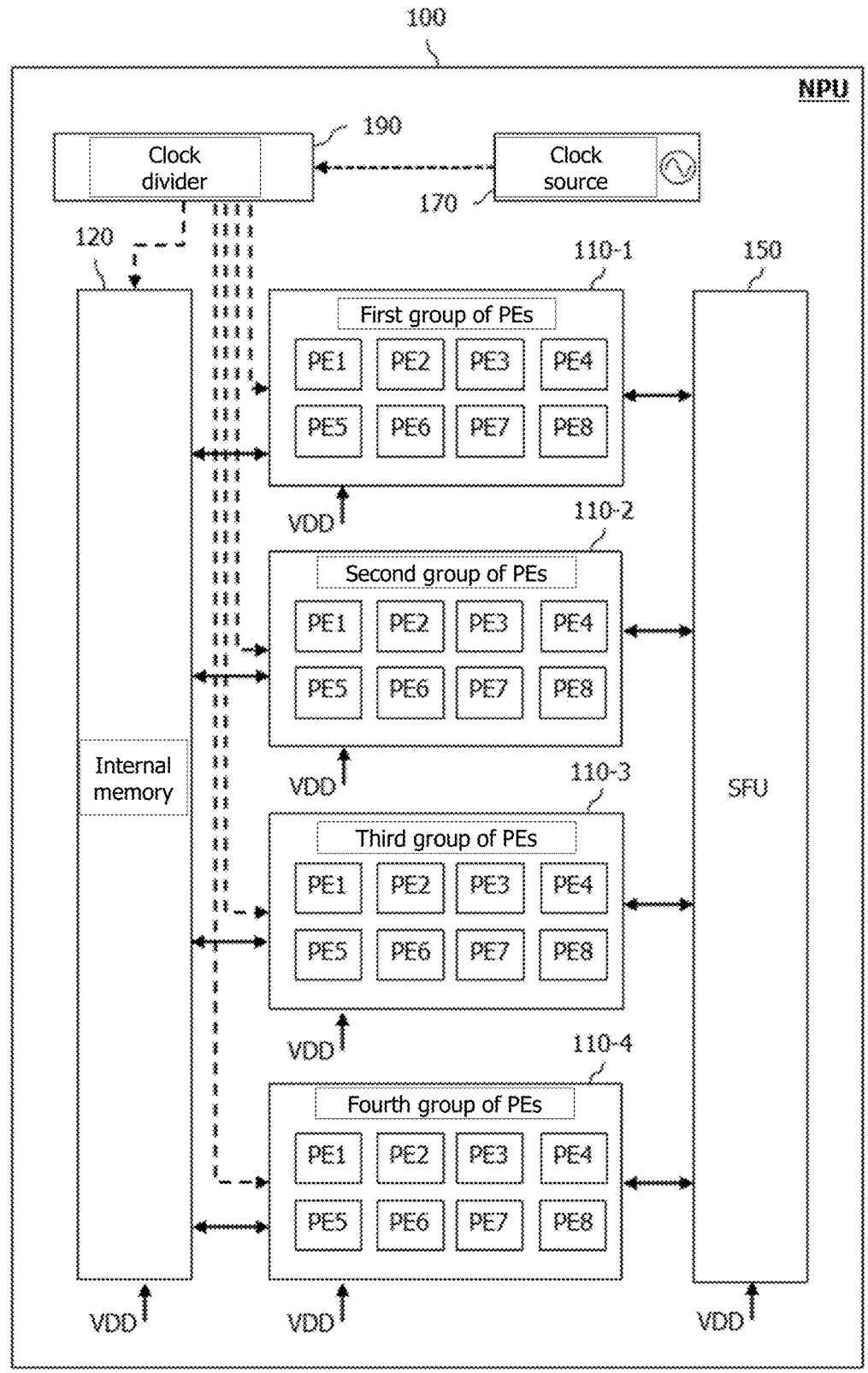
FIG. 7C is an exemplary diagram illustrating the structure of an NPU according to a second variant of the first example of the present disclosure.

FIG. 7C is an exemplary diagram illustrating the structure of an NPU according to a second variant of the first example of the present disclosure.

In FIG. 7C, the NPU 100 may include a first group of PEs 110-1, a second group of PEs 110-2, a third group of PEs 110-3, a fourth group of PEs 110-4, an internal memory 120, a SFU 150, a clock source 170, and a clock divider 190.

In some examples, the NPU 100 may further include an NPU controller 130 and an NPU interface 140, as shown in FIG. 3 or FIG. 5.

The first group of PEs 110-1, second group of PEs 110-2, third group of PEs 110-3, and fourth group of PEs 110-4 shown in FIG. 7B can be understood as a division of the plurality of PEs 110 shown in FIG. 3 or FIG. 5. While the number of PEs in each group is exemplarily shown as eight in FIG. 7C, it will be appreciated that the number of PEs in each group may vary. Further, the number of PEs in each group may be semi-fixed or may change dynamically. For example, the PEs 110-1 of the first group may be set to include fourteen PEs, the PEs 110-2 of the second group may include eight PEs, the PEs 110-3 of the third group may include six PEs, and the PEs 110-4 of the fourth group may include four PEs. These changes may be made under the control of the NPU controller 130.

Each PE or each group of PEs may also be referred to as an NPU core, an NPU engine, an NPU thread, and the like. The NPU core, NPU engine, NPU thread, and the like may be a semiconductor circuit with a number of transistors connected thereto.

Each of the PEs 110-1 of the first group, the PEs 110-02 of the second group, the PEs 110-3 of the third group, the PEs 110-4 of the fourth group, the internal memory 120, the NPU controller 130, the NPU interface 140, the SFU 150, the clock source 170, and the clock divider 190 may be semiconductor circuits with numerous transistors connected thereto. As such, some of them may be difficult to identify and distinguish with the naked eye, and may be identified only by operation thereof.

For example, the PEs 110-1 of the first group, the PEs 110-2 of the second group, the PEs 110-3 of the third group, and the PEs 110-4 of the fourth group may be referred to as the first circuit.

For example, the internal memory 120 may be referred to as the second circuit.

For example, the SFU 150 may be referred to as the third circuit.

For example, the clock source 170 may be referred to as a fourth circuit configured to output at least one clock signal.

For example, the clock divider 190 may be referred to as a fifth circuit configured to convert the at least one clock signal and output a plurality of clock signals. The clock divider 190 may calibrate or adjust the phase of the one clock signal output by the clock source 170 to output the plurality of clock signals.

However, the examples of the present disclosure are not limited to this, and a particular circuit may operate as a plurality of PEs 110 or as an NPU controller 130.

When the clock source 170 generates and outputs an original clock signal, the clock divider 190 may bypass the original clock signal or may delay or shift the phase of the original clock signal.

For example, the clock divider 190 may bypass the original clock signal from the clock source 170 and transmit it to the PEs 110-1 of the first group. Alternatively, the clock divider 190 may transmit to the first group of PEs 110-1 a first delayed clock signal that delays or shifts the phase of the original clock signal from the clock source 170. Further, the clock divider 190 may transmit a second delayed clock signal that delays or shifts the phase of the original clock signal from the clock source 170 to the second group of PEs 110-2. Further, the clock divider 190 may transmit a third delayed clock signal that delays or shifts the phase of the original clock signal from the clock source 170 to the PEs 110-3 of the third group. Further, the clock divider 190 may transmit a fourth delayed clock signal that delays or shifts the phase of the original clock signal from the clock source 170 to the PEs 110-4 of the fourth group. The internal memory 120 may also be configured to receive the original clock signal from the clock divider 190 as a bypass.

While not shown in FIG. 7C, the SFU 150 may be directly connected to the NPU internal memory 120.

On the one hand, the internal memory 120 and the SFU 150 shown in FIG. 7C may also operate according to a clock signal (e.g., an original clock signal or a phase-delayed clock signal) output from the clock divider 190.

On the other hand, when the first group of PEs 110-1, the second group of PEs 110-2, the third group of PEs 110-3, and the fourth group of PEs 110-4 shown in FIG. 7C have completed performing operations on a particular layer of the artificial neural network model, the PEs 110-1 of the first group, the PEs 110-2 of the second group, the PEs 110-3 of the third group, and the PEs 110-4 of the fourth group may output an output feature map, respectively, according to a clock signal provided by the clock divider 190. Specifically, the PEs 110-1 of the first group may output the first output feature map according to a particular clock signal provided by the clock divider 190 (e.g., the original clock signal or the first delayed clock signal). Similarly, the PEs 110-2 of the second group may output the second output feature map according to a particular clock signal (e.g., the second delayed clock signal) provided by the clock divider 190. Further, the PEs 110-3 of the third group may output the third output feature map according to a particular clock signal (e.g., the third delayed clock signal) provided by the clock divider 190. Further, the PEs 110-4 of the fourth group may output the fourth output feature map according to a particular clock signal (e.g., the fourth delayed clock signal) provided by the clock divider 190.

When the first output feature map output by the first group of PEs 110-1, the second output feature map output by the second group of PEs 110-2, the third output feature map output by the third group of PEs 110-3, and the fourth output feature map output by the fourth group of PEs 110-4 are independent of each other or not dependent on each other, the SFU 150 may process the output feature map received first in a first input first output (FIFO) manner.

Meanwhile, when the PEs 110-1 of the first group, the PEs 110-2 of the second group, the PEs 110-3 of the third group, and the PEs 110-3 of the fourth group illustrated in FIG. 7B have finished performing operations on a particular layer of the artificial neural network model, the PEs 110-1 of the first group, the PEs 110-2 of the second group, the PEs 110-3 of the third group, and the PEs 110-4 of the fourth group may output the result of the computation, i.e., the output feature map, according to any one of the first portion, the second portion, the third portion, and the fourth portion of the clock signal. For this purpose, at least one of the PEs 110-1 of the first group, the PEs 110-2 of the second group, the PEs 110-3 of the third group, and the PEs 110-4 of the fourth group may further comprise a delay buffer (e.g., a shift register). The delay buffer (e.g., shift register) may perform a time delay, such that the output is adjusted in time with the later of the first, second, third, and fourth portions of the clock signal.

For example, the output of the PEs 110-2 of the second group may be connected to a delay buffer (e.g., a shift register). Similarly, the output of the PEs 110-3 of the third group may be connected to a delay buffer (e.g., a shift register). The output of the PEs 110-4 of the fourth group may also be connected to the delay buffer (e.g., shift register).

Alternatively, the PEs 110-1 of the first group shown in FIG. 7C may output a first output feature map corresponding to a first portion of a particular clock, and the PEs 110-2 of the second group may output a second output feature map corresponding to a second portion of the particular clock signal. Further, the PEs 110-3 of the third group may output a third output feature map corresponding to a third portion of the particular clock signal. Further, the PEs 110-4 of the fourth group may output the fourth output feature map corresponding to the fourth portion of the particular clock signal. In this case, the SFU 150 may include a delay buffer (e.g., a shift register). The SFU 150 may time-delay the output feature map received in time with the temporally earlier of the first, second, third, and fourth portions of the particular clock so that it is time-synchronized with the output feature map to be received in time with the temporally later of the first, second, third, and fourth portions of the particular clock signal.

Alternatively, if the first output feature map output by the first group of PEs 110-1, the second output feature map output by the second group of PEs 110-2, the third output feature map output by the third group of PEs 110-3, and the fourth output feature map output by the fourth group of PEs 110-4 are independent of each other or not dependent on each other, the SFU 150 may process the output feature map received in time with the earlier of the first, second, third, and fourth portions of the clock first.

That is, the first output from the PEs 110-1 of the first group, the second output from the PEs 110-2 of the second group, the third output from the PEs 110-3 of the third group, and the fourth output from the PEs 110-4 of the fourth group may be transmitted based on the first portion of the particular clock signal.

The reference phase for the PEs 110-2 of the second group may be converted from the second portion of the clock to the first portion of the clock signal. Similarly, the reference phase for the PEs 110-3 of the third group may be converted from the third portion of the clock to the first portion of the clock signal. Further, the reference phase for the PEs 110-4 of the fourth group may be converted from the fourth portion of the clock to the first portion.

Each element within the NPU 100 shown in FIG. 7C may have a supply voltage VDD input.

While a common supply voltage VDD is shown as being input in FIG. 7C, examples of the present disclosure are not limited thereto.

In some examples, each element of the NPU 100 may be configured to have an independent or separate supply voltage VDD input.

In some examples, each element within the NPU 100 may be configured to have an independent or isolated supply voltage VDD input.

In some examples, certain elements within the NPU 100 may be configured to have a second supply voltage input that is different from the first supply voltage.

As described above, an example of the present disclosure can reduce peak power by dividing the plurality of PEs 110 shown in FIG. 3 or 5 into a first group of PEs 110-1, a second group of PEs 110-2, a third group of PEs 110-3, and a fourth group of PEs 110-4 as shown in FIG. 7C, and allowing the groups to operate distributedly according to different clock signals.

Furthermore, an example of the present disclosure may lower manufacturing cost by simply adding a clock divider 190, rather than multiple clock sources, to provide multiple clock signals with different phases.

Figure 8A:
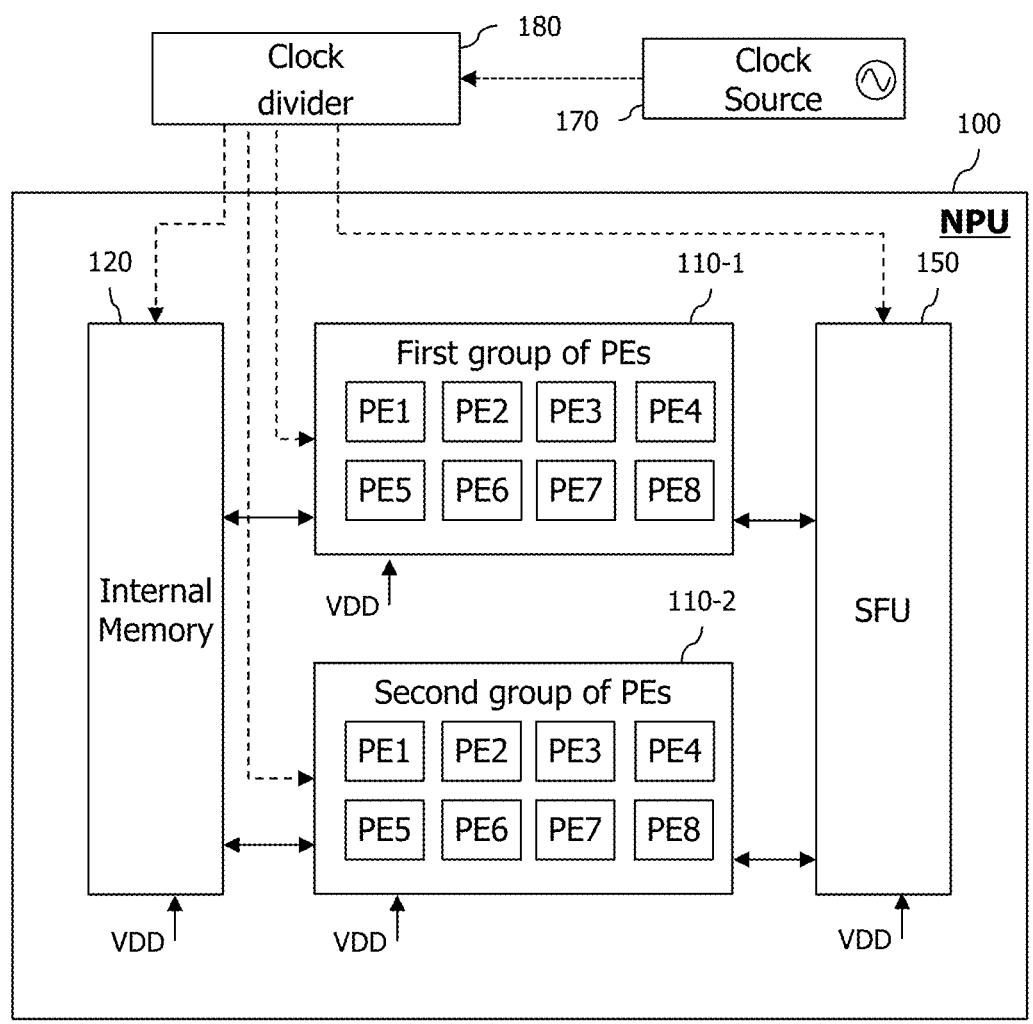
FIG. 8A is an exemplary diagram illustrating the structure of an NPU according to a second example of the present disclosure.

FIG. 8A is an illustrative block diagram of a structure of an NPU according to a second example of the present disclosure.

In FIG. 8A, the NPU 100 may include PEs 110-1 of the first group and PEs 110-2 of the second group, internal memory 120, and SFU 150, but the NPU 100 may further include an NPU controller 130 and an NPU interface 140, as shown in FIG. 3 or 5.

Each of the PEs 110-1 of the first group, the PEs 110-02 of the second group, the internal memory 120, the NPU controller 130, the NPU interface 140, and the SFU 150 may be semiconductor circuits with numerous transistors connected thereto. As such, some of these may be difficult to identify and distinguish with the naked eye, and may be identified only by operation thereof.

Referring to FIG. 8A, the clock source 170 and the clock divider 190 are shown as being external to the NPU 100 rather than internal to the NPU 100. Since FIG. 8A is otherwise identical to that shown in FIG. 7A, FIG. 8A will not be described separately, and the description described with reference to FIG. 7A will be adopted.

Figure 8B:
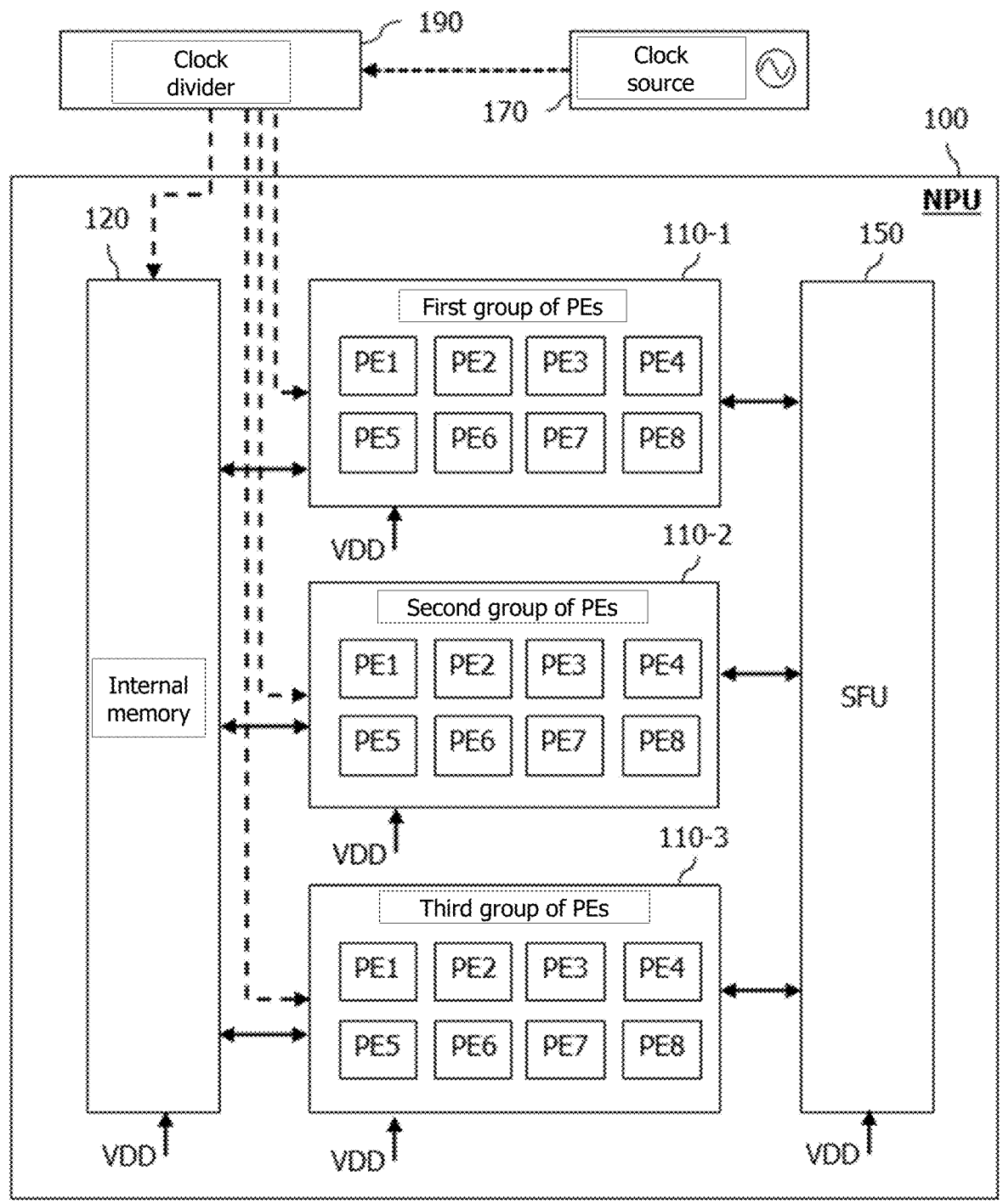
FIG. 8B is an exemplary diagram illustrating the structure of an NPU according to a first variant of the second example of the present disclosure.

FIG. 8B is an exemplary diagram illustrating a structure of an NPU according to a first variant of the second example of the present disclosure.

In FIG. 8B, the NPU 100 may include the PEs 110-1 of the first group, the PEs 110-2 of the second group, the PEs 110-3 of the third group, the internal memory 120, and the SFU 150, but the NPU 100 may further include an NPU controller 130 and an NPU interface 140 as shown in FIG. 3 or FIG. 5.

Each of the PEs 110-1 of the first group, the PEs 110-2 of the second group, the PEs 110-3 of the third group, the internal memory 120, the NPU controller 130, the NPU interface 140, and the SFU 150 may be a semiconductor circuit with numerous transistors connected thereto. As such, some of these may be difficult to identify and distinguish with the naked eye, and may only be identified by operation thereof.

Referring to FIG. 8B, the clock source 170 and the clock divider 190 are shown as being external to the NPU 100 rather than internal to the NPU 100. Since FIG. 8B is otherwise identical to that shown in FIG. 7B, FIG. 8B will not be described separately, and the description described with reference to FIG. 7B will be adopted.

Figure 8C:
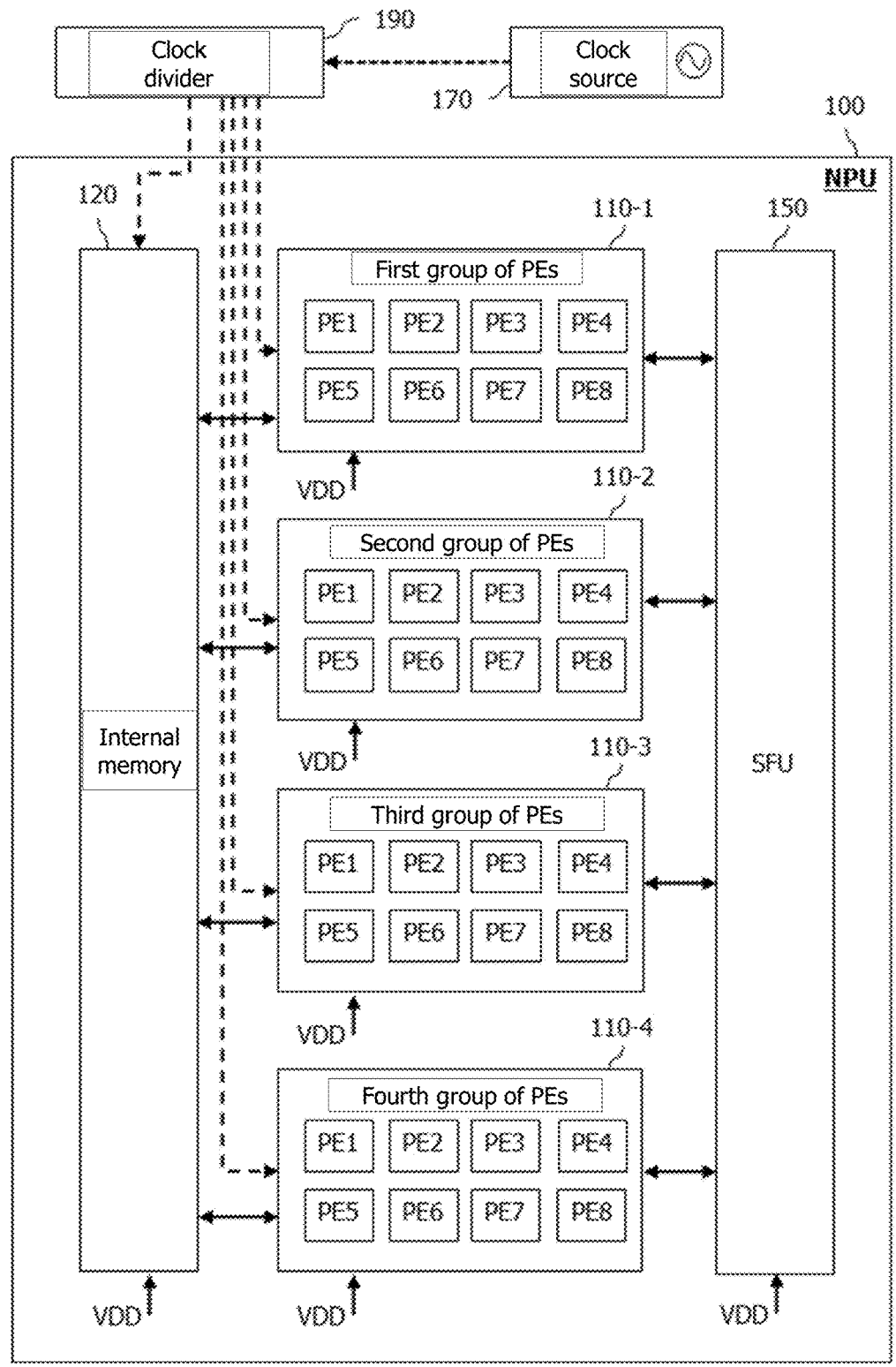
FIG. 8C is an exemplary diagram illustrating the structure of an NPU according to a second variant of the second example of the present disclosure.

FIG. 8C is an exemplary diagram illustrating a structure of an NPU according to a second variant of the second example of the present disclosure.

In FIG. 8C, the NPU 100 may include the PEs 110-1 of the first group, the PEs 110-2 of the second group, the PEs 110-3 of the third group, the PEs 110-4 of the fourth group, the internal memory 120, and the SFU 150, but the NPU 100 may further include an NPU controller 130 and an NPU interface 140 as shown in FIG. 3 or 5.

Each of the PEs 110-1 of the first group, the PEs 110-2 of the second group, the PEs 110-3 of the third group, the PEs 110-4 of the fourth group, the internal memory 120, the NPU controller 130, the NPU interface 140, and the SFU 150 may be semiconductor circuits with numerous transistors connected thereto. As such, some of these may be difficult to identify and distinguish with the naked eye, and may only be identified by operation thereof.

Referring to FIG. 8C, the clock source 170 and the clock divider 190 are shown as being external to the NPU 100 rather than internal to the NPU 100. Since the NPU 100 is otherwise identical to that shown in FIG. 7C, FIG. 8C will not be described separately, and the description described with reference to FIG. 7C will be adopted.

So far, an NPU has been described, but the NPU may also be implemented in the form of an SoC.

Figure 9A:
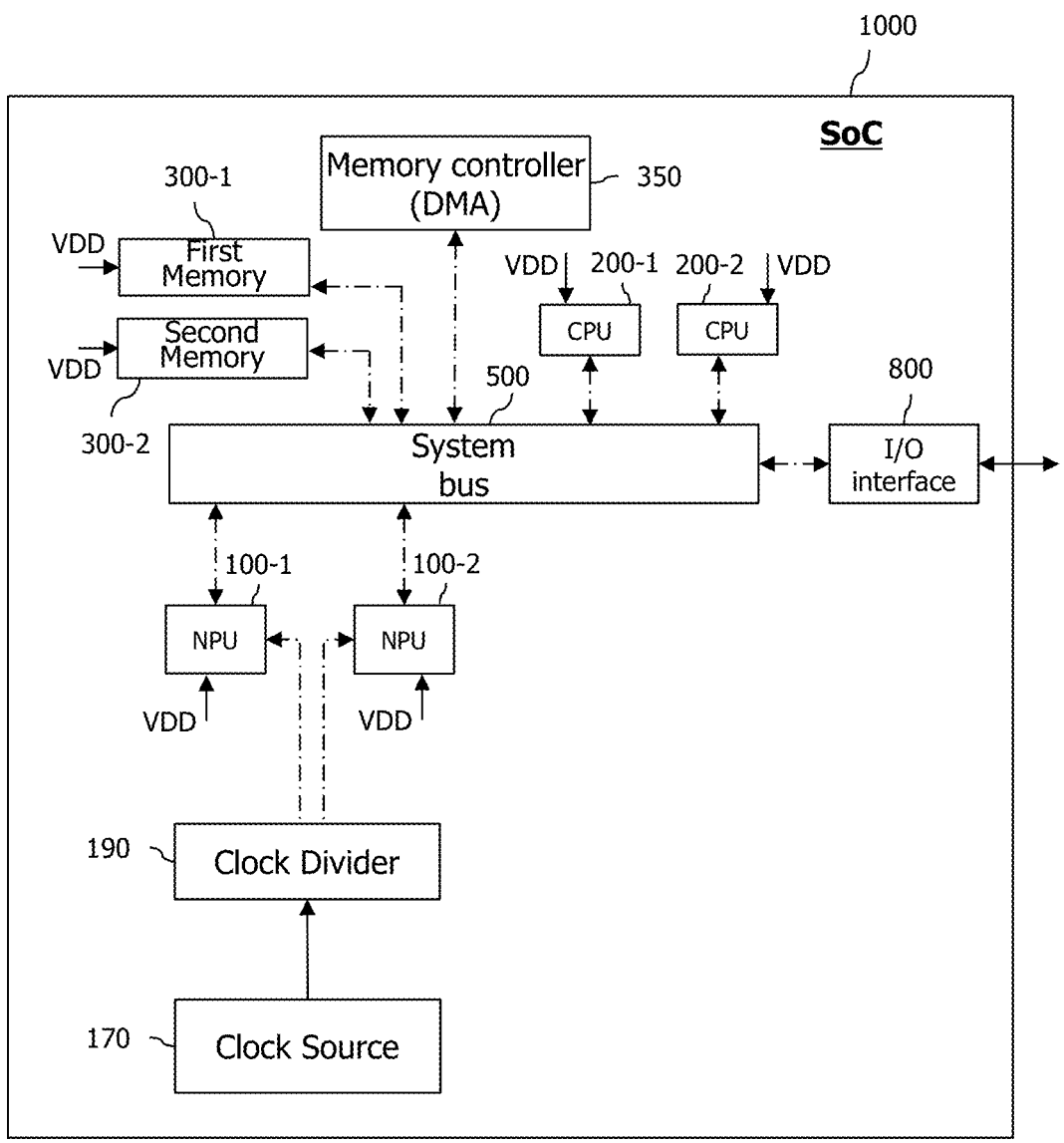
FIG. 9A is an exemplary diagram illustrating the structure of an SoC according to a third example of the present disclosure.

FIG. 9A is an exemplary diagram illustrating a structure of an SoC according to a third example of the present disclosure.

Referring to FIG. 9A, an exemplary SoC 1000 may include a plurality of NPUs, a plurality of central processing units (CPUs), and a plurality of memories. The plurality of NPUs may include, for example, a first NPU 100-1 and a second NPU 100-2. The plurality of CPUs may include, for example, a first CPU (200-1) and a second CPU (200-2). The plurality of memories may include a first memory 300-1 and a second memory 300-2.

Each of the plurality of NPUs (e.g., the first NPU 100-1 and the second NPU 100-2) may include a plurality of groups of PEs as shown in FIGS. 8A to 8C.

In FIG. 9A, the number of the plurality of NPUs, the plurality of CPUs, and the plurality of memories may be two each, but the number of the plurality of NPUs, the plurality of CPUs, and the plurality of memories may be varied, such as, but not limited to, four, six, eight, and the like.

The exemplary SoC 1000 may include a memory controller 350, a clock source 170, a clock divider 190, a system bus 500, and an input output (I/O) interface 800.

The system bus 500 may be implemented as an electrically conductive pattern formed on a semiconductor die. The system bus may enable high-speed communication. For example, the plurality of NPUs, the plurality of CPUs, the plurality of memories, and the memory controller 350 may communicate with each other via the system bus 500.

The plurality of NPUs and the plurality of CPUs may make requests to the memory controller 350 via the system bus 500, whereby the memory controller 350 may read and/or write data from at least one of the plurality of memories.

The clock source 170 and the clock divider 190 shown in FIG. 9A may be substantially identical to those shown in FIGS. 7A through 8C.

Thus, the clock divider 190 may provide the original clock signal from the clock source 170 to the first NPU 100-1, and may also provide a first phase-delayed clock signal with a phase delay of the original clock signal to the second NPU 100-2. Alternatively, the clock divider 190 may provide the first NPU 100-1 with a first phase-delayed clock signal that is delayed in phase with the original clock signal provided from the clock source 170, and may provide the second NPU 100-2 with a second phase-delayed clock signal.

Figure 9B:
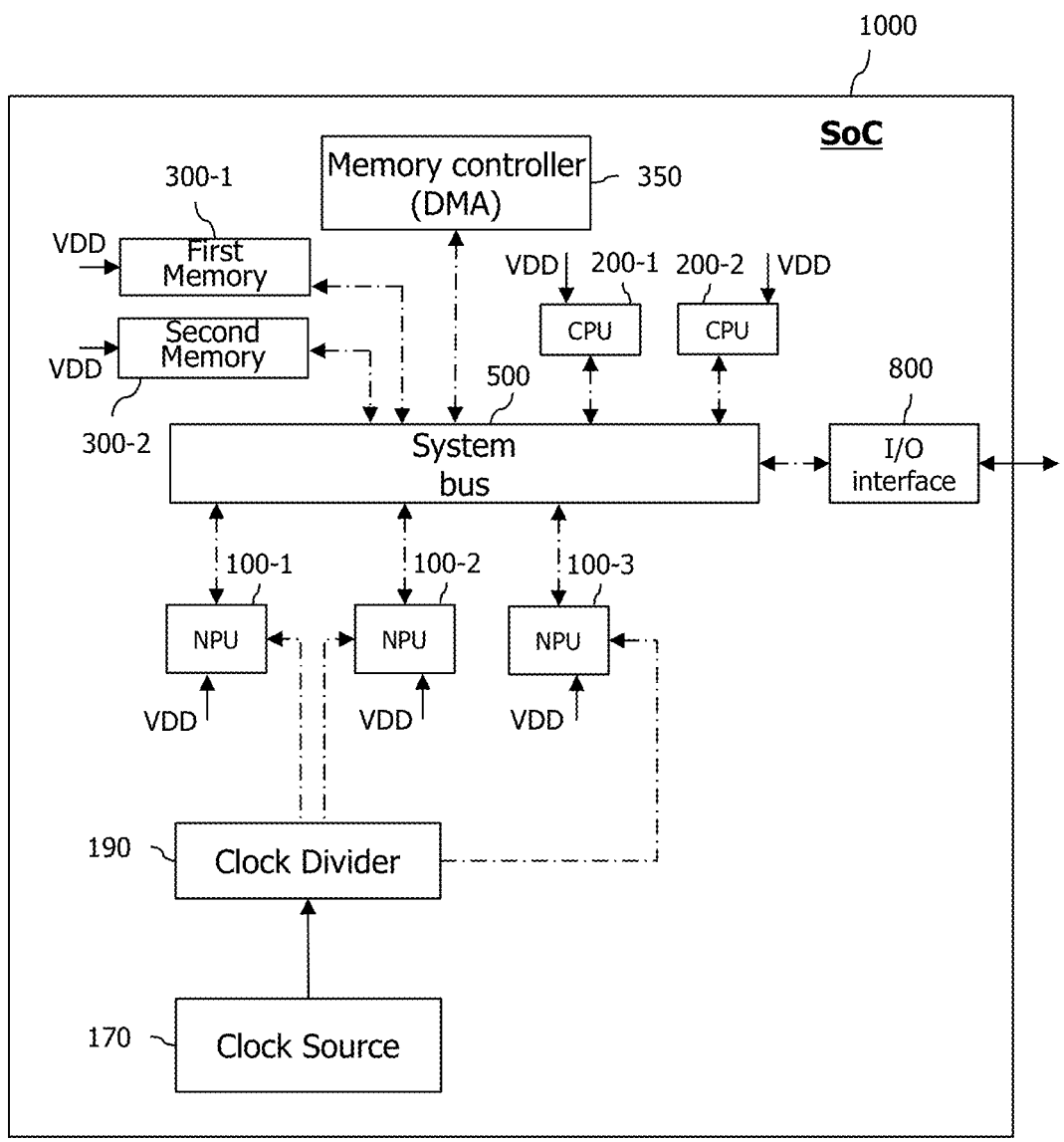
FIG. 9B is an exemplary diagram illustrating a structure of an SoC according to a first variant of the third example of the present disclosure.

FIG. 9B is an exemplary diagram illustrating a structure of an SoC according to a first variant of a third example of the present disclosure.

Referring to FIG. 9B, an exemplary SoC 1000 may include a plurality of NPUs, a plurality of central processing units (CPUs), and a plurality of memories. The plurality of NPUs may include, for example, a first NPU 100-1, a second NPU 100-2, and a third NPU 100-3. The plurality of CPUs may include, for example, a first CPU (200-1) and a second CPU (200-2). The plurality of memories may include a first memory 300-1 and a second memory 300-2.

Each of the plurality of NPUs (e.g., 100-1, 100-2, 100-3) may include a plurality of PEs 110, an NPU internal memory 120, an NPU controller 130, an NPU interface 140, and a SFU 150 as shown in FIG. 3 or FIG. 5.

When the clock source 170 generates and outputs an original clock signal, the clock divider 190 may bypass the original clock signal or may output a plurality of phase-delayed signals generated by delaying or shifting the phase of the original clock signal.

For example, the clock divider 190 may provide the original clock signal from the clock source 170 to the first NPU 100-1 and may also provide the first phase-delayed clock signal with a phase delay of the original clock signal to the second NPU 100-2. The clock divider 190 may then provide the second phase-delayed clock signal to the third NPU 100-3.

Alternatively, the clock divider 190 may provide the first NPU 100-1 with a first phase-delayed clock signal that is phase-delayed from the original clock signal from the clock source 170, and may also provide the second phase-delayed clock signal to the second NPU 100-2. Further, the clock divider 190 may provide a third phase-delayed clock signal to the third NPU 100-3.

Figure 9C:
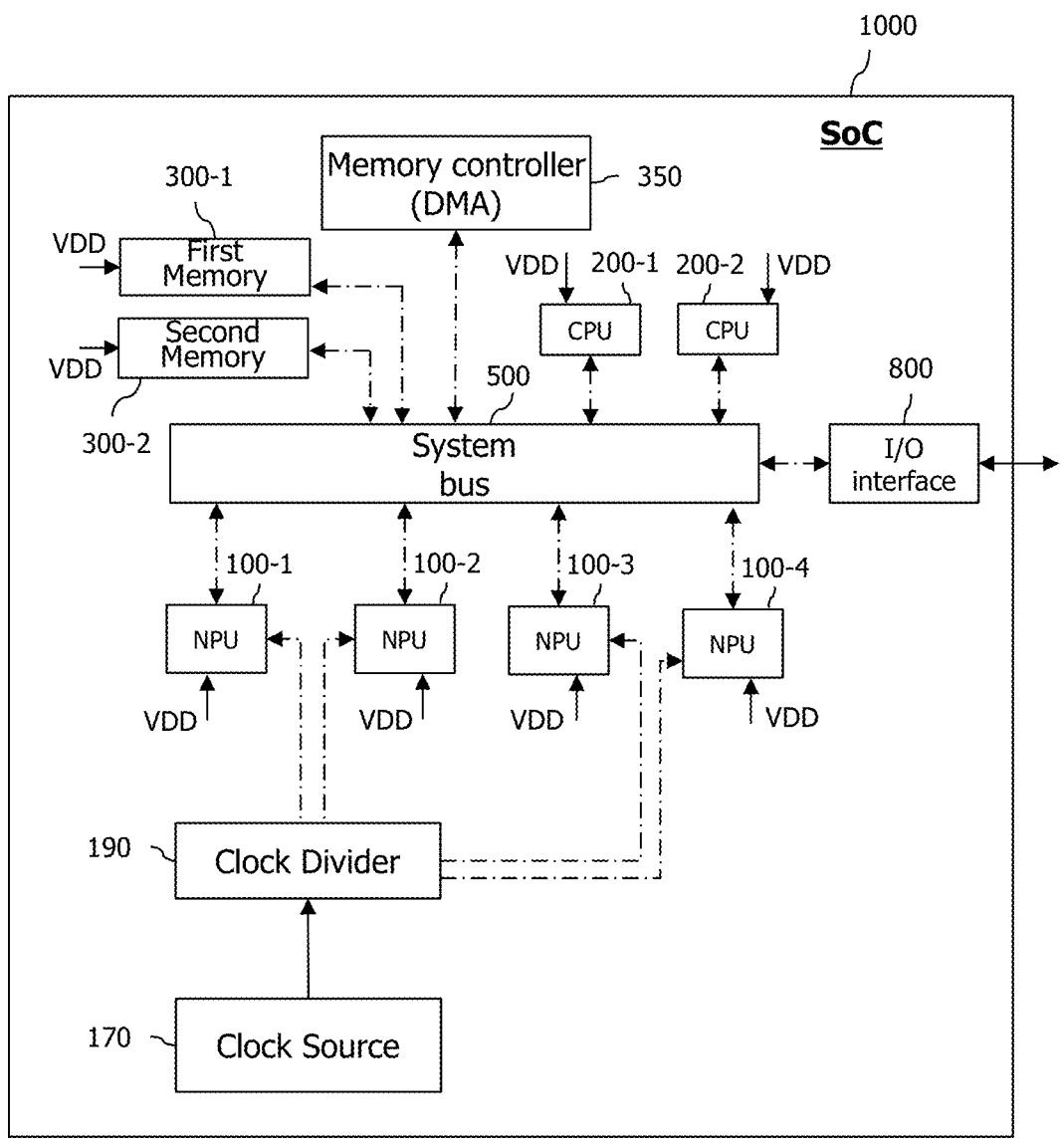
FIG. 9C is an exemplary diagram illustrating a structure of an SoC according to a second variant of the third example of the present disclosure.

FIG. 9C is an exemplary diagram illustrating a structure of an SoC according to a second variant of a third example of the present disclosure.

Referring to FIG. 9C, an exemplary SoC 1000 may include a plurality of NPUs, a plurality of central processing units (CPUs), and a plurality of memories. The plurality of NPUs may include, for example, a first NPU 100-1, a second NPU 100-2, a third NPU 100-3, and a fourth NPU 100-4. The plurality of CPUs may include, for example, a first CPU 200-1 and a second CPU 200-2. The plurality of memories may include a first memory 300-1 and a second memory 300-2.

Each of the plurality of NPUs (e.g., 100-1, 100-2, 100-3, and 100-4) may include a plurality of PEs 110, an NPU internal memory 120, an NPU controller 130, an NPU interface 140, and a SFU 150 as shown in FIG. 3 or 5.

When the clock source 170 generates and outputs an original clock signal, the clock divider 190 may bypass the original clock signal or may output a plurality of phase-delayed signals generated by delaying or shifting the phase of the original clock signal.

For example, the clock divider 190 may provide the original clock signal from the clock source 170 to the first NPU 100-1, and may also provide a first phase-delayed clock signal to the second NPU 100-2. Further, the clock divider 190 may provide a second phase-delayed clock signal to the third NPU 100-3 and a third phase-delayed clock signal to the fourth NPU 100-4.

Alternatively, the clock divider 190 may provide a first phase-delayed clock signal to the first NPU 100-1 and a second phase-delayed clock signal to the second NPU 100-2. Further, the clock divider 190 may provide a third phase-delayed clock signal to the third NPU 100-3, and may provide a fourth phase-delayed clock signal to the fourth NPU 100-4.

Each element (i.e., NPU, memory, and CPU) within the SoC 1000 illustrated in FIGS. 9A to 9C may be provided with a supply voltage VDD.

While a common supply voltage VDD is shown as being input in FIGS. 9A through 9C, examples of the present disclosure are not limited thereto.

In some examples, each element in the SoC 1000 (i.e., NPU, memory, and CPU) may be configured to have an independent or separate supply voltage VDD.

In some examples, some of the elements within the SoC 1000 (e.g., NPU, memory, and CPU) may be configured to have independent or isolated supply voltages VDDs.

In some examples, certain elements within the SoC 1000 may be configured to receive a second supply voltage that is different from the first supply voltage.

As described above, a third example of the present disclosure allows the plurality of NPUs to operate distributedly according to different clock signals, thereby reducing peak power.

Further, an example of the present disclosure may lower manufacturing cost by simply adding a clock divider 190, rather than multiple clock sources, to provide a plurality of clock signals with different phases.

Figure 10A:
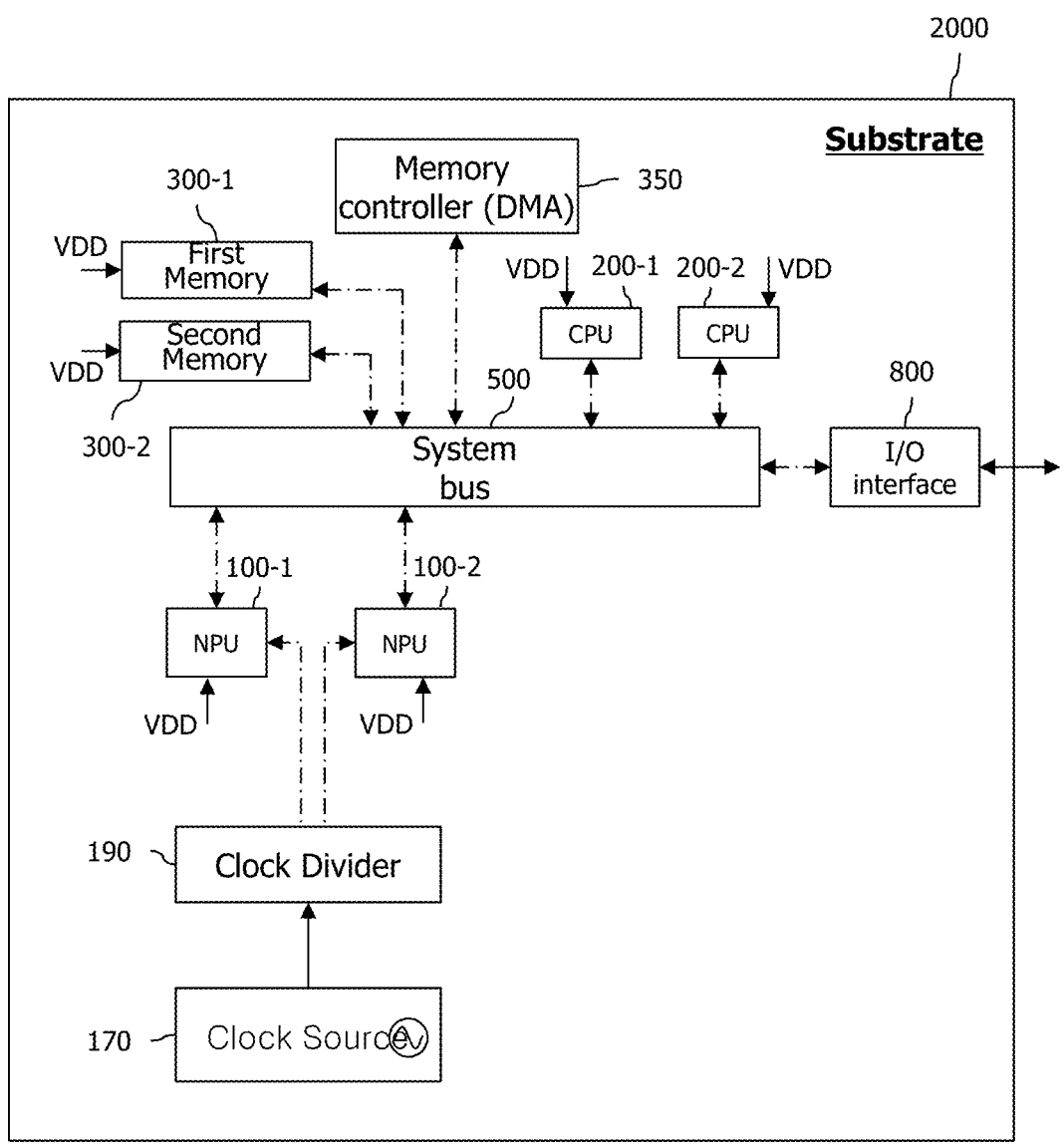
FIG. 10A is an exemplary diagram illustrating the structure of a system according to a fourth example of the present disclosure.

FIG. 10A is an exemplary diagram illustrating a structure of a system according to a fourth example of the present disclosure.

Hereinafter, only the description of FIG. 10A will be described that differs from the description of FIG. 9A, the same being incorporated by reference in its entirety.

First, in FIG. 10A, an electrically conductive pattern serving as a system bus 500 may be formed on a board substrate that is not an SoC. Further, a first semiconductor chip 100-1 provided for a first NPU and a second semiconductor chip 100-2 provided for a second NPU may be mounted on the board substrate. Further, a semiconductor chip for the first memory 300-1 and a semiconductor chip for the second memory 300-2 may be mounted on the board substrate. Further, a memory controller 350 may be mounted on the board substrate. Further, a semiconductor chip for the first CPU 200-1 and a semiconductor chip for the second CPU 200-2 may be mounted on the board substrate. Further, a semiconductor chip for the I/O interface 800 may be mounted on the board substrate. The board substrate may be a printed circuit board (PCB).

The clock source 170 and the clock divider 190 shown in FIG. 10A are substantially identical to those shown in FIGS. 7A to 8C.

Figure 10B:
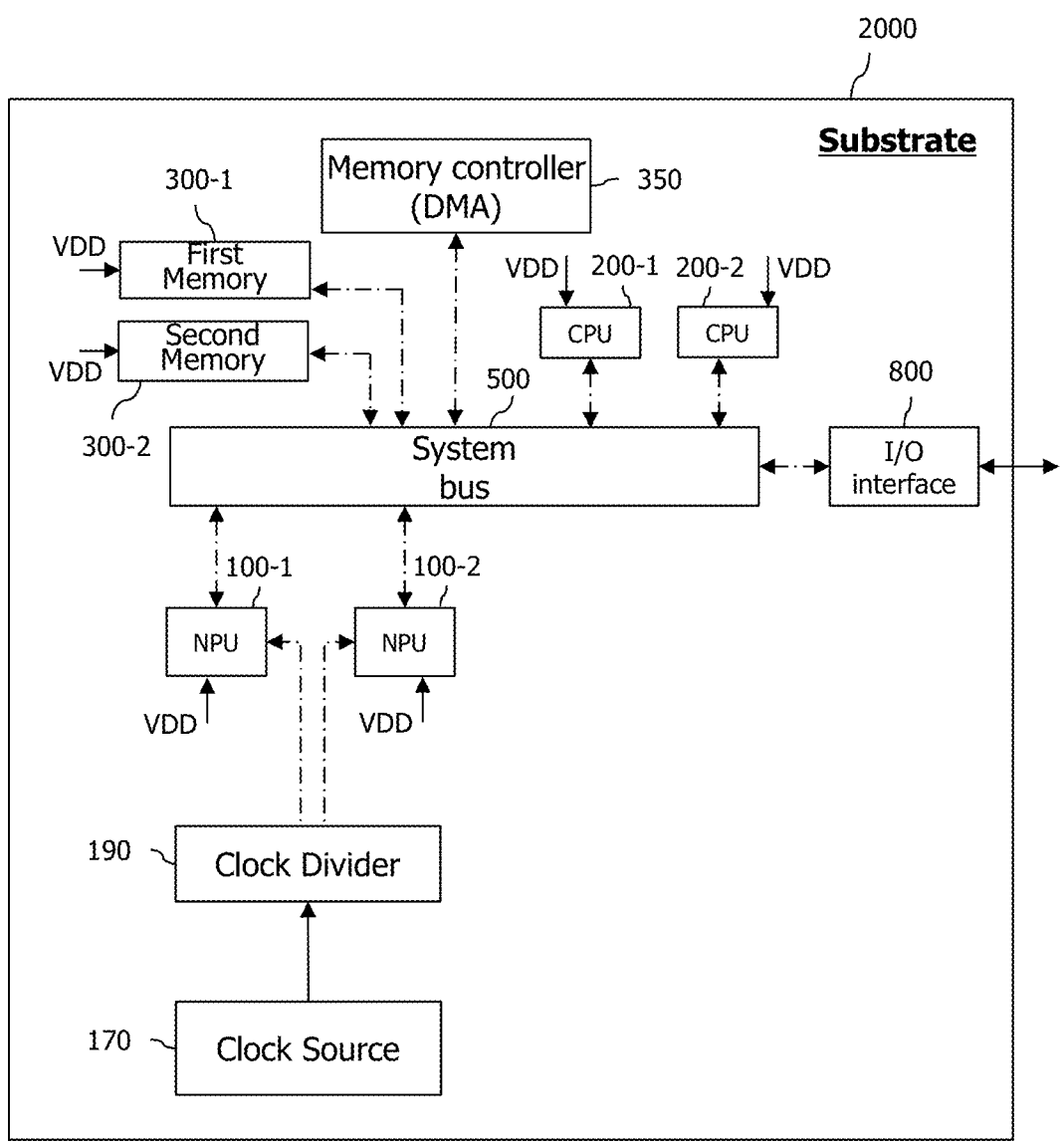
FIG. 10B is an exemplary diagram illustrating the structure of a system according to a first variant of the fourth example of the present disclosure.

FIG. 10B is an exemplary diagram illustrating the structure of a system according to a first variant of a fourth example of the present disclosure.

Hereinafter, only the contents that differ from the description of FIG. 9B will be described, and the same will be described in accordance with the foregoing.

First, in FIG. 10B, an electrically conductive pattern serving as a system bus 500 may be formed on a board substrate that is not an SoC. Further, a first semiconductor chip 100-1 provided for a first NPU, a second semiconductor chip 100-2 provided for a second NPU, and a third semiconductor chip 100-3 provided for a third NPU may be mounted on the board substrate. Further, a semiconductor chip for the first memory 300-1 and a semiconductor chip for the second memory 300-2 may be mounted on the board substrate. Further, a memory controller 350 may be mounted on the board substrate. Further, a semiconductor chip for the first CPU 200-1 and a semiconductor chip for the second CPU 200-2 may be mounted on the board substrate. Further, a semiconductor chip for the I/O interface 800 may be mounted on the board substrate. The board substrate may be a printed circuit board (PCB).

The clock source 170 and the clock divider 190 shown in FIG. 10B are substantially identical to those shown in FIGS. 7A to 8C.

Figure 10C:
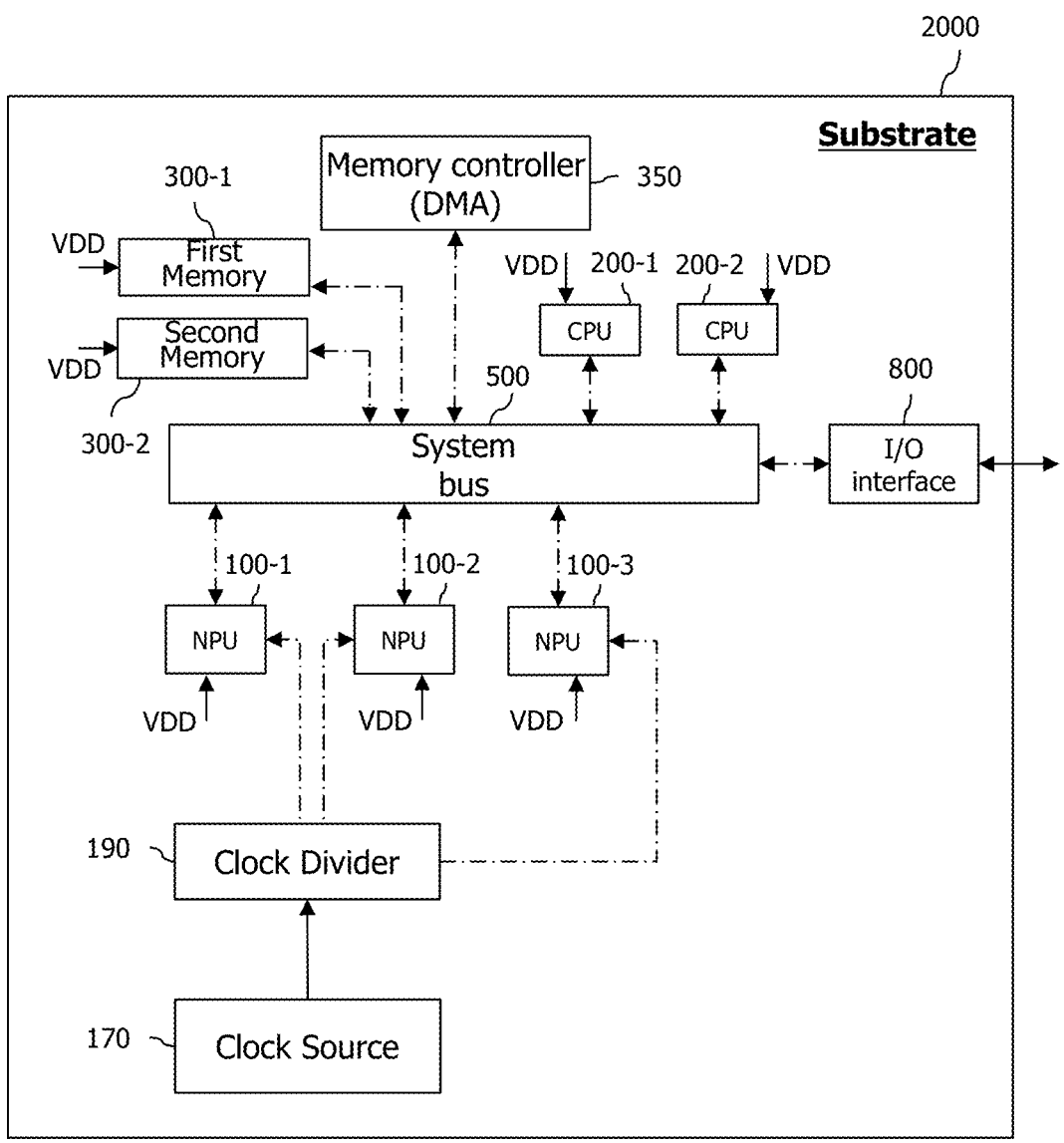
FIG. 10C is an exemplary diagram illustrating the structure of a system according to a second variant of the fourth example of the present disclosure.

FIG. 10C is an exemplary diagram illustrating a structure of a system according to a second variant of a fourth example of the present disclosure.

Hereinafter, only the contents that differ from the description of FIG. 9C will be described, and the same will be described in accordance with the foregoing.

First, in FIG. 10C, an electrically conductive pattern serving as a system bus 500 may be formed on a board substrate that is not an SoC. Further, a first semiconductor chip 100-1 provided for a first NPU, a second semiconductor chip 100-2 provided for a second NPU, a third semiconductor chip 100-3 provided for a third NPU, and a fourth semiconductor chip 100-4 provided for a fourth NPU may be mounted on the board substrate. Further, a semiconductor chip for the first memory 300-1 and a semiconductor chip for the second memory 300-2 may be mounted on the board substrate. Further, a memory controller 350 may be mounted on the board substrate. Further, a semiconductor chip for the first CPU 200-1 and a semiconductor chip for the second CPU 200-2 may be mounted on the board substrate. Further, a semiconductor chip for the I/O interface 800 may be mounted on the board substrate. The board substrate may be a printed circuit board (PCB).

The clock source 170 and the clock divider 190 shown in FIG. 10C are substantially identical to those shown in FIGS. 7A to 8C.

Figure 11A:
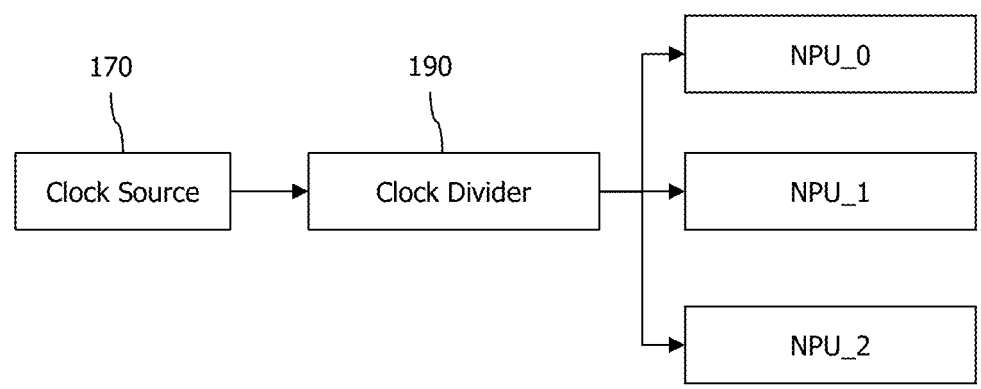
FIG. 11A is a first example of a clock divider 190.

FIG. 11A is a first example of the clock divider 190.

Referring to FIG. 11A, the clock divider 190 associated with the clock source 170 may include a distribution circuit 191 and a plurality of output circuits 192A, 192B, and 192C.

The clock divider 190 may receive an original clock signal from the clock source 170 and generate and output a plurality of clock signals corresponding to the number of the group of NPUs or PEs. Each of the plurality of groups of NPUs or PEs NPU_0, NPU_1, and NPU_2 may be provided with a clock signal with a different phase from the clock divider 190. The clock divider 190 may further comprise a divider circuit (not shown), which will be described later. Thus, as each of the plurality of NPUs or groups of PEs NPU_0, NPU_1, and NPU_2 operates based on clocks of different phases, the peak power of the semiconductor chip comprising the plurality of NPUs or groups of PEs NPU_0, NPU_1, and NPU_2 and/or the system comprising the semiconductor chip may be reduced.

Figure 11B:
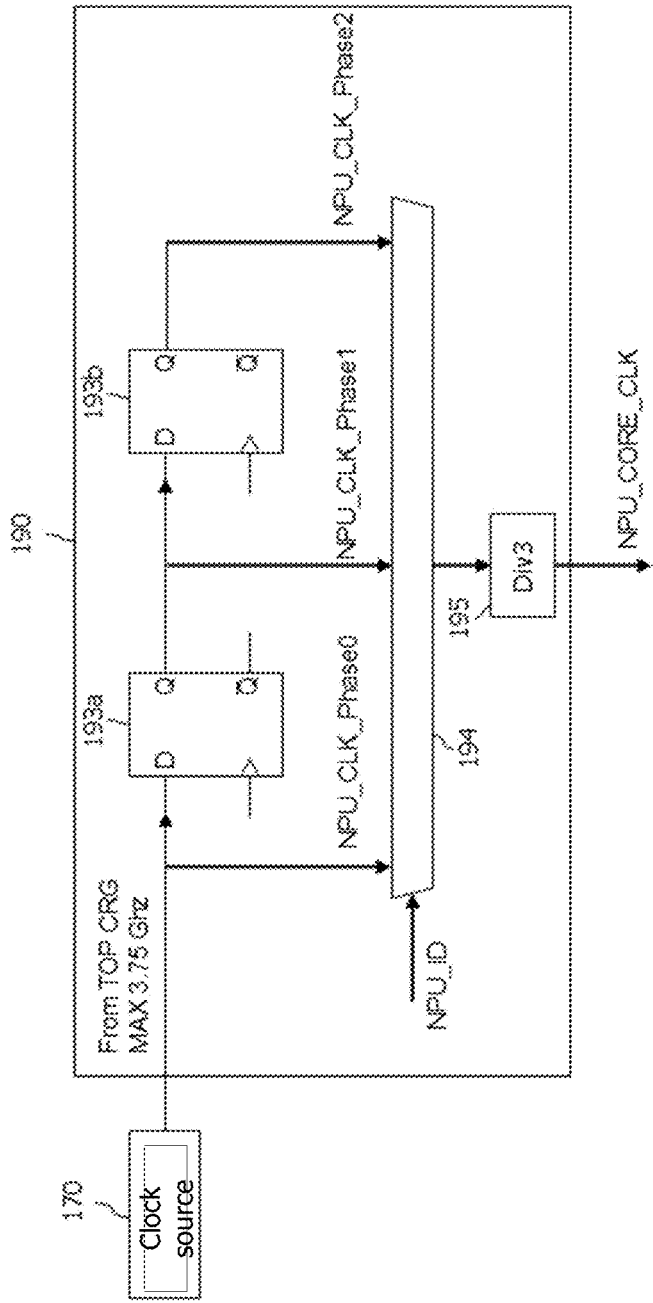
FIG. 11B is a second example of a clock divider 190.

FIG. 11B is a second example of a clock divider 190.

Referring to FIG. 11B, the clock divider 190 associated with the clock source 170 may include a plurality of flip-flops 193A, 193B, a multiplexer 194, and a divider circuit (e.g., Div3) 195.

In FIG. 11B, the plurality of flip-flops 193A and 193B is exemplarily shown as two, but may vary depending on the number of NPUs or the number of PE groups. For example, if the number of NPUs is two or the number of PE groups is two, the number of flip-flops may be one. In another example, if the number of NPUs is four or the number of PE groups is four, the number of flip-flops may be three.

The plurality of flip-flops 193A and 193B are illustrated in FIG. 11B as exemplary D-type flip-flops. The D-type flip-flop functions as a delay element. The D-type flip-flop delays (e.g., delays 180 degrees out of phase) an input signal until the next active clock inputs and then outputs it. Thus, the D-type flip-flop may be used as a delay buffer.

Specifically, the first flip-flop 193A of the plurality of flip-flops 193A and 193B may, when provided with a one-click signal from the clock source 170, delay the phase of the one-clock signal (e.g., delay the phase by 180 degrees) and then output. The output of the first flip-flop 193A is passed to the multiplexer 194 and the second flip-flop 193B.

The second flip-flop 193B may be coupled to the first flip-flop 193A, and may delay the phase of the clock signal output from the first flip-flop 193A (e.g., the phase is delayed by 180 degrees), and then output it. The output of the second flip-flop 193B is passed to the multiplexer 194.

The multiplexer 194 may multiplex the original clock source from the clock source 170 and the output of each of the plurality of flip-flops 193A and 193B before passing it to the divider circuit (e.g., Div3) 195.

The divider circuit 195 is illustrated in FIG. 11B as Div3 for division by three, but is not limited thereto and may vary depending on the number of NPUs or the number of PE groups. For example, if the number of NPUs is two or the number of PE groups is two, the divider circuit 195 may be Div2 for two divisions. In another example, if the number of NPUs is four or the number of PE groups is four, the divider circuit 195 may be Div4 for four divisions.

To illustrate the operation of the divider circuit 195, referring to FIG. 11A, the divider circuit 195 may divide the NPU_0 signal, the NPU_1 signal, and the NPU_2 signal from the output signal from the multiplexer 194, and transmit the NPU_0 signal, the NPU_1 signal, and the NPU_2 signal to each NPU or each PE group.

An advantage of the structure of the clock divider 190 shown in FIG. 11B is that it does not require any specialist configuration and can always achieve accurate phase separation. On the other hand, the disadvantage is that it requires a high frequency output from the phase locked loop (PLL) within the clock source 170.

Figure 11C:
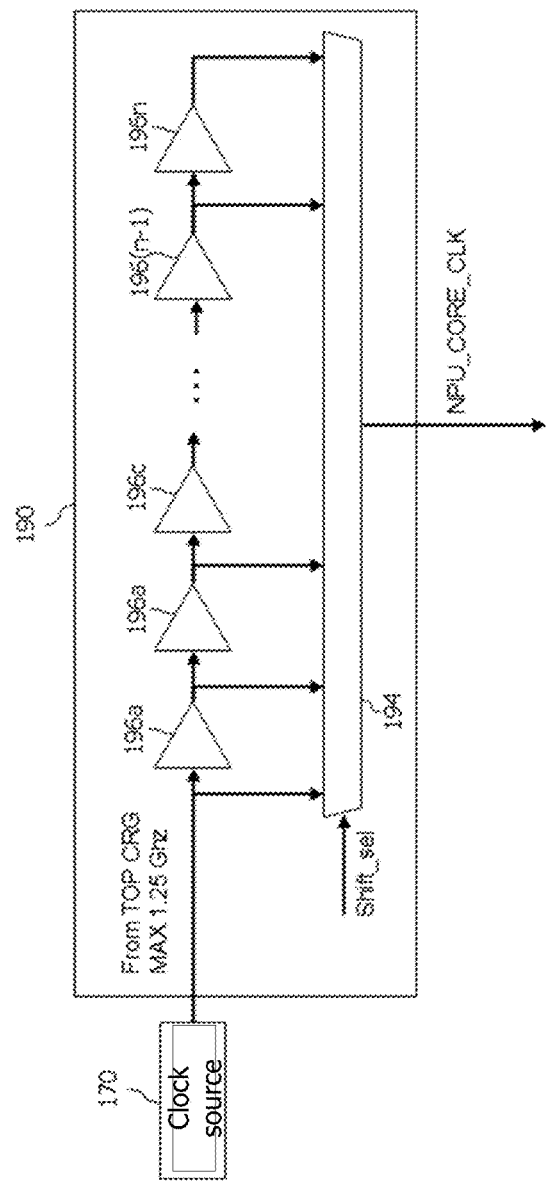
FIG. 11C is a third example of a clock divider 190.

FIG. 11C is a third example of a clock divider 190.

Referring to FIG. 11C, the clock divider 190 associated with the clock source 170 may include a plurality of delay cells 196A, 196B, 196C, . . . 196N and a multiplexer 194.

The plurality of delay cells 196A, 196B, 196C, . . . 196N are connected in series with each other in a chain, and in parallel with the multiplexer 194. Each of the plurality of delay cells 196A, 196B, 196C, . . . 196N is capable of delaying the phase of the clock signal by a predetermined offset.

The multiplexer 194 is connected to the output from the clock source 170 and to the output of the plurality of delay cells 196A, 196B, 196C, . . . 196N. Thus, the multiplexer 194 can multiplex and output the original clock signal from the clock source 170 and the clock signal output from the plurality of delay cells 196A, 196B, 196C, . . . 196N.

In examples of the present disclosure, the delay cells may also be referred to as delay buffers.

An advantage of the structure of the clock divider 190 shown in FIG. 11C is that it allows for a high degree of freedom in phase delay and allows the PLL within the clock source 170 to output at lower frequencies. On the other hand, the disadvantage is that an appropriate delay value must be selected for each frequency.

Figure 11D:
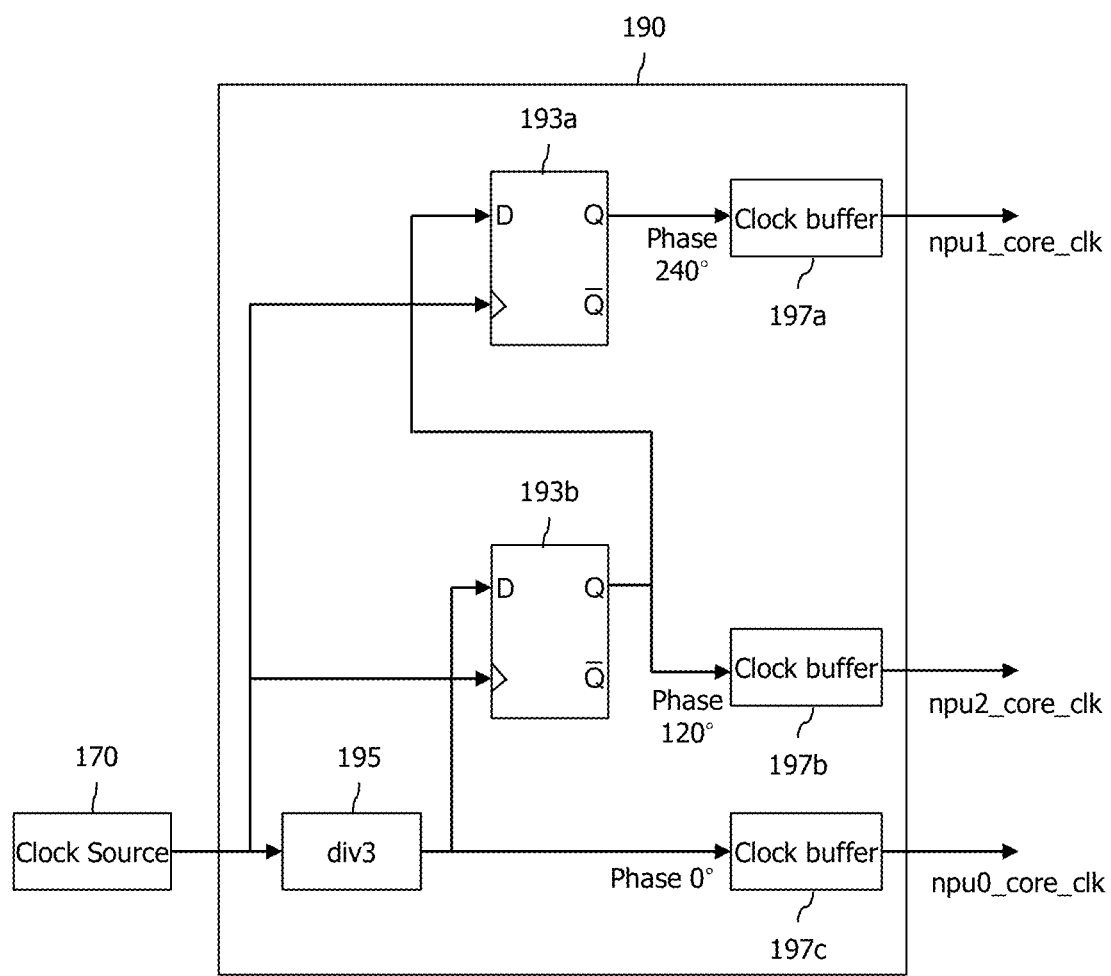
FIG. 11D is a third example of a clock divider 190.

FIG. 11D is a third example of a clock divider 190.

Referring to FIG. 11D, the clock divider 190 associated with the clock source 170 may include a plurality of flip-flops 193A and 193B and a divider circuit (e.g., Div3) 195. The clock divider 190 may optionally further include at least one of a plurality of clock buffers 197A, 197B, and 197C. Alternatively, one of the plurality of clock buffers 197A, 197B, and 197C may be disposed between the clock divider 190 and a NPU or a group of PEs of an NPU.

In FIG. 11A, the plurality of flip-flops 193A and 193B is exemplarily shown as two, but may vary depending on the number of NPUs or the number of PE groups. For example, if the number of NPUs is two or the number of PE groups is two, the number of flip-flops may be one. In another example, if the number of NPUs is four or the number of PE groups is four, the number of flip-flops may be three.

The plurality of flip-flops 193A and 193B are illustrated in FIG. 11D as D-type flip-flops. The D-type flip-flop functions as a delay element. The D-type flip-flop delays (e.g., delays 180 degrees out of phase) an input signal until the next active clock appears and then outputs it. Thus, the D-type flip-flop can be used as a delay buffer.

The divider circuit 195 is illustrated in FIG. 11D as Div3 for division by three, but is not limited thereto and may vary depending on the number of NPUs or the number of PE groups. For example, if the number of NPUs is two or the number of PE groups is two, the divider circuit 195 may be Div2 for two divisions. In another example, if the number of NPUs is four or the number of PE groups is four, the divider circuit 195 may be Div4 for four divisions.

The clock divider 190 may optionally be configured to further include a clock buffer. However, the examples of the present disclosure are not limited to clock buffers.

While a plurality of clock buffers 197A, 197B, and 197C are shown in FIG. 11D, additional clock buffers may optionally be added, or clock buffers may be removed. The clock buffers may be configured to delay a phase of one clock signal by a particular phase.

The plurality of clock buffers 197A, 197B, and 197C is exemplarily shown as three in FIG. 11D, but may vary depending on the number of NPUs or the number of PE groups. For example, if the number of NPUs is two or the number of PE groups is two, the number of the plurality of clock buffers may be two. In another example, if the number of NPUs is four or the number of PE groups is four, the number of the plurality of clock buffers may be four.

For example, the clock divider 190 shown in FIG. 11D is configured to output three clock signals, each clock signal having a phase difference of 120°. However, the physical distance between the clock divider 190 and each NPU or PE group receiving input to each clock signal may vary. If the physical distance of a particular NPU or PE group is particularly large relative to other NPUs or other PE groups, the phases of some of the respective clock signals output from the clock divider 190 with a 120° phase difference may be substantially similar or overlap. In such cases, a clock buffer may be disposed on the signal line from which a particular clock signal is supplied, and may be configured to compensate for the phase change due to the physical distance, i.e., at least one of the plurality of clock signals may be configured to be supplied to one of the plurality of PE groups passing through the at least one clock buffer disposed so as to reduce peak power. The at least one clock buffer may be appropriately set to take into account the physical layout or signal delay of the semiconductor chip being synthesized.

Figure 11E:
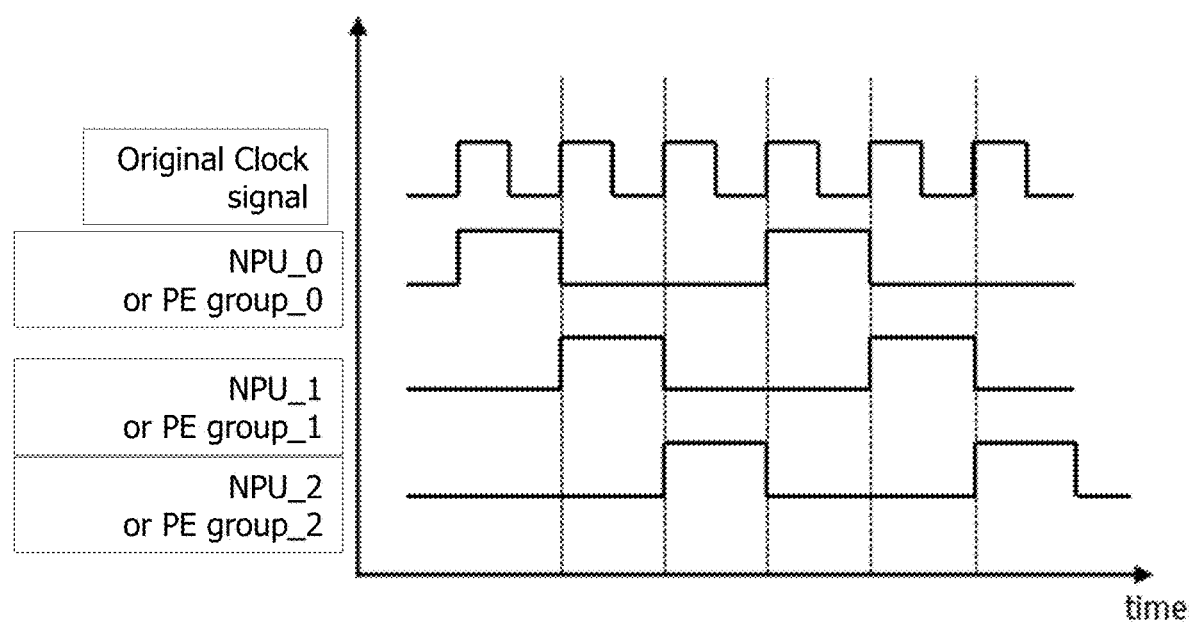
FIG. 11E is an exemplary diagram illustrating an exemplary signal waveform from the clock divider 190.

FIG. 11E is an exemplary diagram illustrating an exemplary signal waveform from the clock divider 190.

Referring to FIG. 11E, the signal transmitted to each NPU or each group of PEs is not only phase-delayed relative to the original clock signal, but also has a lower frequency. In FIG. 11E, the signal transmitted to each NPU or each PE group is generated by dividing the original clock signal into three portions. Thus, the signal transmitted to each NPU or each PE group has a frequency that is one-third lower than the original clock signal.

Figure 12:
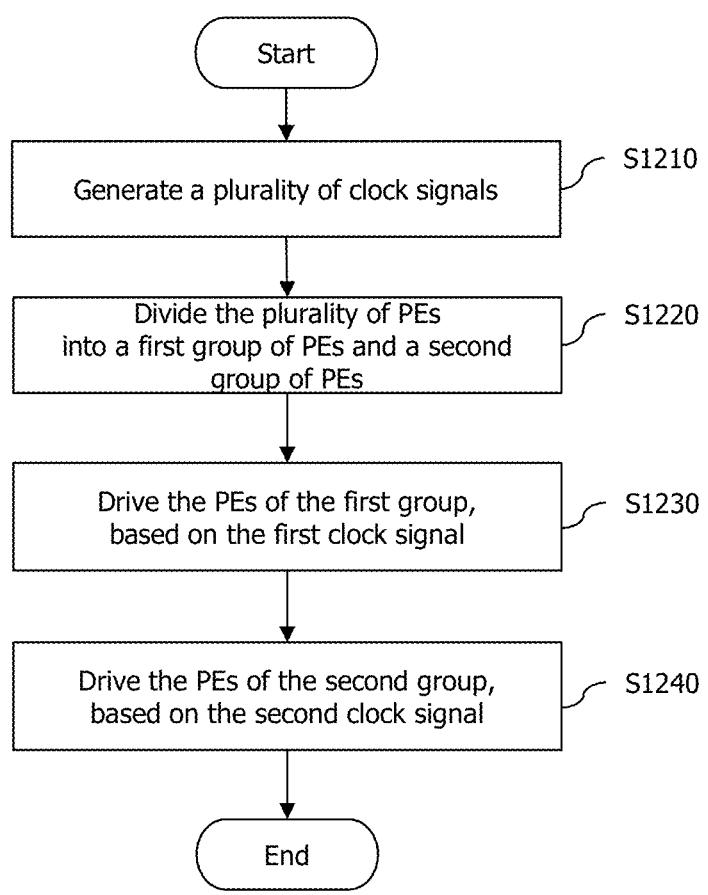
FIG. 12 is an exemplary diagram illustrating how an NPU may operate, according to an example of the present disclosure.

FIG. 12 is an example diagram illustrating a method of operation of an NPU according to an example of the present disclosure.

Referring to FIG. 12, a plurality of clock signals may be generated to drive a plurality of PEs S1210.

Then, the plurality of PEs may be divided into a first group of PEs and a second group of PEs S1220. It will be appreciated that the number of PEs in each group may vary, and the number of PEs in each group may change semi-fixedly or dynamically. These changes may be performed under the control of the NPU controller 130.

Then, based on the first clock signal, the PEs of the first group may be driven S1030, and based on the second clock signal, the PEs of the second group may be driven S1040.

Figure 13:
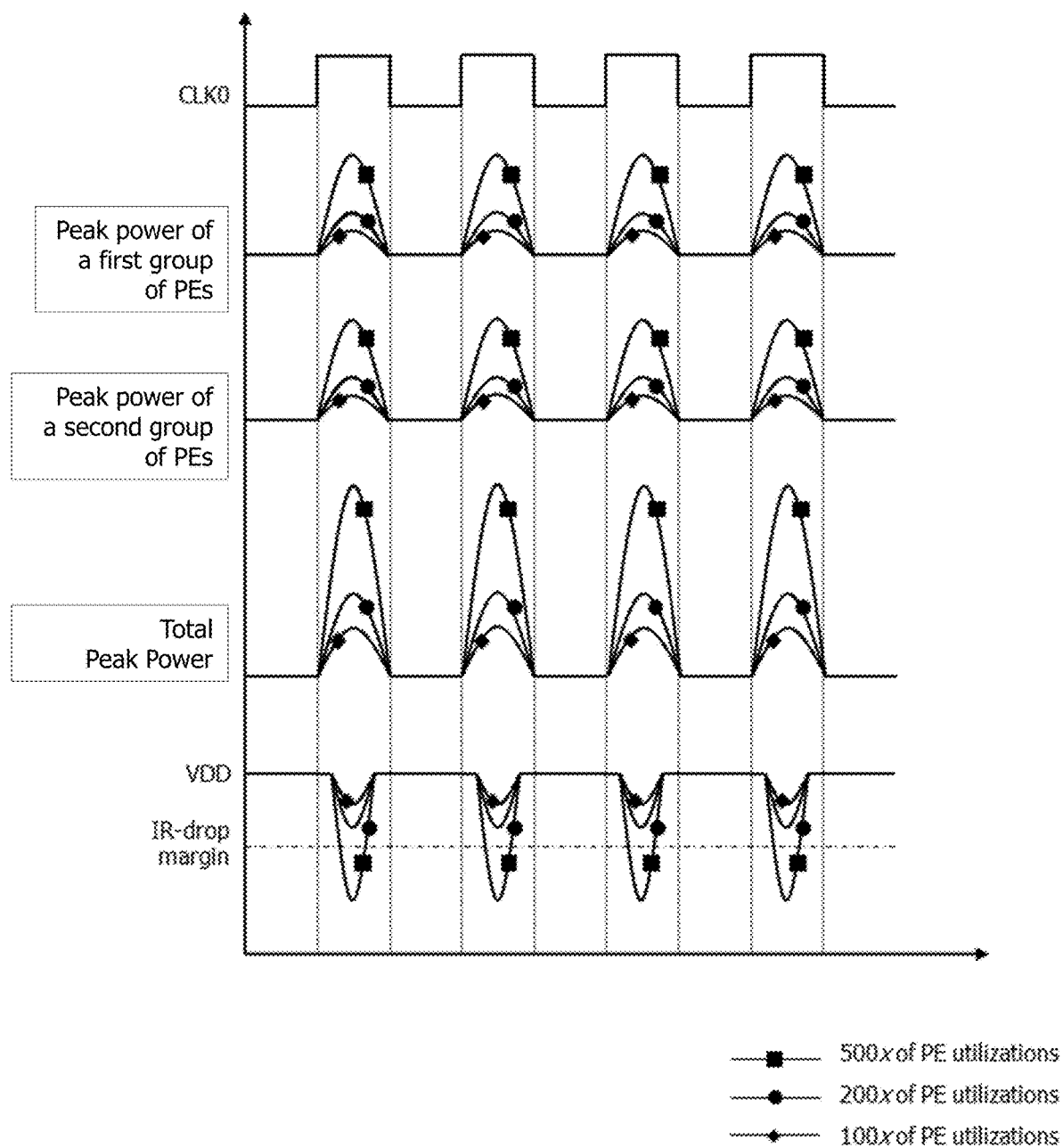
FIG. 13 illustrates a comparison example of not inputting clock signals of different phases to the plurality of PEs of the NPU.

FIG. 13 illustrates a comparative example where clock signals of different phases are not input to the plurality of PEs of the NPU.

Referring to FIG. 13, a first clock CLK0 may be input to a first group of PEs 110-1 and a second group of PEs 110-2. Here, the PEs 110-1 and 110-2 of each group are configured to receive clock signals of substantially the same phase.

The 100× of PE utilization in FIG. 13 illustrates an exemplary peak power and supply voltage VDD variation characteristic when one hundred processing elements are activated.

The 200× of PE utilization in FIG. 13 illustrates an exemplary peak power and supply voltage VDD variation characteristic when two hundred processing elements are activated.

The 500× of PE utilization in FIG. 13 illustrates exemplary peak power and supply voltage VDD variation characteristics when five hundred processing elements are activated.

Referring to FIG. 13, the peak power increases and the supply voltage VDD tends to decrease as the number of processing elements of the neural processing unit 100 activated increases.

Furthermore, the number of PEs operating in each clock cycle may depend on the performance of the compiler that compiles the artificial neural network model, i.e., the better the performance of the compiler, the more PEs can be operated per unit clock signal. The percentage of operating PEs out of the total PEs can be referred to as the PE utilization rate %. Conversely, the better the performance of the compiler, the more the peak power of the NPU can be increased, i.e., the peak power can be directly proportional to the utilization rate of the PEs. Therefore, the problem is that as the compiler's algorithm becomes more sophisticated, the peak power of the NPU may increase further.

Referring to FIG. 13, the peak power of the first group of PEs 110-1 and the second group of PEs 110-2 operating relative to the first clock CLK0 may vary depending on the number of PEs operating per each clock, i.e., the peak power may increase in proportion to the number of PEs operating in one clock signal.

As a side note, NPUs developed with low power can be developed for either M.2 interfaces or PCI Express interfaces when applied to edge devices (i.e., on devices). In particular, the maximum power supply limit may be relatively lower for the M.2 interface compared to the PCI Express interface. For example, an M.2 interface may have a max current of 3 A and a max power of 10 W. If the peak power of the NPU in the example exceeds 10 W at a particular clock signal, the supply voltage VDD to the NPU may fluctuate. In this case, the peak power of the NPU may increase as the utilization rate of the PE increases, and the degree of degradation of the supply voltage VDD may be greater in proportion to the excess information as the peak power exceeds the power limit.

If the supply voltage VDD drops below the IR-drop margin, the data being computed by the NPU can cause errors. As a reminder, IR-drop can occur when the resistance (R) of a metal interconnect and the current (I) flowing through it cause a voltage drop (V=IR) according to Ohm's law. When a large number of circuits associated with multiple PEs in the NPU are switching simultaneously, the NPU can draw a significant amount of current. This high current can cause a larger voltage drop in the NPU, which can fluctuate the supply voltage in other parts of the SoC.

To summarize the comparative example in FIG. 13, to ensure reliable operation of the NPU and avoid potential errors, it is important to ensure sufficient IR-drop margin. The IR-drop margin can be the difference between the supply voltage VDD and the lowest allowable voltage at any point of the NPU during peak power conditions.

Figure 14A:
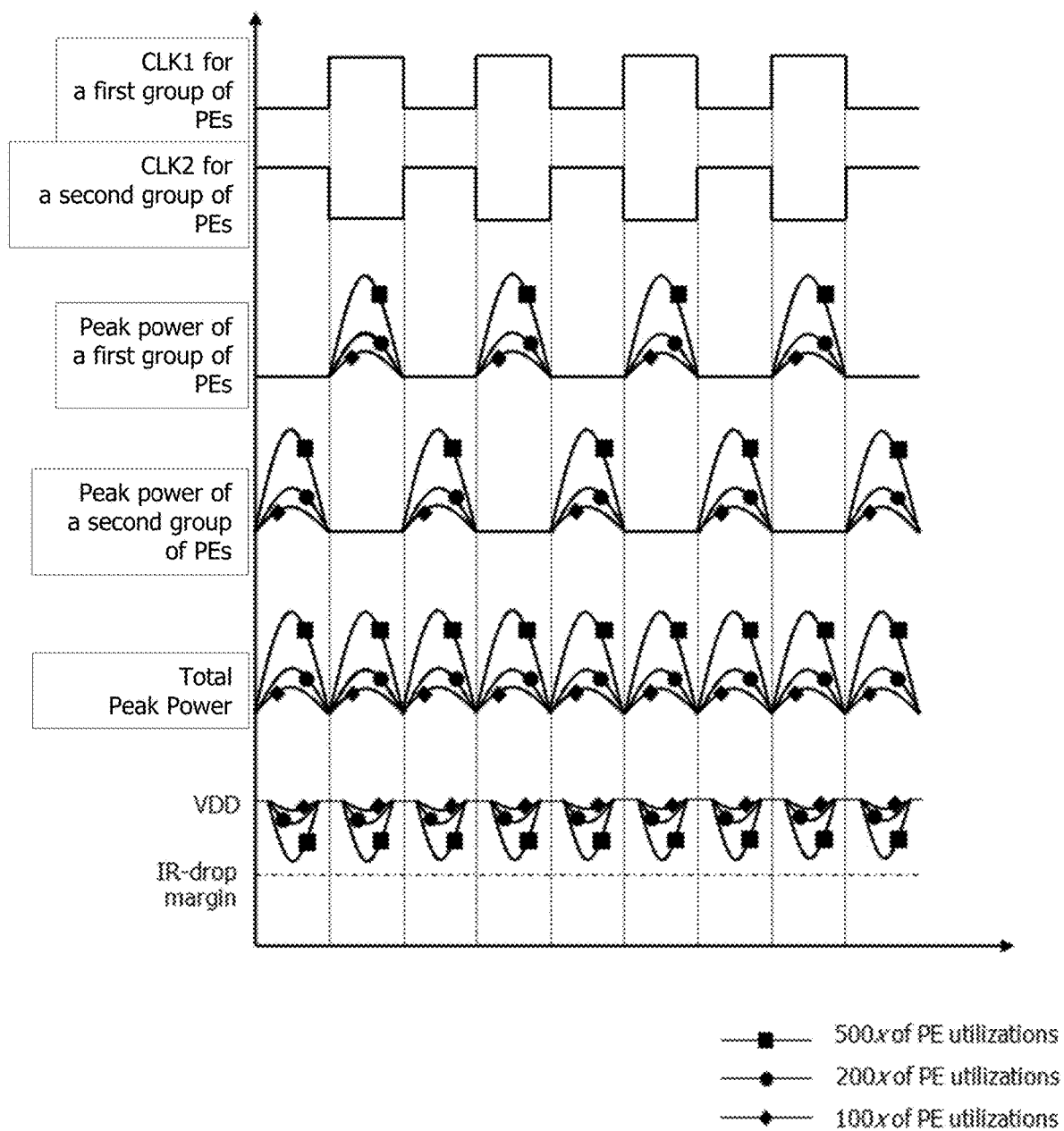
FIG. 14A illustrates an example of inputting clock signals of different phases to the plurality of PEs in two groups of the NPU in consideration of peak power, according to an example of the present disclosure.

FIG. 14A illustrates an example of inputting clock signals of different phases to a plurality of PEs of an NPU with respect to peak power, according to an example of the present disclosure.

It should be noted that as the utilization of the processing elements increases, the power may increase proportionally. Therefore, the power of each computation step can be calculated based on the utilization information of the PEs of each computation step and the driving frequency information. The power calculation may be calculated based on the scheduling information of a particular artificial neural network model. Here, the power (Watt) may be calculated as the energy consumed by the corresponding computation step divided by the unit time (i.e., 1 watt (W)=1 joule per second (J/s)). Thus, the power of each computation step can be calculated based on the scheduling information or measured directly by a power meter.

Referring to FIG. 14A, a first clock CLK1 may be input to the PEs 110-1 of the first group, and a second clock CLK2 may be input to the PEs 110-2 of the second group. Here, the PEs 110-1 and 110-2 of each group are configured to receive clock signals in different phases.

The 100× of PE utilization in FIG. 14A illustrates an exemplary peak power and supply voltage VDD variation characteristic when one hundred processing elements are activated.

The 200× of PE utilization in FIG. 14A illustrates an exemplary peak power and supply voltage VDD variation characteristic when two hundred processing elements are activated.

The 500× of PE utilization in FIG. 14A illustrates exemplary peak power and supply voltage VDD variation characteristics when five hundred processing elements are activated.

Referring to FIG. 14A, the peak power increases and the supply voltage VDD tends to decrease as the number of processing elements of the neural processing unit 100 is activated. However, as signal clocks with different phases are input to each group of PEs, the overall peak power is reduced and the supply voltage VDD fluctuations are also reduced.

Here, the average power according to the example of FIG. 14A and the average power according to the comparative example of FIG. 13 are substantially the same. However, the peak power according to the example of FIG. 14A is smaller than the peak power according to the comparative example of FIG. 13. Therefore, the ratio of the peak power to the average power may be improved according to the example of FIG. 14A compared to the comparative example of FIG. 13.

Furthermore, the number of PEs operating in each clock may depend on the performance of the compiler that compiles the artificial neural network model, i.e., the better the performance of the compiler, the more PEs can be operated in each unit clock signal. The percentage of working PEs out of the total PEs can be referred to as the PE utilization rate %. Conversely, the better the performance of the compiler, the more the peak power of the NPU can be increased, i.e., the peak power can be directly proportional to the utilization rate of the PEs. Therefore, the problem is that as the compiler's algorithms become more sophisticated, the peak power of the NPU may increase further.

Referring to FIG. 14A, the peak power of the first group of PEs 110-1 and the second group of PEs 110-2 corresponding to the first clock CLK1 may vary depending on the number of PEs operating per each clock, i.e., the peak power may increase in proportion to the number of PEs operating in one clock signal.

As a side note, NPUs developed with low power can be developed for either M.2 interfaces or PCI Express interfaces when applied to edge devices. In particular, the maximum power may be relatively lower for the M.2 interface compared to the PCI Express interface. For example, an M.2 interface may have a current of 3 A and a power limit of 10 W. If the peak power of the NPU in the example exceeds 10 W at a particular clock, the supply voltage VDD to the NPU may fluctuate. In this case, the peak power of the NPU may increase as the utilization of the PE increases, and the degree of degradation of the supply voltage VDD may be greater as the peak power increases the power limit.

If the supply voltage VDD drops below the IR-drop margin, an error may occur in the data being computed by the NPU.

On the other hand, the first clock CLK1 may be applied to the PEs 110-1 of the first group, and the PEs 110-2 of the second group may be applied a second clock CLK2 that is out of phase with the first clock CLK1. Thus, the peak power of the PEs of each group may be distributed, and the peak power may be halved from the perspective of the peak power of the NPU compared to the comparative example of FIG. 13. In such a case, the voltage stability of the supply voltage VDD may be relatively more stable compared to the comparative example shown in FIG. 13.

In other words, according to an example of the present disclosure, the peak power of the NPU may be reduced, and the peak power of the SoC including the NPU may also be reduced.

Furthermore, for low power interfaces such as M.2, the power limit may be lower, which may be even more effective for such low power interfaces. However, the present disclosure is not limited to any particular interface.

Figure 14B:
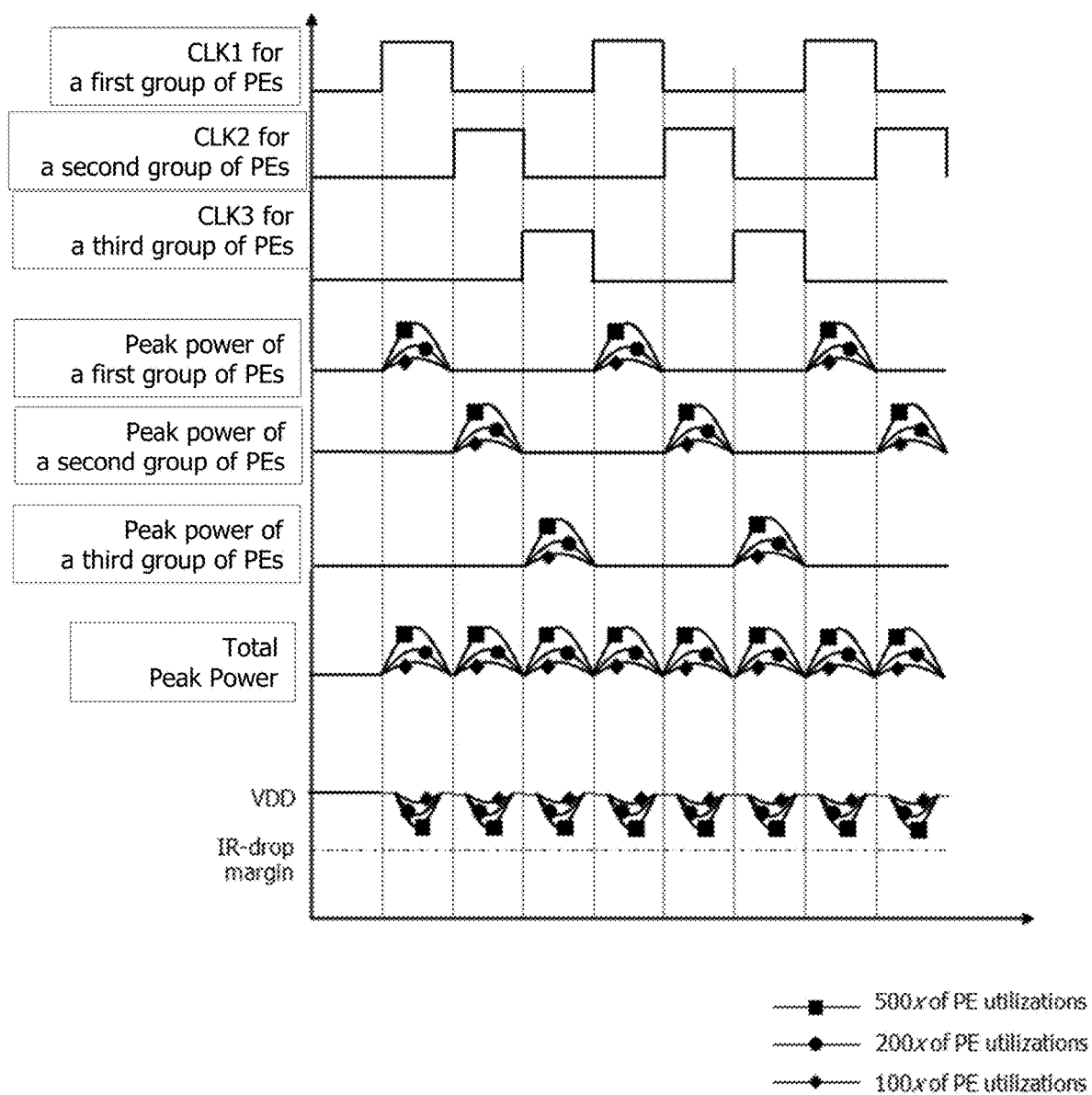
FIG. 14B illustrates an example of inputting clock signals of different phases to a plurality of PEs in three groups of the NPU, taking into account peak power, according to an example of the present disclosure.

FIG. 14B illustrates an example of inputting clock signals of different phases to a plurality of PEs of an NPU with consideration for peak power, in accordance with an example of the present disclosure.

It should be noted that as the utilization of the processing elements increases, the power may increase proportionally. Therefore, the power of each computation step can be calculated based on the utilization information of the PEs of each computation step and the driving frequency information. The power calculation may be calculated based on the scheduling information of a particular artificial neural network model. Here, the power (Watt) may be calculated as the energy consumed by the corresponding computation step divided by the unit time (i.e., 1 watt (W)=1 joule per second (J/s)). Thus, the power of each computation step can be calculated based on the scheduling information or measured directly by a power meter.

Referring to FIG. 14B, a first clock CLK1 may be input to the PEs 110-1 of the first group, a second clock CLK2 may be input to the PEs 110-2 of the second group, and a third clock CLK3 may be input to the PEs 110-3 of the third group. Here, the PEs 110-1, 110-2, and 110-3 of each group are configured to receive clock signals of different phases.

The 100× of PE utilization in FIG. 14B illustrates exemplary peak power and supply voltage VDD variation characteristics when one hundred processing elements are activated.

The 200× of PE utilization in FIG. 14B illustrates an exemplary peak power and supply voltage VDD variation characteristic when two hundred processing elements are activated.

The 500× of PE utilization in FIG. 14B illustrates exemplary peak power and supply voltage VDD variation characteristics when five hundred processing elements are activated.

Referring to FIG. 14B, the peak power increases and the supply voltage VDD tends to decrease as the number of processing elements of the neural processing unit 100 is activated. However, as signal clocks with different phases are input to each group of PEs, the overall peak power is reduced and the supply voltage VDD fluctuations are also reduced.

Here, the average power according to the example of FIG. 14B and the average power according to the comparative example of FIG. 13 are substantially the same. However, the peak power according to the example of FIG. 14B is smaller than the peak power according to the comparative example of FIG. 13. Therefore, the ratio of peak power to average power may be improved according to the example of FIG. 14B compared to the comparative example of FIG. 13.

Furthermore, the number of PEs operating in each clock may depend on the performance of the compiler that compiles the artificial neural network model, i.e., the better the performance of the compiler, the more PEs can be operated in each unit clock signal. The percentage of working PEs out of the total PEs can be referred to as the PE utilization rate %. Conversely, the better the performance of the compiler, the more the peak power of the NPU can be increased, i.e., the peak power can be directly proportional to the utilization rate of the PEs. Therefore, the problem is that as the compiler's algorithms become more sophisticated, the peak power of the NPU may increase further.

Referring to FIG. 14B, the peak power of the first group of PEs 110-1, the second group of PEs 110-2, and the third group of PEs 110-3 corresponding to the first clock CLK1 may vary depending on the number of PEs operating in each clock, i.e., the peak power may increase in proportion to the number of PEs operating in one clock signal.

As a side note, NPUs developed with low power can be developed for either M.2 interfaces or PCI Express interfaces when applied to edge devices. In particular, the maximum power may be relatively lower for the M.2 interface compared to the PCI Express interface. For example, an M.2 interface may have a current of 3 A and a power limit of 10 W. If the peak power of the NPU in the example exceeds 10 W at a particular clock, the supply voltage VDD to the NPU may fluctuate. In this case, the peak power of the NPU may increase as the utilization of the PE increases, and the degree of degradation of the supply voltage VDD may be greater as the peak power increases the power limit.

If the supply voltage VDD drops below the IR-drop margin, an error may occur in the data being computed by the NPU.

On the other hand, the PE 110-1 of the first group may be supplied with a first clock CLK1, the PE 110-2 of the second group may be supplied with a second clock CLK2 that is out of phase with the first clock CLK1, and the PE 110-3 of the third group may be supplied with a third clock CLK3 that is out of phase with the first clock CLK1 and the second clock CLK2. Thus, the peak power of each group of PEs may be distributed, and the peak power of the example of FIG. 14A and the example of FIG. 14B may be substantially the same even though more groups of PEs are operated than in the example of FIG. 14A.

In other words, according to an example of the present disclosure, the peak power of the NPU may be reduced, and the peak power of the SoC including the NPU may also be reduced.

Furthermore, for low power interfaces such as M.2, the power limit may be lower, which may be even more effective for such low power interfaces. However, the present disclosure is not limited to any particular interface.

Figure 14C:
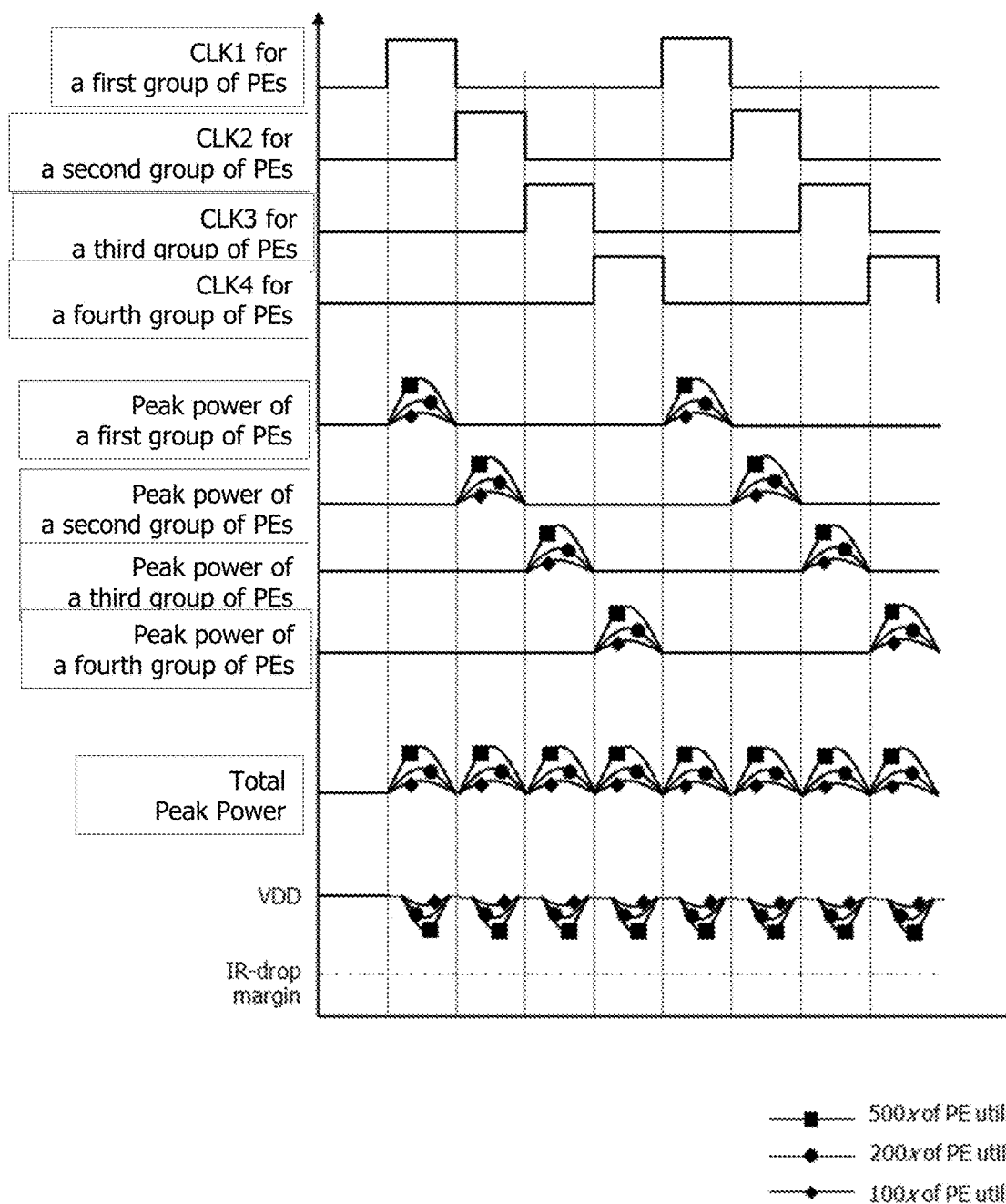
FIG. 14C illustrates an example of inputting clock signals of different phases to a plurality of PEs in four groups of the NPU, taking into account peak power, in accordance with an example of the present disclosure.

FIG. 14C illustrates an example of inputting clock signals of different phases to a plurality of PEs of an NPU with consideration for peak power, in accordance with an example of the present disclosure.

It should be noted that as the utilization of the processing elements increases, the power may increase proportionally. Therefore, the power of each computation step can be calculated based on the utilization information of the PEs of each computation step and the driving frequency information. The power calculation may be calculated based on the scheduling information of a particular artificial neural network model. Here, the power (Watt) may be calculated as the energy consumed by the corresponding computation step divided by the unit time (i.e., 1 watt (W)=1 joule per second (J/s)). Thus, the power of each computation step can be calculated based on the scheduling information or measured directly by a power meter.

Referring to FIG. 14C, a first clock CLK1 may be input to the PEs 110-1 of the first group, a second clock CLK2 may be input to the PEs 110-2 of the second group, a third clock CLK3 may be input to the PEs 110-3 of the third group, and a fourth clock CLK4 may be input to the PEs 110-4 of the fourth group. Here, the PEs 110-1, 110-2, 110-3, and 110-4 in each group are configured to receive clock signals of different phases.

The 100× of PE utilization in FIG. 14C illustrates exemplary peak power and supply voltage VDD variation characteristics when one hundred processing elements are activated.

The 200× of PE utilization in FIG. 14C illustrates an exemplary peak power and supply voltage VDD variation characteristic when two hundred processing elements are activated.

The 500× of PE utilization in FIG. 14C illustrates exemplary peak power and supply voltage VDD variation characteristics when five hundred processing elements are activated.

Referring to FIG. 14C, the peak power increases and the supply voltage VDD tends to decrease as the number of processing elements of the neural processing unit 100 is activated. However, as signal clocks with different phases are input to each group of PEs, the overall peak power is reduced and the supply voltage VDD fluctuations are also reduced.

Here, the average power according to the example of FIG. 14C and the average power according to the comparative example of FIG. 13 are substantially the same. However, the peak power according to the example of FIG. 14C is smaller than the peak power according to the comparative example of FIG. 13. Therefore, the ratio of peak power to average power may be improved according to the example of FIG. 14C compared to the comparative example of FIG. 13.

Furthermore, the number of PEs operating in each clock may depend on the performance of the compiler that compiles the artificial neural network model, i.e., the better the performance of the compiler, the more PEs can be operated in each unit clock signal. The percentage of working PEs out of the total PEs can be referred to as the PE utilization rate %. Conversely, the better the performance of the compiler, the more the peak power of the NPU can be increased, i.e., the peak power can be directly proportional to the utilization rate of the PEs. Therefore, the problem is that as the compiler's algorithm becomes more sophisticated, the peak power of the NPU may increase further.

Referring to FIG. 14C, the peak power of the first group of PEs 110-1, the second group of PEs 110-2, the third group of PEs 110-3, and the fourth group of PEs 110-4 corresponding to the first clock CLK1 may vary depending on the number of PEs operating per each clock signal. That is, the peak power may increase in proportion to the number of PEs operating in one clock signal.

As a side note, NPUs developed with low power can be developed for either M.2 interfaces or PCI Express interfaces when applied to edge devices. In particular, the maximum power may be relatively lower for the M.2 interface compared to the PCI Express interface. For example, an M.2 interface may have a current of 3 A and a power limit of 10 W. If the peak power of the NPU in the example exceeds 10

W at a particular clock, the supply voltage VDD to the NPU may fluctuate. In this case, the peak power of the NPU may increase as the utilization of the PE increases, and the degree of degradation of the supply voltage VDD may be greater as the peak power increases the power limit.

If the supply voltage VDD drops below the IR-drop margin, an error may occur in the data being computed by the NPU.

Meanwhile, a first clock CLK1 is applied to the PEs 110-1 of the first group, and a second clock CLK2 that is out of phase with the first clock CLK1 is applied to the PEs 110-2 of the second group, the PEs 110-3 of the third group may have a third clock CLK3 applied that is out of phase with the first clock CLK1 and the second clock CLK2, and the PEs 110-4 of the fourth group may have a fourth clock CLK4 applied that is out of phase with the first clock CLK1, the second clock CLK2, and the third clock CLK3. Thus, the peak power of each group of PEs may be distributed, and the peak power of the example of FIG. 14B and the example of FIG. 14C may be substantially the same even though more groups of PEs are operated than in the example of FIG. 14B.

In other words, according to an example of the present disclosure, the peak power of the NPU may be reduced, and the peak power of the SoC including the NPU may also be reduced.

Furthermore, for low power interfaces such as M.2, the power limit may be lower, which may be more effective for such low power interfaces. However, the present disclosure is not limited to any particular interface.

Figure 15:
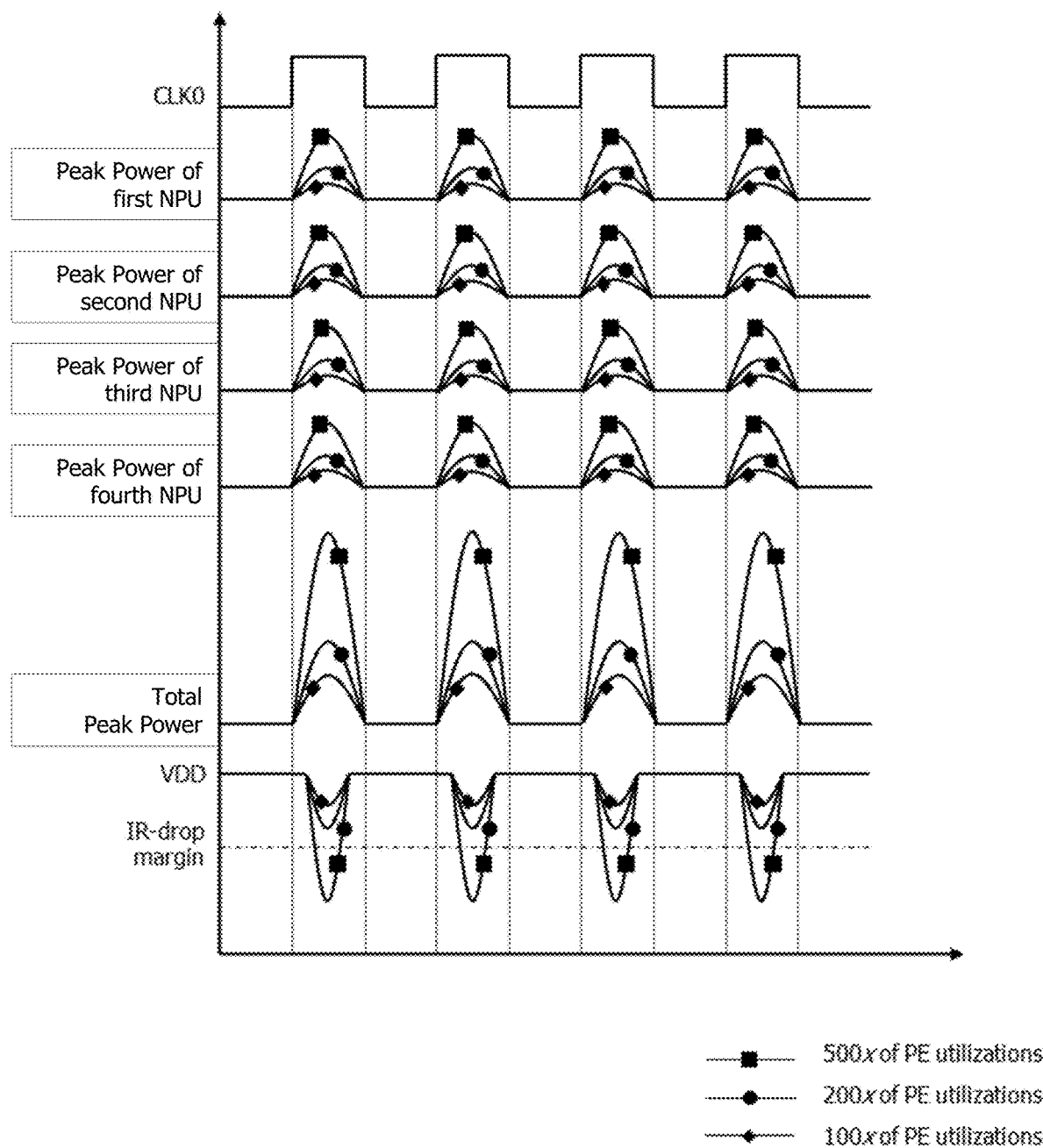
FIG. 15 illustrates a comparative example of not inputting clock signals of different phases to the plurality of NPUs.

FIG. 15 illustrates a comparative example of not inputting clock signals of different phases to a plurality of NPUs.

Referring to FIG. 15, a first clock CLK0 may be input to a plurality of neural processing units 100-1, 100-2, 100-3, and 100-4. Here, the plurality of neural processing units 100-1, 100-2, 100-3, and 100-4 are configured to receive clock signals of substantially the same phase. The plurality of neural processing units may include a first NPU 100-1, a second NPU 100-2, a third NPU 100-3, and a fourth NPU 100-4.

The 100× of PE utilization in FIG. 15 illustrates exemplary peak power and drive voltage VDD variation characteristics when one hundred processing elements are activated.

The 200× of PE utilization in FIG. 15 illustrates an exemplary peak power and drive voltage VDD variation characteristic when two hundred processing elements are activated.

The 500× of PE utilization in FIG. 15 illustrates exemplary peak power and drive voltage VDD variation characteristics when five hundred processing elements are activated.

Referring to FIG. 15, it is illustrated that as the number of processing elements of the neural processing unit 100 activated increases, the peak power increases and the drive voltage VDD tends to decrease.

Furthermore, the number of PEs operating in each clock cycle may depend on the performance of the compiler that compiles the artificial neural network model, i.e., the better the performance of the compiler, the more PEs can be operated per unit clock signal. The percentage of working PEs out of the total PEs can be referred to as the PE utilization rate %. Conversely, the better the performance of the compiler, the more the peak power of the NPU can be increased, i.e., the peak power can be directly proportional to the utilization rate of the PEs. Therefore, the problem is that as the compiler's algorithms become more sophisticated, the peak power of the NPU may increase further.

Referring to FIG. 15, the peak power of the first NPU 100-1, the second NPU 100-2, the third NPU 100-3, and the fourth NPU 100-4 operating with respect to the first clock CLK0 may vary depending on the number of PEs operating per each clock signal. That is, the peak power may increase in proportion to the number of PEs operating in one clock signal.

As a side note, NPUs developed with low power can be developed for either M.2 interfaces or PCI Express interfaces when applied to edge devices. In particular, the maximum power may be relatively lower for the M.2 interface compared to the PCI Express interface. For example, an M.2 interface may have a current of 3 A and a power limit of 10 W. If the peak power of the NPU in the example exceeds 10 W at a particular clock, the supply voltage VDD to the NPU may fluctuate. In this case, as the utilization rate of the PE increases, the peak power of the NPU increases further, and as the peak power exceeds the power limit, the degree of degradation of the supply voltage VDD may be greater in proportion to the excess information.

If the supply voltage VDD drops below the IR-drop margin, the data being computed by the NPU can cause errors. As a reminder, IR-drop can occur when the resistance (R) of a metal interconnect and the current (I) flowing through it cause a voltage drop (V=IR) according to Ohm's law. When a large number of circuits associated with multiple PEs in the NPU are switching simultaneously, the NPU can draw a significant amount of current. This high current can cause a larger voltage drop in the NPU, which can reduce the supply voltage in other parts of the SoC.

To summarize the comparative example in FIG. 15, to ensure reliable operation of the NPU and avoid potential errors, it is important to ensure sufficient IR-drop margin. The IR-drop margin can be the difference between the supply voltage VDD and the lowest allowable voltage at any point of the NPU during peak power conditions.

Figure 16A:
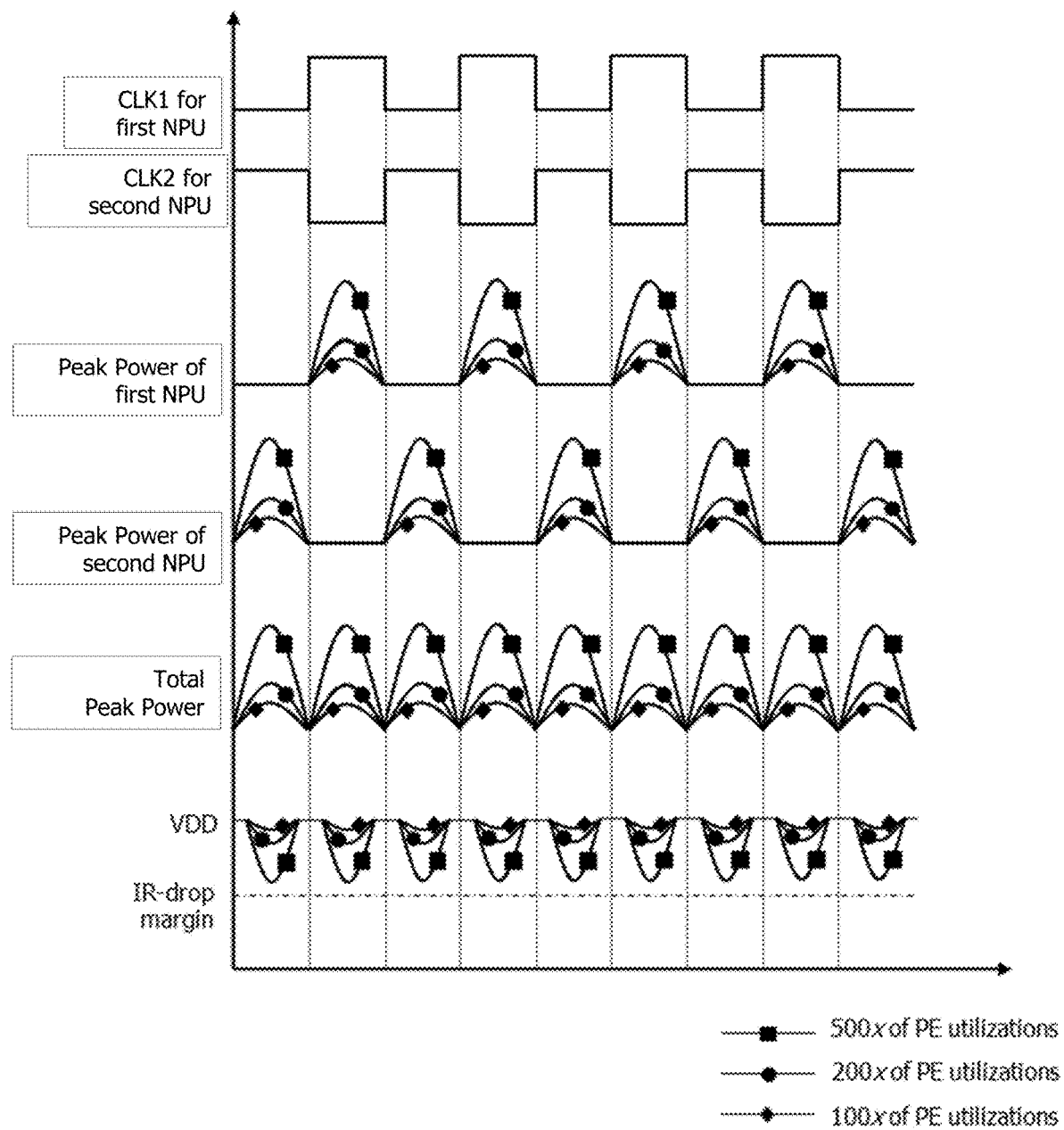
FIG. 16A illustrates an example of inputting clock signals of different phases to two NPUs with consideration for peak power, in accordance with an example of the present disclosure.

FIG. 16A illustrates an example of inputting clock signals of different phases to two NPUs with respect to peak power, in accordance with an example of the present disclosure.

Referring to FIG. 16A, a first clock CLK1 may be input to the first NPU 100-1 and a second clock CLK2 may be input to the second NPU 100-2. Here, the first NPU 100-1 and the second NPU 100-2 are configured to receive clock signals of different phases.

The 100× of PE utilization in FIG. 16A exemplarily illustrates the peak power and drive voltage VDD variation characteristics when one hundred processing elements are activated.

The 200× of PE utilization in FIG. 16A illustrates an exemplary peak power and drive voltage VDD variation characteristic when two hundred processing elements are activated.

The 500× of PE utilization in FIG. 16A illustrates exemplary peak power and drive voltage VDD variation characteristics when five hundred processing elements are activated.

Referring to FIG. 16A, it is shown that as the number of processing elements of the neural processing unit 100 is activated increases, the peak power increases and the drive voltage VDD tends to decrease. However, as signal clocks with different phases are input to the plurality of NPUs, the overall peak power may decrease and the supply voltage VDD fluctuations are shown to decrease.

It should be noted that the number of PEs operating at each clock can vary depending on the performance of the compiler that compiles the artificial neural network model, i.e., the better the compiler, the more PEs can operate per unit clock signal. The percentage of activated PEs out of the total PEs can be referred to as the PE utilization rate %. Conversely, the better the performance of the compiler, the more the peak power of the NPU can be increased, i.e., the peak power can be directly proportional to the utilization rate of the PEs. Therefore, the problem is that as the compiler's algorithms become more sophisticated, the peak power of the NPU may increase further.

The peak power of the first NPU 100-1 corresponding to the first clock CLK1 may vary depending on the number of PEs operating each clock signal. Similarly, the peak power of the second NPU 100-2 corresponding to the second clock CLK2 may vary depending on the number of PEs operating in each clock, i.e., the peak power may increase in proportion to the number of PEs operating in one clock signal.

As a side note, NPUs developed with low power can be developed for either M.2 interfaces or PCI Express interfaces when applied to edge devices. In particular, the maximum power may be relatively lower for the M.2 interface compared to the PCI Express interface. For example, an M.2 interface may have a current of 3 A and a power limit of 10 W. If the peak power of the NPU in the example exceeds 10 W at a particular clock, the supply voltage VDD to the NPU may fluctuate. In this case, as the utilization rate of the PE increases, the peak power of the NPU increases further, and as the peak power increases the power limit, the degree of degradation of the supply voltage VDD may be greater.

If the supply voltage VDD drops below the IR-drop margin, an error may occur in the data being computed by the NPU.

On the other hand, a first clock CLK1 may be applied to the first NPU 100-1, and a second clock CLK2 may be applied to the second NPU 100-2 that is out of phase with the first clock CLK1. Therefore, the peak power of the first NPU 100-1 and the second NPU 100-2 may be distributed, and the peak power may be halved in terms of the peak power of the NPUs. In such a case, the voltage stability of the supply voltage VDD may be relatively more stable compared to the comparative example shown in FIG. 15.

In other words, according to an example of the present disclosure, the peak power of the NPU may be reduced, and the peak power of the SoC including the NPU may also be reduced.

Furthermore, for low power interfaces such as M.2, the power limit may be lower, which may be more effective for such low power interfaces. However, the present disclosure is not limited to any particular interface.

Figure 16B:
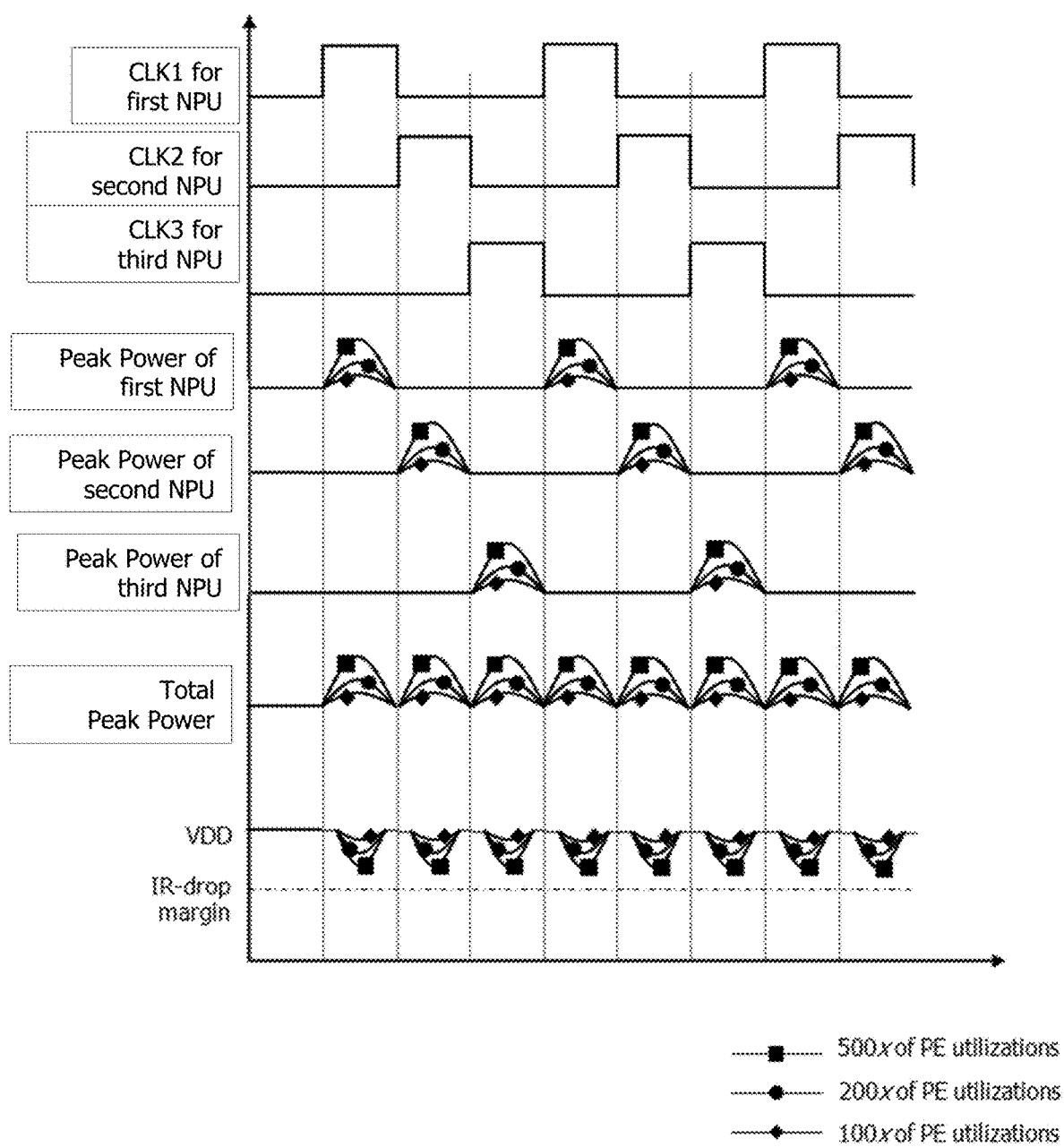
FIG. 16B illustrates an example of inputting clock signals of different phases to three NPUs with consideration of peak power, according to an example of the present disclosure.

FIG. 16B illustrates an example of inputting clock signals of different phases to three NPUs with respect to peak power, in accordance with an example of the present disclosure.

Referring to FIG. 16B, a first clock CLK1 may be input to the first NPU 100-1, a second clock CLK2 may be input to the second NPU 100-2, and a third clock CLK3 may be input to the third NPU 100-3. Here, the first NPU 100-1, the second NPU 100-2, and the third NPU 100-3 are configured to receive clock signals of different phases.

The 100× of PE utilization in FIG. 16B exemplarily illustrates the peak power and drive voltage VDD variation characteristics when one hundred processing elements are activated.

The 200× of PE utilization in FIG. 16B illustrates an exemplary peak power and drive voltage VDD variation characteristic when two hundred processing elements are activated.

The 500× of PE utilization in FIG. 16B illustrates an exemplary peak power and drive voltage VDD variation characteristic when five hundred processing elements are activated.

Referring to FIG. 16B, it is shown that as the number of processing elements of the neural processing unit 100 is activated increases, the peak power increases and the drive voltage VDD tends to decrease. However, as signal clocks with different phases are input to the plurality of NPUs, the maximum peak power is reduced and the supply voltage VDD fluctuations are reduced.

A first clock CLK1 may be applied to the first NPU 100-1, a second clock CLK2 may be applied to the second NPU 100-2, and a third clock CLK3 may be applied to the third NPU 100-3.

As shown in FIG. 16B, the peak power period of each NPU may be spread out over the time axis, and the maximum peak power may be significantly reduced. In such cases, the voltage stability of the supply voltage VDD may be relatively more stable when compared to the comparative example shown in FIG. 15.

Figure 16C:
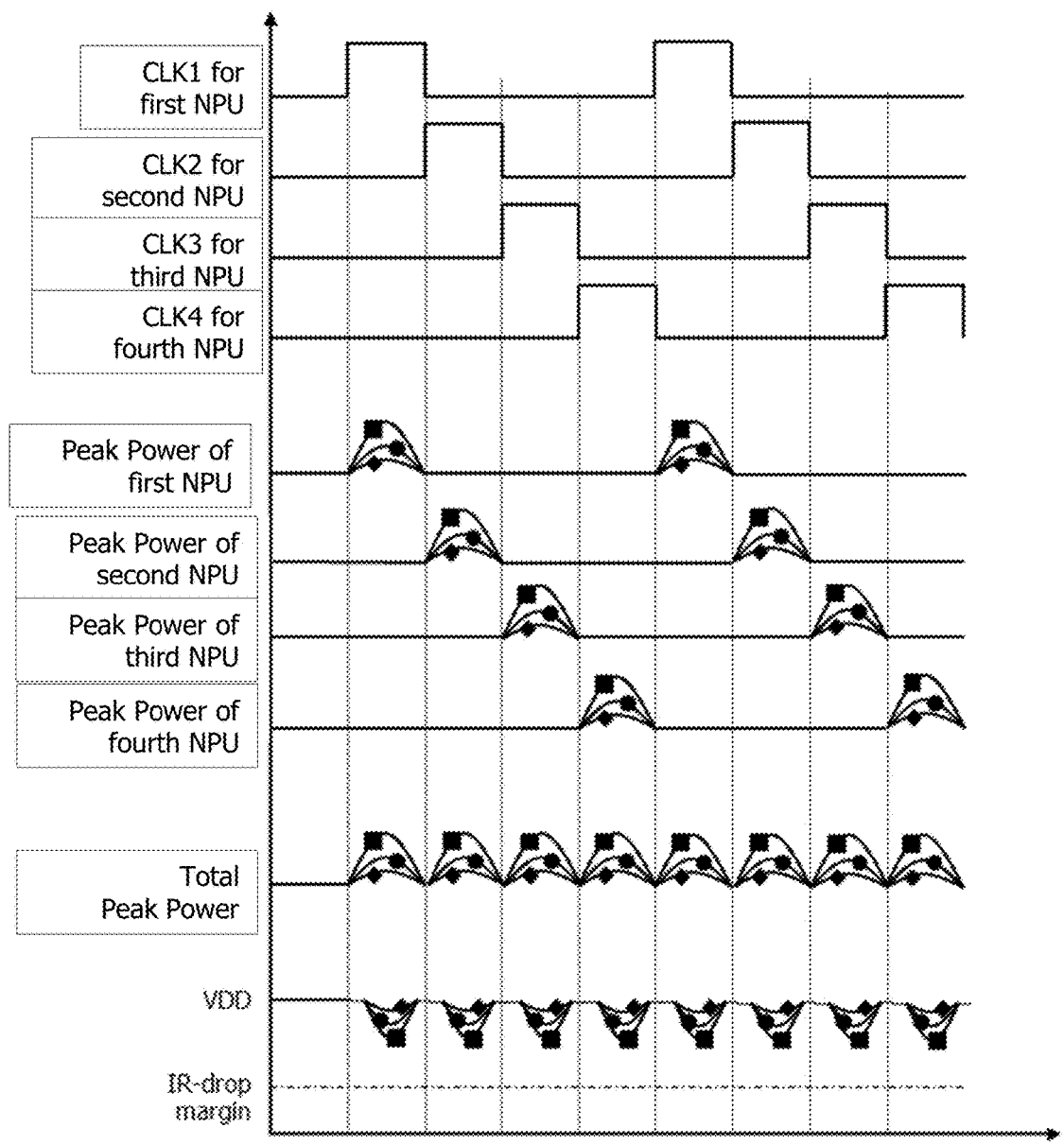
FIG. 16C illustrates an example of inputting clock signals of different phases to four NPUs with consideration for peak power, according to an example of the present disclosure.

FIG. 16C illustrates an example of inputting clock signals of different phases to four NPUs with consideration for peak power, in accordance with an example of the present disclosure.

Referring to FIG. 16C, a first clock CLK1 may be input to the first NPU 100-1, a second clock CLK2 may be input to the second NPU 100-2, a third clock CLK3 may be input to the third NPU 100-3, and a fourth clock CLK4 may be input to the fourth NPU 100-4. Here, the first NPU 100-1, the second NPU 100-2, the third NPU 100-3, and the fourth NPU 100-4 are configured to receive clock signals of different phases.

The 100× of PE utilization of FIG. 16C exemplarily illustrates the peak power and drive voltage VDD variation characteristics when one hundred processing elements are activated.

The 200× of PE utilization in FIG. 16C illustrates an exemplary peak power and drive voltage VDD variation characteristic when two hundred processing elements are activated.

The 500× of PE utilization in FIG. 16C illustrates exemplary peak power and drive voltage VDD variation characteristics when five hundred processing elements are activated.

Referring to FIG. 16C, it is shown that as the number of processing elements of the neural processing unit 100 is activated increases, the peak power increases and the drive voltage VDD tends to decrease. However, as signal clocks with different phases are input to the plurality of NPUs, the overall peak power is reduced and the supply voltage VDD fluctuations are also reduced.

A first clock CLK1 may be applied to the first NPU 100-1, a second clock CLK2 that is out of phase with the first clock CLK1 may be applied to the second NPU 100-2, a third clock CLK3 may be applied to the third NPU 100-3, and a fourth clock CLK4 may be applied to the fourth NPU 100-4.

Therefore, the intervals in which the peak power of the first NPU 100-1, the second NPU 100-2, the third NPU 100-3, and the fourth NPU 100-4 occur may be distributed on the time axis.

As shown in FIG. 16C, the peak power intervals of each NPU may be distributed on the time axis, and the maximum peak power may be greatly reduced. In such a case, the voltage stability of the supply voltage VDD may be relatively more stable when compared to the comparative example shown in FIG. 15.

Brief Summary of Disclosures of the Present Disclosure

The contents of the present disclosure may be summarized and described as follows.

According to an example of the present disclosure, neural processing unit (NPU) may be provided. The NPU may comprise a first circuit configured to perform operations for an artificial neural network (ANN) model, and arranged for a plurality of processing elements (PE) groups including a plurality of PEs, and a second circuit configured to operate as a clock divider configured to generate a plurality of clock signals having different phases, respectively, by dividing a source clock signal and provide the plurality of clock signals to the plurality of PE groups. A first clock signal of the plurality of clock signals may be configured to be provided to a first PE group of the plurality of PE groups, and a second clock signal of the plurality of clock signals may be configured to be provided to a second PE group of the plurality of PE groups.

At least one of the plurality of clock signals may be configured to be supplied to one of the plurality of PE groups after passing through at least one clock buffer arranged for peak power reduction.

The plurality of clock signals may have a lower frequency than the source clock signal.

A frequency of the plurality of clock signals may be determined based on a number of the plurality of PE groups.

A frequency of the plurality of clock signals may be determined as a frequency of the source clock signal divided by a number of the plurality of PE groups.

The second clock signal may be delayed in phase with respect to the first clock signal.

The second circuit arranged for the clock divider may include a plurality of flip-flops for delaying the source clock signal, a multiplexer connected in parallel with the plurality of flip-flops, and a divider for dividing a frequency of an output signal from the multiplexer.

The second circuit arranged for the clock divider may include a plurality of delay cells and a multiplexer connected in parallel with the plurality of delay cells.

The second circuit arranged for the clock divider may include a divider coupled to the source clock signal to divide a frequency of the source clock signal, a first D-type flip-flop coupled to an output of the divider. Each of the divider and the first D-type flip-flop may be configured to be operated by receiving a frequency of the source clock.

According to an example of the present disclosure, a system-on-chip (SoC) may be provided. The SoC may comprise semi-conductor substrate, a first circuit, arranged on the semi-conductor substrate, configured to perform operations for an artificial neural network (ANN) model, and arranged for a plurality of neural processing units (NPUs) including a plurality of processing elements (PE) groups including a plurality of PEs, and a second circuit, arranged on the semi-conductor substrate, configured to operate as a clock divider configured to generate a plurality of clock signals having different phases, respectively, by dividing a source clock signal and provide the plurality of clock signals to the plurality of NPUs. A first clock signal of the plurality of clock signals may be configured to be provided to a first NPU of the plurality of NPUs, and a second clock signal of the plurality of clock signals may be configured to be provided to a second NPU of the plurality of NPUs.

At least one of the plurality of clock signals may be configured to be supplied to one of the plurality of NPUs after passing through at least one clock buffer arranged for peak power reduction.

The plurality of clock signals may have a lower frequency than the source clock signal.

A frequency of the plurality of clock signals may be determined based on a number of the plurality of NPUs.

A frequency of the plurality of clock signals may be determined as a frequency of the source clock signal divided by a number of the plurality of NPUs.

The second clock signal may be delayed in phase with respect to the first clock signal.

According to an example of the present disclosure, an electronic device may be provided. The electronic device may comprise a princed circuit board, a first circuit, arranged on the princed circuit board, configured to perform operations for an artificial neural network (ANN) model, and arranged for a plurality of neural processing units (NPUs) including a plurality of processing elements (PE) groups including a plurality of PEs, and a second circuit, arranged on the princed circuit board, configured to operate as a clock divider configured to generate a plurality of clock signals having different phases, respectively, by dividing a source clock signal and provide the plurality of clock signals to the plurality of NPUs. A first clock signal of the plurality of clock signals may be configured to be provided to a first NPU of the plurality of NPUs, and a second clock signal of the plurality of clock signals may be configured to be provided to a second NPU of the plurality of NPUs.

At least one of the plurality of clock signals may be configured to be supplied to one of the plurality of NPUs after passing through at least one clock buffer arranged for peak power reduction.

The plurality of clock signals may have a lower frequency than the source clock signal.

A frequency of the plurality of clock signals may be determined as a frequency of the source clock signal divided by a number of the plurality of NPUs.

The second clock signal may be delayed in phase with respect to the first clock signal.

Examples of the present disclosure described in the present disclosure and drawings are merely presented as specific examples to easily explain the technical content of the present disclosure and help understanding of the present disclosure, and are not intended to limit the scope of the present disclosure. It is apparent to those of ordinary skill in the art that other modified examples can be implemented or derived in addition to the examples described.

[Assignment number] 2022-0-00248-002

[Ministry Name] Ministry of Science and ICT

[Name of project management (professional) organization] Information and Communications Planning and Evaluation Institute

[Research project name] PIM artificial intelligence semiconductor core technology development (design)

[Research project name] Development of CXL-based PIM semiconductor technology for multiple DRAM modules considering memory consistency

[Contribution rate] 1/1

[Name of project carrying out organization] DeepX Co., Ltd.

[Research period] 2023 Jan. 1~2023 Dec. 31

What is claimed is:

1. A neural processing unit (NPU) comprising:
a first circuit configured to perform operations for an artificial neural network (ANN) model, and arranged for a plurality of processing elements (PE) groups including a plurality of processing elements; and a second circuit configured to operate as a clock divider which is configured to generate a plurality of clock signals having different phases, respectively, by dividing a source clock signal and provide the plurality of clock signals to the plurality of PE groups, wherein the second circuit is configured to provide a first clock signal of the plurality of clock signals to a first PE group of the plurality of PE groups, and to provide a second clock signal of the plurality of clock signals to a second PE group of the plurality of PE groups, and wherein the plurality of clock signals have a lower frequency than the source clock signal.

2. The NPU of claim 1,
wherein at least one of the plurality of clock signals is supplied to one of the plurality of PE groups after passing through at least one clock buffer arranged for peak power reduction.

3. The NPU of claim 1,
wherein a frequency of the plurality of clock signals is determined based on a number of the plurality of PE groups.

4. The NPU of claim 1,
wherein a frequency of the plurality of clock signals is determined as a frequency of the source clock signal divided by a number of the plurality of PE groups.

5. The NPU of claim 1,
wherein the second clock signal is delayed in phase with respect to the first clock signal.

6. The NPU of claim 1,
wherein the second circuit arranged for the clock divider includes a plurality of flip-flops for delaying the source clock signal, a multiplexer connected in parallel with the plurality of flip-flops, and a divider for dividing a frequency of an output signal from the multiplexer.

7. The NPU of claim 1,
wherein the second circuit arranged for the clock divider includes a plurality of delay cells and a multiplexer connected in parallel with the plurality of delay cells.

8. The NPU of claim 1,
wherein the second circuit arranged for the clock divider includes a divider coupled to the source clock signal to divide a frequency of the source clock signal, a first D-type flip-flop coupled to an output of the divider, and wherein each of the divider and the first D-type flip-flop is configured to be operated by receiving a frequency of the source clock signal.

9. A system-on-chip (SoC) comprising:
a semi-conductor substrate;
a first circuit, arranged on the semi-conductor substrate, configured to perform operations for an artificial neural network (ANN) model, and arranged for a plurality of neural processing units (NPUs) including a plurality of processing elements (PE) groups including a plurality of processing elements; and a second circuit, arranged on the semi-conductor substrate, configured to operate as a clock divider which is configured to generate a plurality of clock signals having different phases, respectively, by dividing a source clock signal and provide the plurality of clock signals to the plurality of NPUs, wherein the second circuit is configured to provide a first clock signal of the plurality of clock signals to a first NPU of the plurality of NPUs, and to provide a second clock signal of the plurality of clock signals to a second NPU of the plurality of NPUs, and wherein the plurality of clock signals have a lower frequency than the source clock signal.

10. The SoC of claim 9,
wherein at least one of the plurality of clock signals is supplied to one of the plurality of NPUs after passing through at least one clock buffer arranged for peak power reduction.

11. The SoC of claim 9,
wherein a frequency of the plurality of clock signals is determined based on a number of the plurality of NPUs.

12. The SoC of claim 9,
wherein a frequency of the plurality of clock signals is determined as a frequency of the source clock signal divided by a number of the plurality of NPUs.

13. The SoC of claim 9,
wherein the second clock signal is delayed in phase with respect to the first clock signal.

14. An electronic device comprising:
a printed circuit board;
a first circuit, arranged on the printed circuit board, configured to perform operations for an artificial neural network (ANN) model, and arranged for a plurality of neural processing units (NPUs) including a plurality of processing elements (PE) groups including a plurality of processing elements; and a second circuit, arranged on the printed circuit board, configured to operate as a clock divider which is configured to generate a plurality of clock signals having different phases, respectively, by dividing a source clock signal and provide the plurality of clock signals to the plurality of NPUs, wherein the second circuit is configured to provide a first clock signal of the plurality of clock signals to a first NPU of the plurality of NPUs, and to provide a second clock signal of the plurality of clock signals to a second NPU of the plurality of NPUs, and wherein the plurality of clock signals have a lower frequency than the source clock signal.

15. The electronic device of claim 14,
wherein at least one of the plurality of clock signals is supplied to one of the plurality of NPUs after passing through at least one clock buffer arranged for peak power reduction.

16. The electronic device of claim 14,
wherein a frequency of the plurality of clock signals is determined as a frequency of the source clock signal divided by a number of the plurality of NPUs.

17. The electronic device of claim 14,
wherein the second clock signal is delayed in phase with respect to the first clock signal.

* * * * *